United States Patent
Silverstein

(10) Patent No.: US 12,488,060 B2
(45) Date of Patent: Dec. 2, 2025

(54) VIRTUAL BROWSER APPLICATION SYSTEMS AND METHODS

(71) Applicant: Brian M. Silverstein, San Carlos, CA (US)

(72) Inventor: Brian M. Silverstein, San Carlos, CA (US)

(73) Assignee: MIRRORTAB CORP., San Francisco, CA (US)

( * ) Notice: Subject to any disclaimer, the term of this patent is extended or adjusted under 35 U.S.C. 154(b) by 433 days.

(21) Appl. No.: 17/937,507

(22) Filed: Oct. 3, 2022

(65) Prior Publication Data

US 2023/0026368 A1   Jan. 26, 2023

Related U.S. Application Data

(63) Continuation-in-part of application No. 17/828,366, filed on May 31, 2022, now Pat. No. 11,700,266.

(60) Provisional application No. 63/195,522, filed on Jun. 1, 2021.

(51) Int. Cl.
   *G06F 16/957* (2019.01)
   *G06F 9/455* (2018.01)

(52) U.S. Cl.
   CPC ...... *G06F 16/9577* (2019.01); *G06F 9/45558* (2013.01); *G06F 2009/45595* (2013.01)

(58) Field of Classification Search
   CPC .................. G06F 16/9577; G06F 9/45558
   See application file for complete search history.

(56) References Cited

U.S. PATENT DOCUMENTS

| | | |
|---|---|---|
| 8,661,349 B2 | 2/2014 | Dobronsky |
| 9,258,324 B2 | 2/2016 | Giura et al. |
| 11,245,731 B1 | 2/2022 | Guruswamy et al. |
| 11,677,863 B1 * | 6/2023 | Ternyak ............... H04N 7/147 709/203 |
| 2011/0185286 A1 | 7/2011 | Moyers |
| 2011/0227369 A1 | 9/2011 | Abe et al. |
| 2013/0042188 A1 | 2/2013 | Dobronsky |
| 2013/0191880 A1 | 7/2013 | Conlan |

(Continued)

OTHER PUBLICATIONS

Stolerman (RFC 6143: The Remote Framebuffer (RFB) Protocol Analysis, Apr. 17, 2013, 9 pages) (Year: 2013).*

(Continued)

*Primary Examiner* — Oleg Korsak
(74) *Attorney, Agent, or Firm* — POLSINELLI LLP

(57) ABSTRACT

Disclosed embodiments provide a framework for provisioning a virtual browser application environment accessible using a native browser application. The virtual browser application environment is implemented on a virtual machine instance, where the virtual environment is isolated from other functionality of the virtual machine instance. In response to a request to access the environment, a set of access control policies are identified. The access control policies define a level of access to actions that can be performed within the environment. The environment is presented through a website executed on a user's native browser application. The user's interactions with the environment and with any other users within the environment are monitored in real-time according to the access control policies.

21 Claims, 23 Drawing Sheets

(56) References Cited

U.S. PATENT DOCUMENTS

| | | |
|---|---|---|
| 2015/0310126 A1* | 10/2015 | Steiner ............... G06F 16/9574 |
| | | 715/204 |
| 2017/0116349 A1* | 4/2017 | Steiner ............... G06F 16/9566 |
| 2018/0198824 A1 | 7/2018 | Pulapaka |
| 2019/0356791 A1 | 11/2019 | Prabhu |
| 2020/0127953 A1 | 4/2020 | Maddipati |
| 2020/0250372 A1* | 8/2020 | Remington ............ G06F 9/452 |
| 2021/0314301 A1 | 10/2021 | Chanak |
| 2022/0029965 A1 | 1/2022 | Chanak |
| 2022/0385671 A1 | 12/2022 | Silverstein |

OTHER PUBLICATIONS

Office Action mailed Aug. 3, 2022 in U.S. Appl. No. 17/828,366.
Notice of Allowance, dated Feb. 27, 2023, for U.S. Appl. No. 17/828,366, filed May 31, 2022, 9 pages.
Final Office Action, dated Nov. 16, 2022, for U.S. Appl. No. 17/828,366, filed May 31, 2022, 13 pages.

* cited by examiner

VIRTUAL BROWSER APPLICATION SYSTEMS AND METHODS

CROSS-REFERENCE TO RELATED APPLICATIONS

The present patent application is a continuation-in-part of U.S. Non-Provisional patent application Ser. No. 17/828,366, filed on May 31, 2022, and which claims the priority benefit of U.S. Provisional Patent Application No. 63/195,522, filed on Jun. 1, 2021, the disclosures of which are incorporated by reference herein.

FIELD

The present disclosure relates generally to systems and methods for facilitating secure virtual browser application environments. More specifically, the present disclosure provides a framework for allowing users to interact with one another in a virtual browser application environment in a secure manner subject to defined policies and alerts. Further, the present disclosure provides a framework for rendering websites through a virtual browser application environment to prevent exposure and modification of the underlying structure of these websites while preserving the user experience.

SUMMARY

Disclosed embodiments provide a framework for provisioning a secure virtual browser application environment accessible using a native browser application. Through the secure virtual browser application environment, a user can privately view and access the Internet from any location using its computing device. For instance, a user can access the virtual browser application environment from their home and resume their access from another location, such as a coffee shop or office. Further, through the collaborative virtual browser application environment, different users can securely interact and collaborate with one another to achieve common goals. For instance, an authorized user may be assisted by a primary user within the environment with accessing a bank account, arranging travel plans, scheduling medical appointments or processing prescriptions, providing legal assistance, or troubleshooting a particular issue that the authorized user may be having. Further, the secure virtual browser application can be used to allow for safe and secure navigation of legitimate websites. For instance, if a user attempts to access particular websites outside of the environment, the user can be re-directed to the secure virtual browser application environment, where the user can access websites securely and receive assistance from other users, if needed. Thus, the secure virtual browser application environment may allow for 1:0 use (e.g., private viewing and access to the Internet using a virtual browser application), 1:1 use (e.g., collaborative viewing and access to the Internet between two users), and 1:N use (e.g., collaborate viewing and access to the Internet amongst any number of users) via a persistent machine in the cloud.

According to some embodiments, a computer-implemented method is provided. The computer-implemented method comprises receiving a request to access a virtual browser application. The virtual browser application is implemented on a virtual machine instance. Further, access to the virtual browser application is isolated from other functionality of the virtual machine instance and the virtual browser application allows for simultaneous interaction amongst different users. The computer-implemented method further comprises identifying one or more access control policies. These access control policies are identified based on the request and an access control policy defines a level of access to actions performable within the virtual browser application. The computer-implemented method further comprises presenting the virtual browser application through a website executed on a native browser application. Further, the computer-implemented method comprises monitoring in real-time interactions with the virtual browser application and other users using the virtual browser application according to the access control policies.

In some embodiments, the request specifies a unique code. The unique code is used to identify the virtual browser application and the one or more access control policies.

In some embodiments, the computer-implemented method further comprises detecting an attempt to access a particular website using the virtual browser application; determining that access to the particular website using the virtual browser application is restricted based on an access control policy associated with the particular website; and denying the access to the particular website.

In some embodiments, the computer-implemented method further comprises identifying one or more alerts, wherein the one or more alerts are identified based on the request, and wherein the one or more alerts indicate a set of trigger actions performable using the virtual browser application; detecting an attempt to perform a trigger action of the set of trigger actions using the virtual browser application; and transmitting a notification indicating the attempt to perform the trigger action, wherein the notification specifies one or more options for addressing the attempt to perform the trigger action.

In some embodiments, the computer-implemented method further comprises detecting an attempt to access a suspicious website using the native browser application; identifying a legitimate website, wherein the legitimate website is identified based on characteristics associated with the suspicious website; and presenting the legitimate website using the virtual browser application, wherein the legitimate website is presented according to the access control policies.

In some embodiments, the computer-implemented method further comprises identifying one or more bookmarks corresponding to websites accessible using the virtual browser application, wherein the one or more bookmarks are identified based on the request, and wherein when a bookmark is selected, a website corresponding to the bookmark is presented using the virtual browser application; and presenting the one or more bookmarks through the website executed on the native browser application.

In some embodiments, the virtual browser application includes one or more browser tabs, wherein the one or more browser tabs are accessible subject to the access control policies; and the computer-implemented method further comprises monitoring access to the one or more browser tabs according to the access control policies.

In some embodiments, monitoring the real-time interactions includes monitoring one or more additional users.

In some embodiments, monitoring the real-time interactions includes simultaneously monitoring one or more interactions with the virtual browser application amongst one or more additional users.

According to some embodiments, another computer-implemented method is provided. The computer-implemented method comprises receiving a request to access a website. The website is implemented on one or more web servers. Further, the website is implemented using a web Document Object Model (DOM). The other computer-implemented method further comprises obtaining the web DOM and one or more assets associated with the web DOM. The one or more assets are identified based on the web DOM. The other computer-implemented method further comprises encoding the web DOM and the one or more assets according to a data format to generate a data stream. The data stream corresponds to a graphical facsimile of the website. Further, the graphical facsimile of the website obfuscates the web DOM. The graphical facsimile of the website provides a graphical representation of the one or more assets according to the web DOM. The other computer-implemented method further comprises transmitting the data stream to fulfill the request. When the data stream is received, the data stream is decoded to generate and present the graphical facsimile of the website.

In some embodiments, the web DOM and the one or more assets are encoded using one or more Web Real-Time Communication (WebRTC) protocols. Further, the one or more WebRTC protocols are used to encode the web DOM and the one or more assets into a set of pixels used to generate the graphical facsimile of the website.

In some embodiments, the other computer-implemented method further comprises obtaining a custom encoder associated with the one or more web servers. The custom encoder defines the data format. The other computer-implemented method further comprises executing the custom encoder to encode the web DOM and the one or more assets according to the data format.

In some embodiments, the other computer-implemented method further comprises updating one or more Domain Name System (DNS) servers to map a Uniform Resource Identifier (URI) associated with the website from an Internet Protocol (IP) address associated with the one or more web servers to an IP address associated with a virtual machine instance. The virtual machine instance is implemented to encode the web DOM and the one or more assets according to the data format.

In some embodiments, the other computer-implemented method further comprises transmitting a set of executable instructions that, as a result of being executed, cause an option to inspect the graphical facsimile of the website to become disabled.

In some embodiments, the data format corresponds to a Virtual Network Computing (VNC) protocol.

In some embodiments, the graphical facsimile of the website is associated with a different web DOM. Further, the different web DOM indicates that no data corresponding to the web DOM associated with the website is presented.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

The present disclosure is described in conjunction with the appended Figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
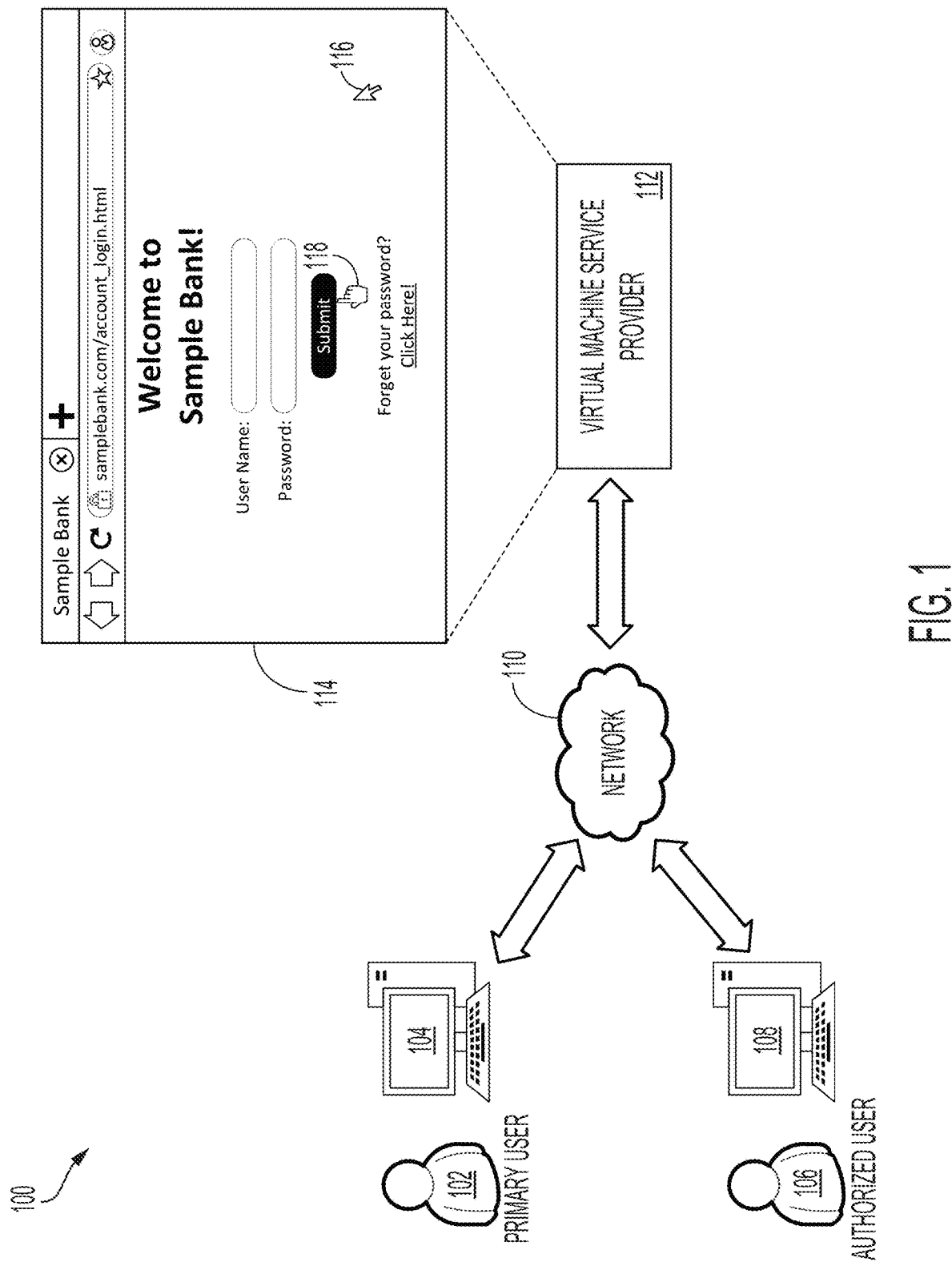
FIG. 1 shows an illustrative example of an environment in which users securely and collaboratively interact in a virtual browser application environment provided via a virtual machine service provider in accordance with at least one embodiment.

FIG. 1 shows an illustrative example of an environment 100 in which users 102, 106 collaboratively interact in a virtual browser application environment 114 provided via a virtual machine service provider 112 in accordance with at least one embodiment. In the environment 100, a primary user 102 may access, using a computing device 104 and via a communications network 110 (e.g., Internet), a virtual machine service provider 112 to request instantiation of a virtual browser application environment 114 onto a physical host maintained by the virtual machine service provider 112. The virtual machine service provider 112 may include various computing resources (e.g., physical hosts, servers, mainframes, etc.) that may be configured to instantiate virtual machine instances onto virtual computer systems on behalf of users, such as primary user 102.

In an embodiment, the virtual machine service provider 112 provides the primary user 102 with various configuration options for the virtual browser application environment 114. For instance, the virtual machine service provider 112 may provide the primary user 102 with various memory options for its virtual browser application environment 114, whereby the amount of memory provided in each configuration option may correspond to the number of browser tabs (e.g., webpages) that may be available simultaneously for use by the primary user 102 and any authorized users as designated by the primary user 102. Further, the amount of memory provided in each configuration option may correspond to the available functionality of the virtual browser application environment 114. For instance, a configuration option that includes a greater amount of memory allocation may allow for a virtual browser application environment 114 that enables streaming of digital video and audio at a higher fidelity compared to a configuration option with less memory allocation. In some instances, rather than providing configuration options that specify computing specifications for a virtual browser application environment 114, the virtual machine service provider 112 may provide configuration options that specify attributes that are specific to the virtual browser application environment 114. For example, a particular configuration option for a virtual browser application environment 114 may indicate the number of browser tabs that may be available to the primary user 102 and any other authorized users at a given time. Further, a particular configuration option may specify the capabilities of the virtual browser application environment 114, such as the resolution available for digital video streaming and the like.

In addition to providing memory options for its virtual browser application environment 114, the virtual machine service provider 112 may further provide bandwidth, storage, and/or processor or vCPU options for its virtual browser application environment 114. For instance, the virtual machine service provider 112 may provide one or more bandwidth (e.g., upload and/or download) options for the virtual browser application environment 114. For instance, a configuration option that includes a greater amount of bandwidth for the virtual browser application environment 114 may allow for downloading of digital assets quickly onto the virtual browser application executed within the virtual browser application environment 114. Further, this may allow for a user utilizing the virtual browser application environment 114 to re-send these digital assets (e.g., upload) to other entities quickly, regardless of the native bandwidth available to the user. For instance, even if a user has a slow Internet connection, the user may be able to transmit digital assets presented via the virtual browser application environment 114 to other entities according to the bandwidth available for the virtual browser application environment 114. Thus, the user's native connection bandwidth may have minimal impact on the user's ability to transmit digital assets from the virtual browser application environment 114 to other entities.

In some instances, the virtual machine service provider 112 may allow the primary user 102 to define a set of configuration requirements for the virtual browser application environment 114. For instance, the primary user 102 may specify that the virtual browser application environment is to be supported by a virtual machine instance having a minimum amount of random-access memory (RAM), a minimum number of virtual central processing units (vCPUs), minimum storage capacity, a minimum amount of available bandwidth, and the like. Further, the primary user 102 may specify which browser application is to be implemented within the virtual browser application environment. For instance, the primary user 102 may specify that the virtual browser application environment is to implement a Google Chrome™ browser application as opposed to Microsoft Edge®, Mozilla Firefox®, or any other available browser application. Alternatively, the primary user 102 may specify that it is agnostic as to which browser application is implemented within the virtual browser application environment so long as the minimum configuration requirements are satisfied.

If the primary user 102 selects a particular configuration option, or otherwise provides the virtual machine service provider 112 any configuration requirements for instantiation of the virtual browser application environment 114, the virtual machine service provider 112 may determine whether a physical host is available to support a virtual machine instance that can implement the virtual browser application environment 114 according to the selected option or requirements. For instance, the virtual machine service provider 112 may evaluate the various physical hosts maintained by the virtual machine service provider 112 to determine whether there are one or more physical hosts having available computing resources to support a virtual machine instance that can implement the virtual browser application environment 114. If the virtual machine service provider 112 determines that there are no physical hosts available for instantiation of a virtual machine instance for the requested virtual browser application environment 114, the virtual machine service provider 112 may transmit a notification to the primary user 102 to indicate that the virtual browser application environment 114 cannot be implemented at that time. Additionally, or alternatively, the virtual machine service provider 112 may queue the request until a physical host becomes available that can be used to instantiate the virtual machine instance for the virtual browser application environment 114.

In an embodiment, the virtual machine instance utilized to implement the virtual browser application environment 114 is instantiated such that only the virtual browser application environment 114 is accessible to the primary user 102 and to any other authorized users. For instance, the virtual machine instance may include an operating system, a browser application, and a variety of other applications that may be executed to support the browser application and any other functionality required for the implementation of the virtual browser application environment 114. The virtual machine service provider 112 may restrict access to the virtual machine instance instantiated for the virtual browser application environment 114 such that the primary user 102 and any other authorized user (as designated by the primary user 102) may only be able to access the virtual browser application environment 114. This may prevent the primary user 102 or any other authorized user from accessing the operating system or any other application or functionality of the virtual machine instance not related to the virtual browser application environment 114.

In an embodiment, the virtual machine instance utilized to implement the virtual browser application environment 114 is instantiated such that certain functionality of the virtual browser application is restricted, prohibited, or otherwise inaccessible to the primary user 102 and any other authorized user. For example, through the virtual browser application environment 114, the primary user 102 and any other authorized user may be prohibited from installing any browser extensions onto the virtual browser application implemented within the virtual browser application environment 114. As another illustrative example, the primary user 102 and any other authorized user may be prohibited from accessing any developer tools or other tools usually implemented by the virtual browser application that allow users to inspect and/or modify any presented assets (e.g., HyperText Markup Language (HTML) code, Cascading Style Sheets (CSS), JavaScript code, applets, etc.). Further, as another illustrative example, the virtual machine service provider 112 may prohibit the primary user 102 and any other authorized user from being able to inspect any web element or other element presented or otherwise available through the virtual browser application implemented within the virtual browser application environment 114.

The aforementioned restrictions and prohibitions may be implemented by the virtual machine service provider 112 to prevent users, such as the primary user 102 and any other authorized users, from garnering any sensitive information that may otherwise be made available through inspection of different elements presented via the virtual browser application. For example, through inspection of any underlying elements associated with a webpage or other asset presented via the browser application, a user may be able to identify any security vulnerabilities that may be used to develop possible exploits, malicious code, and the like for exploitative purposes (e.g., obtaining sensitive user or enterprise information, phishing attacks, ransomware attacks, etc.). Thus, to prevent the possible exposure of information that may be exploited for malicious purposes, the virtual machine service provider 112, by default, may implement these restrictions and prohibitions on the installation of browser extensions onto the virtual browser application, on the use of developer tools or other tools to inspect and/or modify any presented assets, and on the ability to inspect any web element or other element presented or otherwise available through the virtual browser application.

In some instances, the virtual machine service provider 112 may allow the primary user 102 to define a set of policies or rules that may be used to restrict or prohibit an authorized user's ability to install browser extensions onto the virtual browser application, access any developer tools or other tools made available through the virtual browser application, or otherwise inspect any web element or other element presented or otherwise available through the virtual browser application. For example, if the primary user 102 is an enterprise administrator that manages a set of enterprise employees (e.g., authorized users), the enterprise administrator may define a policy whereby these enterprise employees are prohibited from accessing the aforementioned features of the virtual browser application. However, the primary user 102 may be able to access these features to evaluate any enterprise websites in real-time through the virtual browser application to detect and address any issues associated with these enterprise websites (e.g., security vulnerabilities, errors, etc.).

In an embodiment, the virtual machine instance includes a set of software containers that may execute in isolation from each other (e.g., a software container may have an isolated view of a file system, etc.). For instance, the virtual browser application presented via the virtual browser application environment 114 may be executed on a software container isolated from other processes operating within the virtual machine instance. Further, the virtual machine instance may implement a software container for the operating system, a software container that serves as a storage volume for downloads obtained via the virtual browser application, a software container for personal settings (e.g., settings defined by a primary user 102, setting specific to an authorized user 106, etc.), and the like. The software container used to implement the virtual browser application may be configured to only have limited access to resources available via other software containers of the virtual machine instance. Thus, the software container may be executed to have access to only certain resources from the computing resources allocated for the virtual machine instance. Due to this isolation, a user of the virtual browser application environment 114 may only be able to access and interact with the virtual browser application. This may prevent users from accessing the operating system, file systems, and other resources associated with the virtual machine instance, providing an additional layer of security for the virtual browser application environment 114.

In an embodiment, the virtual machine service provider 112 can make the virtual browser application environment 114 available to the primary user 102 via a website provisioned by the virtual machine service provider 112. For instance, the primary user 102, using its computing device 104, may access the website provided by the virtual machine service provider 112 over a communications network 110, such as the Internet. From the website, the primary user 102 may provide, to the virtual machine service provider 112, a set of credentials that may be associated with the primary user's account to access the virtual browser application environment 114 and any account settings available to the primary user 102. The set of credentials may include a username, a corresponding password, a one-time password (such as through multi-factor authentication), a cryptographic key, a token, and the like.

The virtual machine service provider 112 may configure the website to include a viewer application, through which the virtual machine service provider 112 may present, to the primary user 102, the virtual browser application environment 114 from the primary user's virtual machine instance. The virtual browser application environment 114 may solely include a graphical representation of the browser application executed within the virtual machine instance. Further, the virtual browser application environment 114 may omit any functionality that would allow the primary user 102 or any other authorized user from terminating the browser application executed within the virtual machine instance or that would otherwise allow the primary user 102 or other authorized user from accessing other functionality or features of the virtual machine instance (e.g., file systems, command prompts, other applications, the operating system, etc.). Additionally, the virtual browser application environment 114 may omit any functionality that would allow the primary user 102 or any other authorized user from inspecting any web elements or assets made available through the virtual browser application, as described above.

In an embodiment, the virtual machine service provider 112, via the website provided to enable access to the virtual browser application environment 114, enables the primary user 102 to designate other users, such as authorized user 106, as being permitted to access the virtual browser application environment 114 along with the primary user 102. For instance, via the website provided by the virtual machine service provider 112, the primary user 102 may provide a user name and corresponding credentials for an authorized user 106 that the primary user 102 would like to be able to access the virtual browser application environment 114. In some instances, the primary user 102 may only be required to provide a unique code (e.g., a "Go Code") that may be provided to an authorized user 106 to enable the authorized user 106 to access the virtual browser application environment 114. This unique code may comprise a series of alphanumeric and/or special characters. In an embodiment, when the primary user 102 provides a series of alphanumeric and/or special characters that are to serve as a unique code for an authorized user 106, the virtual machine service provider 112 can evaluate the provided series of alphanumeric and/or special characters to determine whether this series is available (e.g., not in use by other users of the virtual machine service provider 112). If the series is available for use, the primary user 102 may designate this unique code for use by an authorized user 106 and add the unique code to its account via the website.

In addition to defining a unique code that may be used by an authorized user 106 to access the virtual browser application environment 114, the primary user 102 may define one or more access control policies that may be associated with the unique code/authorized user 106 and used to determine the level of access to the virtual browser application environment 114. For instance, the primary user 102 may generate an access control policy that allows an authorized user 106 to solely have read access to the virtual browser application environment 114, whereby the authorized user 106 may be authorized to solely view elements of the virtual browser application environment 114 without having permission to manipulate the virtual browser application environment 114 (e.g., input text into the browser application, select interaction elements of the browser application, etc.). As another example, the primary user 102 may generate an access control policy that enables the authorized user 106 to perform both read and write operations within the virtual browser application environment 114 (e.g., access other websites, select interaction elements of the browser application, input text into the browser application, etc.). In some instances, the primary user 102 can define a granular access control policy, through which the primary user 102 can define the level of access to the virtual browser application environment 114 generally, as well as the level of access to particular websites or elements on websites. Thus, the primary user 102 can create and manage access control policies to tailor the level of access to the virtual browser application environment 114 and to particular websites or elements of websites as needed.

In addition to generating a unique code and corresponding access control policies for an authorized user 106, the primary user 102, via the website provided by the virtual machine service provider 112, may provide one or more bookmarks that may be readily available to the authorized user 106 when accessing the virtual browser application environment 114 via the website. For instance, via the website provided by the virtual machine service provider 112, the primary user 102 may define one or more bookmarks corresponding to websites that may be of interest to the primary user 102 and to authorized users, such as authorized user 106. To define a bookmark, the primary user 102 may provide a uniform resource identifier (URI) of the target website and a descriptor for the bookmark. As an illustrative example, if the primary user 102 wishes to define a bookmark corresponding to the website of a financial institution, the primary user 102 can provide the URI of the website (e.g., www.samplebank.com) and a descriptor for this website (e.g., "Sample Bank Home Page"). In some instances, the virtual machine service provider 112 may allow the primary user 102 to categorize its bookmarks such that an authorized user 106 may readily identify the category for a particular bookmark. Returning to the illustrative example above, the primary user 102 may add the bookmark for the financial institution to a "Finance" category, whereby an authorized user 106 accessing the website provided by the virtual machine service provider 112 to access the virtual browser application environment 114 may readily view the bookmark, "Sample Bank Home Page," under a "Finance" header in a bookmarks tab of the website.

In an embodiment, the primary user 102 can define one or more access control policies corresponding to levels of access to different bookmarks presented via the website to the authorized user 106. For instance, via an access control policy, the primary user 102 can designate safe hours and safe locations for use, by an authorized user 106 or other user associated with a unique code and/or set of credentials, of a particular bookmark presented via the website. As an illustrative example, a primary user 102 may define an access control policy whereby an authorized user 106 and/or other users associated with a unique code and/or set of credentials may be authorized to utilize a particular bookmark (and access the corresponding website within the virtual browser application environment 114) between 10 A.M and 11 A.M on Fridays. If the authorized user 106 or other user subject to this access control policy attempts to utilize the particular bookmark outside of this time period, the virtual machine service provider 112 may automatically reject the authorized user's or other user's attempt to access the corresponding website using the virtual browser application environment 114. As another illustrative example, a primary user 102 may define an access control policy whereby an authorized user 106 and/or other users associated with a unique code and/or set of credentials may be authorized to utilize a particular bookmark from specific locations (e.g., a physical address, a computing device having a particular Internet Protocol (IP) address, etc.). When an authorized user 106 and/or other users attempt to utilize the particular bookmark from a location outside of the permissible locations defined in the access control policy (as determined by the virtual machine service provider 112, such as through Global Positioning System (GPS) coordinates from the computing device, IP geolocation, etc.), the virtual machine service provider 112 may automatically reject the authorized user's or other user's attempt to access the corresponding website using the virtual browser application environment 114.

In an embodiment, the virtual machine service provider 112 can generate a calendar invitation to the authorized user 106 to access one or more bookmarks via the website or web portal provided by the virtual machine service provider 112 and/or one or more websites via the virtual browser application environment 114. For example, if a primary user 102 generates an access control policy indicating a time frame during which an authorized user 106 may utilize a bookmark or otherwise access a website via the virtual browser application environment 114, the virtual machine service provider 112 may automatically, and in real-time, transmit a calendar invitation to corresponding authorized users (e.g., users associated with a unique code, specific authorized users specified in the access control policy, etc.) corresponding to the time frame defined by the primary user 102. In some instances, via the virtual machine service provider 112, a primary user 102 can generate custom calendar invitations to invite authorized users to access a particular bookmark via the website provided by the virtual machine service provider 112 or to otherwise access the website corresponding to the particular bookmark via the virtual browser application environment 114.

In an embodiment, the primary user 102 can further define, via the website provided by the virtual browser application environment 114, one or more internal websites (e.g., intranets) that may only be accessible within a private network. These one or more intranets may be accessible via the virtual browser application within the virtual browser application environment 114 only when the virtual browser application environment 114 is accessed through this private network. Thus, in addition to defining the one or more intranets accessible through the virtual browser application environment 114, the primary user 102 may provide network configuration information associated with the private network. This may allow the virtual machine service provider 112 to automatically determine when the primary user 102 or other authorized user 106 accesses the virtual browser application environment 114 through this private network. Further, if the virtual machine service provider 112 detects user access to the virtual browser application environment 114 through this private network, the virtual machine service provider 112, through the virtual browser application environment 114, may allow the user to access the one or more intranets associated with the private network.

In an embodiment, if no authorized users are engaged with the virtual browser application within the virtual browser application environment 114, the virtual machine service provider 112 may place the virtual machine instance used to implement the virtual browser application environment 114 in a suspended state, whereby the current state of the virtual browser application environment 114 is stored by the virtual machine service provider 112 such that, when a primary user 102 or authorized user 106 accesses the website or web portal provided by the virtual machine service provider 112, the virtual machine service provider 112 may retrieve and restore the stored state of the virtual browser application environment 114. In some instances, when the virtual machine instance used to implement the virtual browser application environment 114 is placed in a suspended state, the computing resources allocated for the virtual machine instance may be maintained. This may provide for rapid restoration of the virtual browser application environment 114 when being returned from the suspended state.

In another embodiment, if no authorized users are engaged with the virtual browser application within the virtual browser application environment 114, the virtual machine service provider 112 may shut down the virtual machine instance used to implement the virtual browser application environment 114. If the virtual machine instance is shut down by the virtual machine service provider 112, any computing resources allocated for the virtual machine instance may be automatically released and any processes previously executing using these computing resources may be terminated. Further, any data stored in memory may also be purged in order to make this memory available for other processes (e.g., other virtual machine instances, etc.). When a primary user 102 or authorized user 106 accesses the website or web portal provided by the virtual machine service provider 112 in order to access the virtual browser application environment 114, the virtual machine service provider 112 may attempt to identify any available capacity of the physical hosts maintained by the virtual machine service provider 112 that can be used to re-instantiate the virtual machine instance used to implement the virtual browser application environment 114. This may reduce exposure of these computing resources to other entities while the primary user 102 and any authorized users 106 are not utilizing the virtual browser application via the virtual browser application environment 114. Further, this may reduce or eliminate the risk of exposure of any information presented within the virtual browser application environment 114 (e.g., data presented on websites accessed by a primary user 102 and/or other authorized users 106) while the primary user 102 and/or any authorized users 106 are not utilizing the virtual browser application via the virtual browser application environment 114.

In an embodiment, if an authorized user 106 attempts to access a bookmark or corresponding website via the virtual browser application environment 114 outside of a time frame defined in an access control policy or as otherwise specified by a primary user 102, the virtual machine service provider 112 can automatically deny the authorized user's request. In some instances, in addition to the denying the request, the virtual machine service provider 112 may provide the authorized user 106 with an option to transmit a request to the primary user 102 to access the bookmark or corresponding website. For example, when the authorized user 106 selects a bookmark or attempts to access a website using the virtual browser application environment 114 outside of an allowable time frame, the virtual machine service provider 112 may automatically prompt the authorized user 106 to determine whether to submit a request to the primary user 102 for access to the website. Further, the virtual machine service provider 112 may allow the authorized user 106 to provide any information in its request corresponding to reasons as to why such access is required. This additional information may be used by the primary user 102 to determine whether access to the website can be granted, whether the primary user 102 needs to access the virtual browser application environment 114 to assist the authorized user 106, and the like. In some instances, the virtual machine service provider 112 may automatically generate and transmit an alert to the primary user 102 in response to an authorized user's attempt to access a bookmark or corresponding website via the virtual browser application environment 114 outside of a time frame defined in an access control policy or as otherwise specified by a primary user 102. This may allow the primary user 102 to perform any action necessary to address the authorized user's attempted access, including overriding the access control policy to enable access to the website via the virtual browser application environment 114.

In an embodiment, if an authorized user 106 attempts to access a bookmark or corresponding website via the virtual browser application environment 114 outside of a time frame defined in an access control policy or as otherwise specified by a primary user 102, the virtual machine service provider 112 can automatically determine, from the applicable access control policy a graph of events that are to occur in order for the authorized user 106 to be granted access to the bookmark or corresponding website via the virtual browser application environment 114. As an illustrative example, a particular website may be subject to an access control policy, whereby if an authorized user 106 attempts to access the particular website using a bookmark presented on the website or web portal provided by the virtual machine service provider 112 or via the virtual browser application environment 114, an alert may be transmitted to one or more primary users 102 (e.g., a user's son and daughter, a user's financial adviser, etc.). Further, the access control policy may define one or more conditions for granting the authorized user 106 to the particular website. For example, the access control policy may specify that a minimum number of primary users 102 or other users designated in the access control policy are required to approve the authorized user's request to access the particular website. As another example, the access control policy may specify that a quorum of primary users 102 and/or other users specified in the access control policy is required in order to grant the authorized user 106 access to the website via the virtual browser application environment 114.

Continuing with the aforementioned illustrative example, the virtual machine service provider 112 may transmit a request to the primary users 102 or other users designated in the access control policy to determine whether the authorized user 106 may access the requested website via the virtual browser application environment 114. A primary user 102 or other user receiving the request may provide a response indicating whether it authorizes the authorized user 106 to access the requested website or that access to the website is to be denied. In some instances, the virtual machine service provider 112 may define an expiration for the request, whereby users may have a limited time to provide a response to request. If a response from a user is not received before the request is expired, the virtual machine service provider 112 may record this lack of a response as a denial of access to the website. The virtual machine service provider 112 may review the received responses to determine whether the one or more conditions for granting the authorized user 106 to the particular website have been satisfied. For instance, if a minimum number of primary users 102 and/or other uses designated in the access control policy have indicated that the authorized user 106 may access the particular website, the virtual machine service provider 112 may allow the authorized user 106 to access the website according to any applicable access control policies. However, if the virtual machine service provider 112 determines that the one or more conditions have not been satisfied, the virtual machine service provider 112 may deny the authorized user's request to access the website via the virtual browser application environment 114.

In an embodiment, a primary user 102 can further define one or more alerts or other notifications that may be generated in response actions performed by an authorized user 106 within the virtual browser application environment 114. For instance, a primary user 102 may define an alert whereby if an authorized user 106 accesses a particular website via the virtual browser application environment 114, the virtual machine service provider 112 may transmit an alert or other notification to the primary user 102 to inform the primary user 102 of the authorized user's access to the particular website. In some instances, the primary user 102 may further define automatic actions that may be performed by the virtual machine service provider 112 in response to an alert. For instance, the primary user 102 may indicate that the virtual machine service provider 112, in its alert to the primary user 102, is to provide the primary user 102 with one or more options for addressing the alert. These options may include terminating access to the particular website by the authorized user 106, transmitting a notification to the authorized user 106 with regard to the access to the particular website, directing the primary user 102 to the virtual browser application environment 114 to interact with the authorized user 106 within the virtual browser application environment 114, and the like.

Once the primary user 102 has created a new user profile for an authorized user 106 (e.g., assigned a unique code for the authorized user 106, defined any applicable access control policies, defined any alerts for the authorized user 106, etc.), the primary user 102 may provide the unique code and/or any other credentials for accessing the virtual browser application environment 114 to an authorized user 106. In some instances, the virtual machine service provider 112 may provide the unique code and/or any other credentials to the authorized user 106 on behalf of the primary user 102. For instance, the virtual machine service provider 112 may transmit a notification (e.g., e-mail message, text or other Short Message Service (SMS) or Multimedia Messaging Service (MMS) message, etc.) to the authorized user 106 that includes the unique code and/or any other credentials, as well as instructions for accessing the virtual browser application environment 114 via the website provided by the virtual machine service provider 112.

When the authorized user 106 initially accesses, via a browser application executed on its computing device 108 and over the communications network 110, the website provided by the virtual machine service provider 112 to access the virtual browser application environment 114, the virtual machine service provider 112 may prompt the authorized user 106 to provide its unique code and/or any other credentials provided by the primary user 102 or by the virtual machine service provider 112 on behalf of the primary user 102. For instance, the virtual machine service provider 112, via the website, may provide one or more input fields through which the authorized user 106 may input its unique code and/or any other credentials provided to the authorized user 106. In an embodiment, the virtual machine service provider 112 can prompt the authorized user 106 to provide a one-time password or other authentication information from a second computing device (e.g., a security token, a mobile device that executes an application configured to generate one-time passwords, etc.). For instance, when the authorized user 106 accesses the website provided by the virtual machine service provider 112, the virtual machine service provider 112 may prompt the authorized user 106 to utilize their second computing device to generate and/or provide authentication information (e.g., one-time password, cryptographic key, shared secret, etc.) to the virtual machine service provider 112. The virtual machine service provider 112 may evaluate the authentication information to determine whether the authentication information is valid and, if so, identify a corresponding user profile associated with the provided authentication information and the account of the primary user 102. The virtual machine service provider 112 may use the account of the primary user 102 to identify the corresponding virtual machine instance and, hence, the virtual browser application environment 114 that is to be presented to the authorized user 106 via a viewer presented on the website provided by the virtual machine service provider 112.

It should be noted that while websites and web portals are used extensively throughout the present disclosure for accessing the virtual browser application environment 114, other applications and interfaces may be utilized to access the virtual browser application environment 114. For example, a primary user 102 and/or authorized user 106 may access the virtual browser application environment 114 using a standalone application installed and executed on a tablet computer or smartphone. This standalone application may be provided by the virtual machine service provider 112 and may provide direct access to the virtual machine service provider 112, whereby a user (e.g., primary user 102, authorized user 106, etc.) may utilize its unique code to access the virtual browser application environment 114. In some instances, access to the virtual browser application environment 114 may be provided via a virtual reality device application, whereby users (e.g., primary users 102, authorized users 106, etc.) may access the virtual browser application environment 114 and interact directly with elements within the virtual browser application environment 114. It should be noted that users may access the virtual browser application environment 114 using any combination of available methods. For instance, a primary user 102 may access the virtual browser application environment 114 using a standalone application installed and executed on its computing device 104, whereas an authorized user 106 may access the virtual browser application environment 114 via a website or web portal provided by the virtual machine service provider 112. This may provide additional flexibility for users to access the virtual browser application environment 114 and to interact with one another seamlessly within the environment 114.

If the authorized user 106 is successfully authenticated, the virtual machine service provider 112 may allow the authorized user 106 to access the virtual browser application environment 114 subject to any access control policies defined by the primary user 102. For instance, the authorized user 106 may access the viewer provided by the virtual machine service provider 112 via the website to access and interact with the virtual browser application environment 114 and the browser application executed therein. As the authorized user 106 interacts with the browser application within the virtual browser application environment 114, the virtual machine service provider 112 may continuously, and in real-time, monitor these interactions and the access control policies to ensure that the authorized user 106 is performing operations within the virtual browser application environment 114 consistent with the access control policies. For instance, if the authorized user 106, by virtue of an access control policy, is solely authorized to perform read operations within the virtual browser application environment 114, the virtual machine service provider 112 may actively restrict the authorized user's ability to interact with any interaction elements of the browser application executed within the virtual browser application environment 114, as well as restrict the authorized user's ability to access other websites via the browser application, input text into input fields on a website presented via the virtual browser application environment 114, and the like.

In addition to implementing global access control policies for the authorized user 106 during the authorized user's access to the virtual browser application environment 114, the virtual machine service provider 112 can actively, and in real-time, apply specific access control policies as the authorized user 106 interacts with the virtual browser application environment 114. For instance, if the authorized user 106 attempts to access a particular website, the virtual machine service provider 112 may evaluate the access control policies defined for the authorized user 106 to determine what access controls (if any) are to be applied within the particular website. For instance, if the primary user 102 has defined an access control policy whereby the authorized user 106 may only have read access within a particular website, the virtual machine service provider 112 may restrict the authorized user 106 to solely read access on the particular website when accessed. Once the authorized user 106 exits the particular website, the restriction imposed on the authorized user 106 by virtue of the access control policy may be lifted or modified according to any other applicable access control policies.

As another illustrative example, an access control policy may specify specific actions that the authorized user 106 may be prohibited from performing within the virtual browser application environment 114 and/or within particular websites presented via the virtual browser application environment 114. For instance, an access control policy may specify that an authorized user 106 is not authorized to perform cut/copy and paste operations within the virtual browser application environment 114. The virtual machine service provider 112, accordingly, may prevent the authorized user 106 from performing any cut/copy operations within the virtual browser application environment 114, thereby preventing the authorized user 106 from potentially cutting or copying sensitive information from within the virtual browser application environment 114 and pasting the cut/copied text into their native browser application on the computing device 108.

In some embodiments, the virtual machine service provider 112 can implement one or more default access control policies automatically if a primary user 102 foregoes defining any access control policies for its virtual browser application environment 114. For instance, the virtual machine service provider 112, by default, may implement a global access control policy for all users that prohibits users from performing cut/copy and paste operations within the virtual browser application environment 114. This may prevent users of the virtual browser application environment 114 from performing cut/copy and paste operations on any text or other input provided within the virtual browser application environment 114. To circumvent this policy, a primary user 102 may define an access control policy that provides one or more authorized users (including the primary user 102) with authorization to perform cut/copy and paste operations within the primary user's virtual browser application environment 114. These default access control policies may provide an additional layer of security for the virtual browser application environment 114 should a primary user 102 forego or otherwise forget to define access control policies for one or more authorized users 106.

In an embodiment, the virtual machine service provider 112 dynamically, and in real-time, monitors interactions of the authorized user 106 with the virtual browser application environment 114 to detect triggering of any alerts generated by the primary user 102. For instance, as the authorized user 106 interacts with the browser application via the virtual browser application environment 114, the virtual machine service provider 112 may determine whether an action performed by the authorized user 106 corresponds to a triggering event indicated in one or more alerts defined by the primary user 102. As an illustrative example, if the authorized user 106 accesses a particular website that is associated with an alert defined by the primary user 102, the virtual machine service provider 112, in real-time, may detect that the authorized user's access to the particular website corresponds to one or more alerts and may evaluate the one or more alerts to determine what action(s) are to be taken in response to the authorized user's access to the particular website. As noted above, these actions may include notifying the primary user 102 of the authorized user's access to the particular website, terminating authorized user 106 access to the particular website, prompting the primary user 102 to provide instructions or to select an option corresponding to actions that may be performed by the virtual machine service provider 112 in response to the authorized user's access to the particular website, and the like.

In an embodiment, the primary user 102 and any authorized users (e.g., authorized user 106) can interact with the virtual browser application environment 114 and each other simultaneously. For instance, while an authorized user 106 is interacting with a particular website via the virtual browser application environment 114, the primary user 102 (or any other authorized user) may also access the virtual browser application environment 114 and interact with the particular website along with the authorized user 106. Each user simultaneously interacting with the virtual browser application environment 114 may be represented using a cursor 116, 118. For example, as illustrated in FIG. 1, the primary user 102 may be represented within the virtual browser application environment 114 using cursor 116, whereas the authorized user 106 may be represented within the virtual browser application environment 114 using cursor 118. Each cursor 116, 118 may be unique. For instance, a cursor may have a unique coloration, shape, or other characteristic that is unique to the corresponding user. In some instances, a cursor may be accompanied by an identifier corresponding to the user associated with the cursor. This may allow for a user to readily determine which cursor is assigned to them and to differentiate their cursor from any other cursors presented via the virtual browser application environment 114.

The simultaneous interaction amongst users within the virtual browser application environment 114 may provide various advantages. For instance, via the virtual browser application environment 114, a primary user 102 may interact with an authorized user 106 within a website to help the authorized user 106 navigate through the website. Further, the primary user 102 may supply information that may not be known to the authorized user 106 (e.g., passwords, account information, etc.) to provide the authorized user 106 with access to particular websites or features of websites (e.g., retirement account information, utilities accounts, etc.). As an illustrative example, if the primary user 102 is a caregiver for the authorized user 106, whereby the primary user 102 may maintain credentials for various accounts of the authorized user 106, the primary user 102 and the authorized user 106 may simultaneously access the virtual browser application environment 114 to access a particular website associated with the authorized user's retirement account. The primary user 102, through the virtual browser application environment 114, may input the authorized user's credentials for accessing the authorized user's retirement account or healthcare-related account (e.g., medical services, pharmacy, etc.). Once access is gained to the authorized user's retirement account, both the primary user 102 and the authorized user 106 may review the authorized user's retirement account via the virtual browser application environment 114. As another illustrative example, if the authorized user 106 requires troubleshooting assistance for a particular issue, the primary user 102 and the authorized user 106 may simultaneously access the virtual browser application environment 114, through which the primary user 102 may navigate the authorized user 106 to one or more websites or provide a demonstration through navigation of the virtual browser application environment 114 for resolution of the issue. The authorized user 106 may, in real-time, view the operations performed by the primary user 102 and gain an understanding of how to address their issue.

In an embodiment, the virtual machine service provider 112 further allows the primary user 102 to configure which users may simultaneously interact with one another via the virtual browser application environment 114. For instance, the virtual machine service provider 112 can allow the primary user 102 to designate one or more tabs of the browser application implemented in the virtual browser application environment 114 as being limited to particular users, including the primary user 102. As an illustrative example, a primary user 102 may designate a particular tab of the browser application implemented in the virtual browser application environment 114 as being accessible only by the primary user 102 and the authorized user 106. Any other user accessing the virtual browser application environment 114 may be unable to access this particular tab or view any websites or information presented therein. This may provide a layer of privacy between the primary user 102 and the authorized user 106 within particular tabs while allowing the primary user 102 and the authorized user 106 to simultaneously interact with other authorized users via other tabs of the browser application implemented in the virtual browser application environment 114.

As noted above, the primary user 102 may generate one or more bookmarks that may be presented to the authorized user 106 for use within the virtual browser application environment 114. The authorized user 106, via the website provided by the virtual machine service provider 112, may view these one or more bookmarks and their corresponding categories, as defined by the primary user 102. If the authorized user 106 selects a particular bookmark, the virtual machine service provider 112 may update the browser application implemented in the virtual browser application environment 114 to present the corresponding website. Further, the virtual machine service provider 112 may redirect the authorized user 106 to the virtual browser application environment 114 to access the website associated with the selected bookmark.

In an embodiment, the virtual machine service provider 112 can provide, to users, a browser extension application that may be installed on a computing device and executed when a browser application on the computing device is executed. The browser extension application may be associated with a user's unique code and/or other credentials used to access the virtual machine service provider 112. This may allow for the browser extension application to automatically access the virtual machine service provider 112 on behalf of the user without need for the user to provide its unique code and/or other credentials. In an embodiment, the browser extension application may monitor user interaction with the local browser application installed on the user's computing device to determine whether to re-direct the user to the virtual browser application environment 114. For instance, if an authorized user 106, using the browser application on its computing device 108, attempts to access a website subject to an alert defined by the primary user 102, the browser extension application may automatically re-direct the authorized user 106 to the website maintained by the virtual machine service provider 112 and present, to the authorized user 106, the viewer through which the authorized user 106 may access the virtual browser application environment 114. As another illustrative example, the browser extension application may determine whether the authorized user 106 is attempting to access an important website (e.g., a banking website, a healthcare website, etc.), as classified by either the primary user 102 or by the virtual machine service provider 112 itself. Through the virtual browser application environment 114, the authorized user 106 may access the original website the authorized user 106 was attempting to access, subject to any access control policies defined by the primary user 102.

As noted above, the primary user 102 may define, through the website provided by the virtual browser application environment 114, one or more intranets that may only be accessible within a private network. Further, the primary user 102 may define one or more access control policies whereby these one or more intranets may only be accessible within the virtual browser application environment 114 and only if the virtual browser application environment 114 is accessed through a particular private network, as defined by the primary user 102 or other enterprise administrator associated with the private network. In an embodiment, the browser extension application monitor user interaction with the local browser application installed on the user's computing device to determine whether the user is attempting to access a particular intranet. If a primary user 102 or other authorized user 106 attempts to use their local browser application to access a particular intranet, the browser extension application may automatically determine whether the primary user 102 or other authorized user 106 is attempting to access the intranet from within the private network. If the browser extension application determines that this attempt to access the intranet is being made from a network other than the private network (e.g., a public network, etc.), the browser extension application may automatically reject this attempt to access the intranet. However, if the browser extension application determines that the primary user 102 or other authorized user 106 is attempting to access the intranet from within the private network, the browser extension application may automatically re-direct the primary user 102 or other authorized user 106 to the website maintained by the virtual machine service provider 112 and present, to the primary user 102 or other authorized user 106, the viewer through which the primary user 102 or other authorized user 106 may access the virtual browser application environment 114. Through the virtual browser application environment 114, the primary user 102 or other authorized user 106 may access the originally requested intranet.

In an embodiment, the browser extension application further allows users to migrate an existing browser tab executed within a native browser application to the virtual browser application environment 114. For instance, the browser extension application may allow an authorized user 106 to select a browser tab within its native browser application executed on the computing device 108 and request migration of the browser tab to the virtual browser application environment 114. In response to a request to migrate the browser tab to the virtual browser application environment 114, the browser extension application may evaluate the URI associated with the website presented within the selected browser tab, as well as any elements presented within the website, to determine whether the migration should be performed. For instance, if the URI associated with the website being presented in the browser tab and/or elements presented within the website are suspicious in nature (e.g., the website is known to include malware, the website includes interaction elements that may lead to the installation of malware, the website is tied to a suspicious entity, the website is a phishing site, the website is explicitly excluded from being presented in the virtual browser application environment 114 via an access control policy or by the virtual machine service provider 112, etc.), the browser extension application may automatically reject the request. However, if the browser extension application determines that migration of the browser tab to the virtual browser application environment 114 is permitted, the browser extension application may pass a request to the virtual machine service provider 112 to execute the URI of the website being presented within the selected browser tab within a new tab in the virtual browser application environment 114. This may cause the virtual machine service provider 112 to present the website, previously presented within the browser tab, within a new tab of the virtual browser application environment 114. In some instances, the browser extension application may further re-direct the authorized user 106 to website or web portal provided by the virtual machine service provider 112 to allow the authorized user 106 to access the website via the new tab of the virtual browser application environment 114 subject to any applicable access control policies and/or alerts.

In an embodiment, the browser extension application can further detect if the authorized user 106 is attempting to access a malicious or otherwise suspicious website through the browser application installed on its computing device 108. For example, if the authorized user 106 receives a phishing e-mail message from a suspicious entity (e.g., a scammer, etc.), and the authorized user 106 selects a hyperlink or other interaction element from the message that would otherwise direct the authorized user 106 to a phishing site, the browser extension application may intercept the request to access the phishing site. The browser extension application may evaluate the URI associated with the phishing site and determine whether there is a legitimate website that the suspicious entity is trying to spoof or otherwise imitate to trick the authorized user 106. For example, the browser extension application may process the URI associated with the phishing site against a repository of known URIs for legitimate websites to determine whether a legitimate website can be identified. In some embodiments, the browser extension application can process the phishing e-mail message to identify any elements associated with a legitimate entity (e.g., bank, retailer, etc.) that are being spoofed or misappropriated for the purpose of the phishing attack. Based on this identification of elements associated with a legitimate entity, the browser extension application may identify a legitimate website that the authorized user 106 may be re-directed to via the virtual browser application environment 114.

In an embodiment, to identify the elements associated with a legitimate entity from a phishing or other suspicious e-mail message and/or to identify a legitimate website based on evaluation of the suspicious URI included in the phishing or other suspicious e-mail message, the browser extension application can employ a machine learning algorithm or artificial intelligence. The machine learning algorithm or artificial intelligence may be trained using supervised training techniques. For instance, a dataset of messages, hyperlinks specified or otherwise associated with the messages, known elements associated with legitimate entities, and known URIs corresponding to these legitimate entities can be selected for training of the machine learning algorithm or artificial intelligence. The machine learning algorithm or artificial intelligence may be evaluated to determine, based on the sample inputs supplied to the machine learning algorithm or artificial intelligence, whether the machine learning algorithm or artificial intelligence is producing accurate URIs corresponding to the legitimate entity that the suspicious entity may be trying to spoof or otherwise imitate. Based on this evaluation, the machine learning model may be modified to increase the likelihood of the machine learning algorithm or artificial intelligence generating the desired results.

The machine learning algorithm or artificial intelligence employed by the browser extension application may further be dynamically trained by soliciting feedback from primary and authorized users. For instance, if the browser extension application re-directs a user, via the virtual browser application environment 114, to a legitimate website that is wholly unrelated to the elements associated with a legitimate entity presented in the phishing or other suspicious message, the user may provide feedback to the virtual machine service provider 112 indicating that the website the user was redirected to was not relevant or otherwise not useful to the user. The virtual machine service provider 112 may use this feedback to modify one or more coefficients of the machine learning algorithm or artificial intelligence to better identify a legitimate website associated with the elements associated with the legitimate entity being spoofed or imitated via the phishing or suspicious message. Similarly, a user may provide feedback regarding the ability of the machine learning algorithm or artificial intelligence to identify suspicious URIs from phishing or other suspicious messages. This feedback may be used to update the machine learning algorithm or artificial intelligence to better identify suspicious URIs and, in response, identify legitimate URIs corresponding to legitimate entities.

As noted above, if the browser extension application detects that the authorized user 106 is attempting to access a malicious or otherwise suspicious website through the browser application installed on its computing device 108, the browser extension application may re-direct the authorized user 106 to the virtual browser application environment 114 via the website provided by the virtual machine service provider 112. Through the virtual browser application environment 114, the browser extension application may cause the browser application implemented in the virtual browser application environment to access a legitimate website, as identified by the browser extension application. In some instances, access to the legitimate website may be subject to any access control policies applicable to the authorized user 106, as defined by the primary user 102. Further, the virtual machine service provider 112 may transmit any applicable alerts to the primary user 102, if applicable. In an embodiment, if the authorized user 106 is re-directed to the virtual browser application environment 114 as a result of the authorized user 106 having attempted to interact with a phishing or suspicious hyperlink within a message, the virtual machine service provider 112 can automatically transmit an alert to the primary user 102 to indicate that the authorized user 106 may have been the target of a phishing or other malicious attempt.

It should be noted that once the legitimate website has been presented via the virtual browser application environment 114, the browser extension application (as well as any other browser extension applications executing on the native browser application installed on computing device 108) is unable to discern any activity within the virtual browser application environment 114. For instance, because the virtual browser application environment 114 is presented via a viewer provided by the virtual machine service provider 112, operations occurring within the virtual browser application environment 114 are provided using graphical representations of the virtual browser application. Browser extension applications executing on the native browser application may be unable to parse these graphical representations to discern what operations are being performed by the virtual browser application, what elements are being presented within the virtual browser application, and the like. This may prevent the browser extension application, as well as any other third-party browser extension applications, from eavesdropping on a user's activities within the virtual browser application environment 114.

In an embodiment, when an authorized user 106 accesses the website or web portal provided by the virtual machine service provider 112 to access the virtual browser application environment 114, the virtual machine service provider 112 may automatically, and in real-time, determine network configuration information for the authorized user's computing device 108. For instance, if the computing device 108 has a static public IP address, the virtual machine service provider 112 may configure a reverse virtual private network (VPN) tunnel using the static public IP address such that network traffic generated via the virtual browser application environment 114 may be re-directed through the computing device 108 and the authorized user's Internet Service Provider (ISP). This may provide certain advantages. For instance, if a financial institution uses IP geolocation to determine a user's location and, based on this location, determine whether the user is accessing its account from a known or trusted location. By routing network traffic from the virtual browser application environment 114 via the authorized user's computing device 108, the financial institution may determine that the authorized user 106 is attempting to access its account from its known or trusted location rather than through a physical host maintained by the virtual machine service provider 112. This may prevent unnecessary fraud alerts being triggered from the financial institution's end, thereby disrupting the authorized user's experience.

Similarly, if the computing device 108 has a static IP address corresponding to an enterprise network through which one or more intranets are made available, the virtual machine service provider 112 may configure a reverse VPN tunnel using the static IP address corresponding to the enterprise network such that network traffic generated via the virtual browser application environment 114 may be re-directed through the computing device 108 to allow the user to access any intranets associated with the enterprise network through the virtual browser application environment 114.

Figure 2:
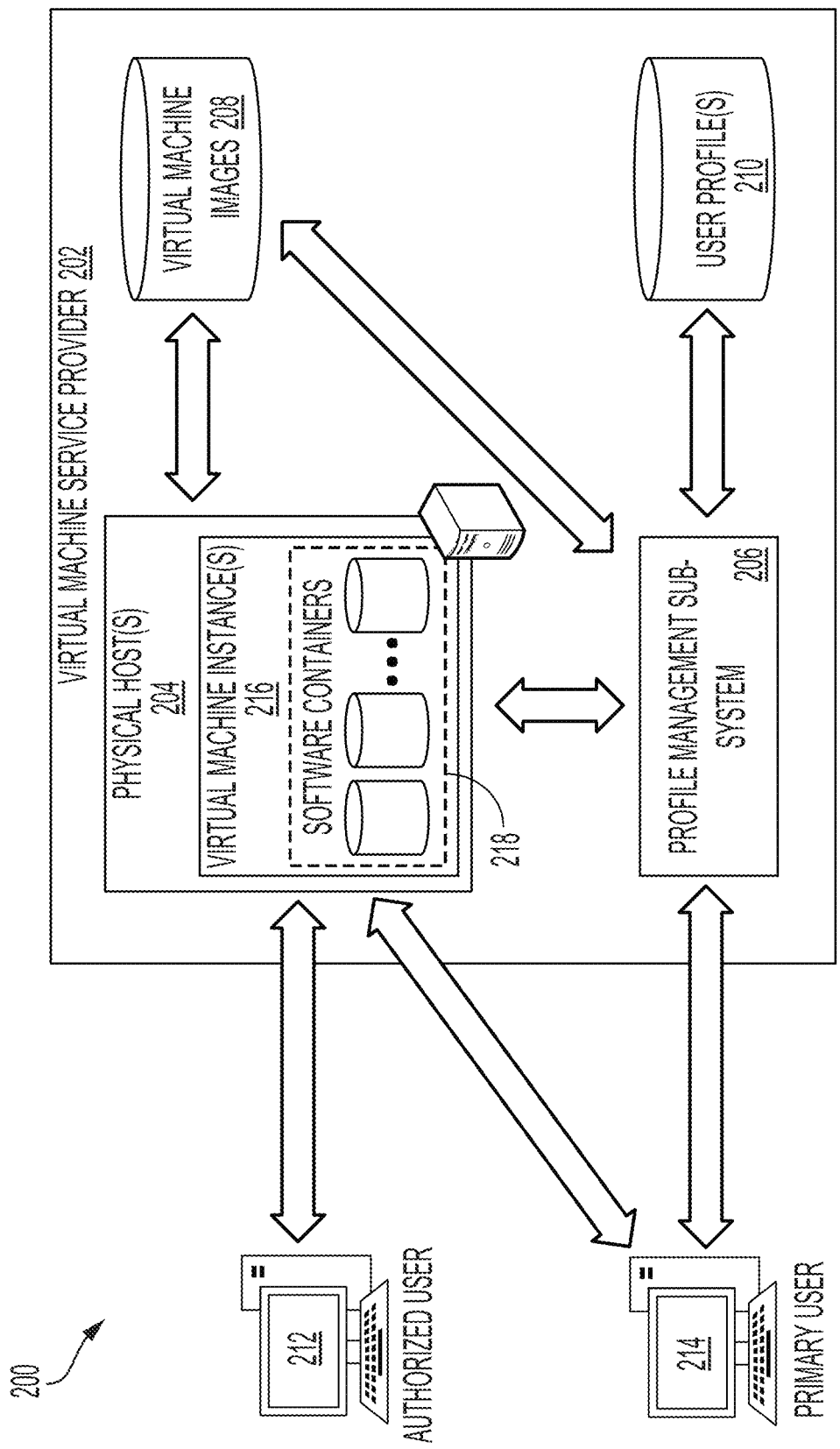
FIG. 2 shows an illustrative example of an environment in which a virtual machine service provider instantiates a virtual machine image on to a physical host to implement a virtual browser application environment for users in accordance with at least one embodiment.

FIG. 2 shows an illustrative example of an environment 200 in which a virtual machine service provider 202 instantiates a virtual machine image on to a physical host 204 to implement a virtual browser application environment for users 212, 214 in accordance with at least one embodiment. In the environment 200, a primary user 214 may submit a request to a profile management sub-system 206 of the virtual machine service provider 202 to instantiate a virtual browser application environment onto a physical host 204 maintained by the virtual machine service provider 202. The profile management sub-system 206 may be implemented using a computer system or as an application or other executable code implemented on a computer system of the virtual machine service provider 202. The profile management sub-system 206 may provide to the primary user 214 various configuration options for the virtual browser application environment that is to be instantiated. For instance, the profile management sub-system 206 may determine the available capacity for each of the physical hosts 204 maintained by the virtual machine service provider 202. Further, the profile management sub-system 206 may query a virtual machine image repository 208 to identify the available virtual machine images that may be used to instantiate the virtual browser application environment on to a physical host 204. Based on this information, the profile management sub-system 206 may determine which virtual machine images may be used to instantiate a virtual browser application environment on to a physical host having the available capacity to support the virtual browser application environment. The profile management sub-system 206 may present, to the primary user 214, the available virtual machine images that may be instantiated onto available capacity of the physical hosts 204 for a virtual browser application environment.

In some instances, the primary user 214 may provide, in its request to instantiate a virtual browser application environment onto a physical host 204, a set of configuration requirements for the virtual browser application environment. For instance, the primary user 214 may specify that the virtual browser application environment is to be supported by a virtual machine instance 216 having a minimum amount of random-access memory (RAM), a minimum number of vCPUs, minimum storage capacity, minimum amount of available bandwidth, and the like. Further, the primary user 214 may specify which browser application is to be implemented within the virtual browser application environment. For instance, the primary user 214 may specify that the virtual browser application environment is to implement a Google Chrome™ browser application as opposed to Microsoft Edge®, Mozilla Firefox®, or any other available browser application. Alternatively, the primary user 214 may specify that it is agnostic as to which browser application is implemented within the virtual browser application environment so long as the minimum configuration requirements are satisfied.

If the primary user 214 provides, to the profile management sub-system 206, a set of configuration requirements for the virtual browser application environment, the profile management sub-system 206 may determine whether these requirements may be satisfied using the available capacity of the physical hosts 204 and a virtual machine image that, when instantiated, provides the requires functionality requested by the primary user 214. For instance, the profile management sub-system 206 may determine, based on an evaluation of the physical hosts 204, the available capacity of the physical hosts 204 for instantiation of a virtual machine image. If the available capacity does not satisfy the primary user's configuration requirements, the profile management sub-system 206 may reject the request. Alternatively, the profile management sub-system 206 may queue the primary user's request until a physical host 204 becomes available that has sufficient available capacity to satisfy the primary user's configuration requirements.

In some instances, the profile management sub-system 206 may further query the virtual machine images repository 208 to identify any available virtual machine images that may be used to instantiate the virtual browser application environment on to a physical host 204 according to the primary user's configuration requirements. For instance, a virtual machine image may have a corresponding set of configuration requirements for instantiation, whereby these configuration requirements may represent an average level of performance for a virtual machine instance 216 instantiated using the virtual machine image. Thus, the profile management sub-system 206 may query the virtual machine images repository 208 to identify any virtual machine images that satisfy the primary user's configuration requirements. The profile management sub-system 206 may present these virtual machine images to the primary user 214 to allow the primary user 214 to select a virtual machine image that may be instantiated onto a physical host 204 to implement the virtual browser application environment.

As noted above, rather than providing configuration options that specify computing specifications for a virtual browser application environment, the virtual machine service provider 202, via the profile management sub-system 206, may provide configuration options that specify attributes that are specific to the virtual browser application environment. For example, a particular configuration option for a virtual browser application environment may indicate the number of browser tabs that may be available to the primary user 214 and any other authorized users 212 at a given time. Further, a particular configuration option may specify the capabilities of the virtual browser application environment, such as the resolution available for digital video streaming and the like. These configuration options may correspond to particular computing resource requirements (e.g., memory requirements, processor or vCPU requirements, storage capacity requirements, etc.). Thus, the profile management sub-system 206 may use the available capacity of the physical hosts 204 and the system requirements for the available virtual machine images to determine these configuration options that may be presented to the primary user 214.

If a physical host 204 is available for instantiation of a virtual machine image that can be used to implement a virtual browser application environment according to the primary user's configuration requirements (if any), the profile management sub-system 206 may obtain the virtual machine image from the virtual machine images repository 208 and instantiate the virtual machine image onto an available physical host 204. Further, the profile management sub-system 206 may associate the virtual machine instance 216 generated using the virtual machine image with the primary user's account. For instance, the profile management sub-system 206 may update the primary user's account within a user profile database 210 to provide an identification of the virtual machine instance 216 generated to implement the virtual browser application environment for the primary user 214. In some instances, this identification may include a unique identifier corresponding to the virtual machine instance 216, whereby the unique identifier may be generated automatically when the virtual machine image selected by the primary user 214 or by the profile management sub-system 206 on behalf of the primary user 214 is instantiated onto a physical host 204. Thus, when the primary user 214 logs into the virtual machine service provider 202 via the profile management sub-system 206, the profile management sub-system 206 may access the primary user's account from the user profile database 210 and identify the virtual machine instance 216 and, accordingly, the virtual browser application environment implemented for the primary user 214.

In an embodiment, the profile management sub-system 206 instantiates a virtual machine instance 216 utilized to implement the virtual browser application environment in a manner such that only the virtual browser application environment is accessible to the primary user 214 and to any other authorized users 212. As noted above, the virtual machine instance 216 may include an operating system, a browser application, and a variety of other applications that may be executed to support the browser application and any other functionality required for the implementation of the virtual browser application environment. The profile management sub-system 206 may restrict access to the virtual machine instance 216 instantiated for the virtual browser application environment such that the primary user 214 and any other authorized users 212 may only be able to access the virtual browser application environment.

In an embodiment, the virtual machine instance 216 is instantiated as a container instance that is configured to operate myriad software containers 218 according to the parameters of the virtual machine image. As noted above, the virtual machine instance 216 may include a set of software containers 218 that may execute in isolation from each other (e.g., a software container may have an isolated view of a file system, etc.). A software container 218 may operate under the virtual machine instance 216 and can include one or more applications or programs, data, system libraries, and the like. Further, when a software container 218 is executed, the one or more applications or programs executed therein may be isolated from other applications or programs being executed within the virtual machine instance 216. For instance, the myriad software containers 218 implemented in the virtual machine instance 216 may each operate on an operating system (using the computing resources allocated to the software container 218) in isolation from one another. For instance, the virtual browser application presented via the virtual browser application environment may be executed on a software container isolated from other processes operating within the virtual machine instance 216. The virtual machine instance 216 may implement a software container for the operating system, a software container that serves as a storage volume for downloads obtained via the virtual browser application, a software container for personal settings (e.g., settings defined by a primary user 214, setting specific to an authorized user 212, etc.), and the like.

The software container used to implement the virtual browser application may be configured to only have limited access to resources available via other software containers of the virtual machine instance 216. Thus, the software container may be executed to have access to only certain resources from the computing resources allocated for the virtual machine instance 216. Due to this isolation, a user of the virtual browser application environment may only be able to access and interact with the virtual browser application. This may prevent users from accessing the operating system, file systems, and other resources associated with the virtual machine instance, providing an additional layer of security for the virtual browser application environment.

Additionally, the software container used to implement the virtual browser application may be configured such that certain functionality of the virtual browser application is restricted or otherwise prohibited from use by the primary user 214, the authorized user 212, and any other users that may access the virtual browser application. As noted above, these users may be prohibited from installing any browser extensions onto the virtual browser application, accessing any developer tools or other tools that may usually be made available through browser applications, and inspecting any web elements or other elements presented or otherwise available via the virtual browser application.

As noted above, the virtual browser application environment may be made available to the primary user 214 via a website or web portal provided by the virtual machine service provider 202. When the primary user 214 accesses this website or web portal provided by the virtual machine service provider 202, the profile management sub-system 206 may prompt the primary user 214 to provide a set of credentials in order to access its account. The set of credentials may include a username, a corresponding password, a one-time password (such as through multi-factor authentication), a cryptographic key, a token, and the like. If the primary user 214 provides a set of credentials via the website or web portal, the profile management sub-system 206 may evaluate the set of credentials to determine whether the primary user 214 can be authenticated. If the primary user 214 is authenticated by the profile management sub-system 206, the profile management sub-system 206 may allow the primary user 214 to access its account from the user profile database 210 via the website or web portal.

In addition to enabling the primary user 214 to access its account and the virtual browser application environment via the website or web portal, the profile management sub-system 206 may allow the primary user 214 to designate other users, such as authorized user 212, as being permitted to access the virtual browser application environment along with the primary user 214. For instance, via the website or web portal, the primary user 214 may provide a user name and corresponding credentials for an authorized user 212 that the primary user 214 would like to be able to access the virtual browser application environment. In some instances, the primary user 214 may only be required to provide a unique code that may be provided to an authorized user 212 to enable the authorized user 212 to access the virtual browser application environment. In an embodiment, when the primary user 214 provides a series of alphanumeric and/or special characters that are to serve as a unique code for an authorized user 212, the profile management sub-system 206 can evaluate the provided series of alphanumeric and/or special characters to determine whether this series of characters is available. If the series of characters is available for use, the primary user 214 may designate this unique code for use by an authorized user 214. The profile management sub-system 206 may update the primary user's account within the user profile database 210 to associate this new unique code with the primary user's account and, hence, the virtual browser application environment associated with the primary user's account.

The primary user 214 may further interact with the profile management sub-system 206 to define one or more access control policies that may be associated with a unique code associated with the primary user's account. These access control policies may be used to determine the level of access to the virtual browser application environment by any authorized user 212 using the unique code. For instance, the primary user 214 may generate an access control policy that allows an authorized user 212 using the unique code to solely have read access to the virtual browser application environment. As another example, the primary user 214 may generate an access control policy that enables an authorized user 212 using the unique code to perform both read and write operations within the virtual browser application environment. The profile management sub-system 206 may further allow the primary user 214 to define a granular access control policy, through which the primary user 214 can define the level of access to the virtual browser application environment generally, as well as the level of access to particular websites or elements on websites. For example, the primary user 214 may define an access control policy whereby an authorized user 212 utilizing a particular unique code may have read and write access generally while only having read access within particular websites (e.g., websites associated with financial institutions, websites associated with sensitive user information, etc.). Thus, the profile management sub-system 206 may allow a primary user 214 to create and manage access control policies to tailor the level of access to the virtual browser application environment and to particular websites or elements of websites as needed. The profile management sub-system 206 may update the primary user's account within the user profiles database to associate these access control policies with corresponding unique codes designated by the primary user 214 for use by authorized users 212 to access the virtual browser application environment.

In an embodiment, a primary user 214 can define one or more access control policies to allow an authorized user 212 to generate a recording of its interactions within the virtual browser application environment. For instance, an authorized user 212, subject to an applicable access control policy, may generate screen clip recordings related to its interactions within the virtual browser application environment and with other users. In some instances, the primary user 214 may define a granular access control policy for generating such recordings. For example, an authorized user 212 may only be permitted to generate recordings while interacting with particular websites within the virtual browser application environment and/or to generate recordings corresponding to interactions with particular users. These recordings may be initiated via the authorized user's native browser application or within the virtual browser application environment.

In an embodiment, a primary user 214 can also request, via the profile management sub-system 206, creation of one or more bookmarks that may be made readily available to authorized users 212 when accessing the virtual browser application environment. As noted above, via the website or web portal provided by the virtual machine service provider 202, the primary user 214 may define one or more bookmarks corresponding to websites that may be of interest to the primary user 214 and any other authorized users 212. When the primary user 214 provides a URI of a target website and corresponding descriptor for a bookmark, the profile management sub-system 206 may add the URI and the corresponding descriptor to the primary user's account in the user profile database 210 as a new bookmark. Additionally, the virtual machine service provider 202, via the profile management sub-system 206, may allow the primary user 214 to further categorize its bookmarks such that an authorized user 212 may readily identify the category for a particular bookmark. When an authorized user 212 utilizes its unique code to access the virtual browser application environment associated with the primary user 214, the profile management sub-system 206 may access the primary user's account within the user profile database 210 to retrieve any bookmarks and associated categories from the primary user's account. The profile management sub-system 206 may update the website or web portal utilized by the authorized user 212 to access the virtual browser application environment to make these bookmarks and associated categories available to the authorized user 212.

The primary user 214 may further define, via the profile management sub-system 206, one or more intranets that may be accessible through the virtual browser application environment only when authorized users 212 access the virtual browser application environment within an enterprise network or other network through which the one or more intranets are available. For example, if an authorized user 212 is accesses the virtual browser application environment using a computing device having a static IP address corresponding to an enterprise network through which one or more intranets are made available, the virtual machine service provider 202 may configure a reverse VPN tunnel using the static IP address corresponding to the enterprise network such that network traffic generated via the virtual browser application environment may be re-directed through the computing device to allow the authorized user 212 to access any intranets associated with the enterprise network through the virtual browser application environment.

A primary user 214 may further define one or more alerts or other notifications that may be automatically generated by the profile management sub-system 206 in response to particular actions performed by authorized users 212 within the virtual browser application environment. For instance, a primary user 214 may define an alert whereby if an authorized user 212 accesses a particular website via the virtual browser application environment, the profile management sub-system 206 is to automatically transmit an alert or other notification to the primary user 214 regarding the access. As another illustrative example, a primary user 214 may define an alert whereby if an authorized user 212 accesses a particular website via the virtual browser application environment, the profile management sub-system 206 may provide the primary user 214 with one or more options for addressing the authorized user's access to the particular website (e.g., terminating access to the website, notifying the authorized user 212 with regard to this access, etc.). The profile management sub-system 206 may associate these alerts with corresponding unique codes within the primary user's account in the user profile database 210. Thus, when an authorized user 212 uses a unique code associated with the primary user's account to access the virtual browser application environment, the profile management sub-system 206 may obtain the corresponding alerts and actively monitor the authorized user's actions within the virtual browser application environment in real-time to determine whether an action performed by the authorized user 212 triggers an alert. If an alert is triggered, the profile management sub-system 206 may perform any action associated with the alert, as defined by the primary user 214.

In addition to defining access control policies and alerts that are to be associated with particular unique codes and/or authorized users 212, the primary user 214, via the profile management sub-system 206, may further define which authorized users 212 may simultaneously interact with one another via the virtual browser application environment. For instance, the profile management sub-system 206 may allow the primary user 214 to designate one or more tabs of the browser application implemented in the virtual browser application environment as being limited to particular users and/or unique codes. As an illustrative example, a primary user 214 may designate a particular tab of the browser application implemented in the virtual browser application environment as being accessible only by the primary user 214 and the authorized user 212. As another example, the primary user 214 may designate a particular tab of the browser application as being accessible only by the primary user 214 and any authorized users 212 utilizing a particular unique code or other set of credentials to access the virtual browser application environment. Any other user accessing the virtual browser application environment may be unable to access this particular tab or view any websites or information presented therein. Thus, the profile management sub-system 206 may automatically isolate particular users from other users within the virtual browser application environment without exposing any information and data from these other users to the particular users and vice versa.

In an embodiment, when an authorized user 212 accesses the website or web portal provided by the virtual machine service provider 202 to access the virtual browser application environment, the profile management sub-system 206 may prompt the authorized user 212 to provide its unique code and/or any other credentials provided by the primary user 214 or by the profile management sub-system 206 on behalf of the primary user 212. Once the authorized user 212 has provided its unique code and/or any other credentials to the profile management sub-system 206 via the website or web portal, the profile management sub-system 206 may query the user profile database 210 to determine whether the provided unique code and/or other credentials are associated with a primary user's account. If the profile management sub-system 206 identifies a primary user's account using the provided unique code and/or set of credentials, the profile management sub-system 206 may identify, from the account, a corresponding identifier for the primary user's virtual browser application environment. Using this identifier, the profile management sub-system 206 may update the viewer provided via the website or web portal to enable the authorized user 212 to access the virtual browser application environment implemented on a physical host 204 of the virtual machine service provider 202 subject to any access control policies defined by the primary user 214.

As the authorized user 212 interacts with the browser application within the virtual browser application environment, the profile management sub-system 206 may continuously, and in real-time, monitor these interactions and the access control policies to ensure that the authorized user 212 is performing operations within the virtual browser application environment consistent with the access control policies. For instance, if the authorized user 212, by virtue of an access control policy, is solely authorized to perform read operations within the virtual browser application environment, the profile management sub-system 206 may actively restrict the authorized user's ability to interact with any interaction elements of the browser application executed within the virtual browser application environment, as well as restrict the authorized user's ability to access other websites via the browser application, input text into input fields on a website presented via the virtual browser application environment, and the like. Additionally, the profile management sub-system 206 may actively, and in real-time, apply specific access control policies as the authorized user 212 interacts with the virtual browser application environment. For instance, if the authorized user 212 attempts to access a particular website, the profile management sub-system 206 may evaluate the access control policies defined for the authorized user 212 to determine what access controls (if any) are to be applied within the particular website.

In addition to applying any applicable access control policies, the profile management sub-system 206 may also dynamically, and in real-time, monitor interactions of the authorized user 212 with the virtual browser application environment to detect triggering of any alerts generated by the primary user 214, as defined in the primary user's account. For instance, as the authorized user 212 interacts with the browser application via the virtual browser application environment, the profile management sub-system 206 may determine whether an action performed by the authorized user 212 corresponds to a triggering event indicated in one or more alerts defined by the primary user 214. If so, the profile management sub-system 206 may evaluate the one or more alerts to determine what action(s) are to be taken in response to the authorized user's interaction with the browser application via the virtual browser application environment. As noted above, these actions may include notifying the primary user 214 of the authorized user's access to the particular website, terminating authorized user access to the particular website, prompting the primary user 214 to provide instructions or to select an option corresponding to actions that may be performed by the profile management sub-system 206 in response to the authorized user's access to the particular website, and the like.

Figure 3:
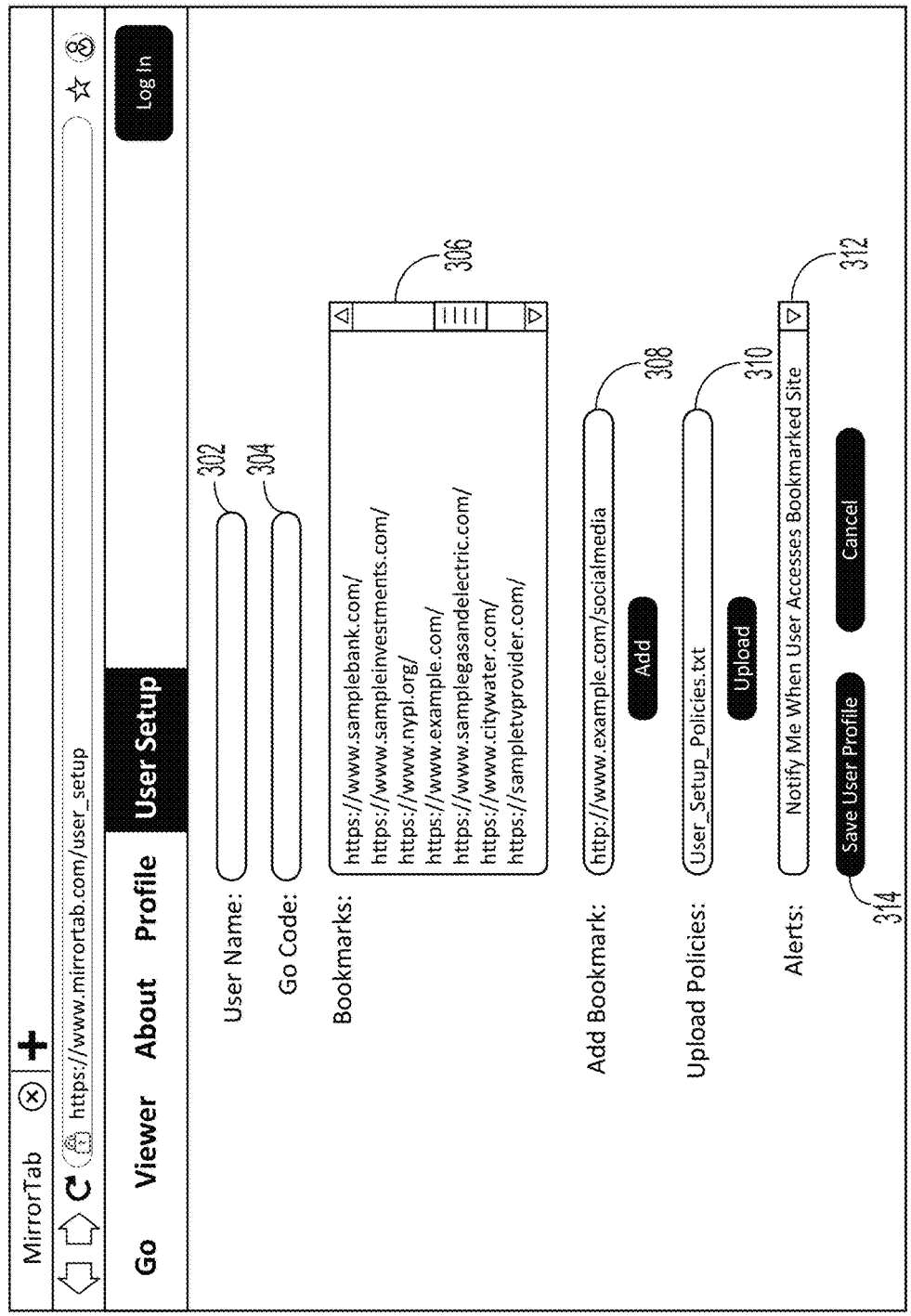
FIG. 3 shows an illustrative example of a browser application through which a primary user can generate profiles for authorized users for collaboration within a virtual browser application environment in accordance with at least one embodiment.

FIG. 3 shows an illustrative example of a browser application 300 through which a primary user can generate profiles for authorized users for collaboration within a virtual browser application environment in accordance with at least one embodiment. As illustrated in FIG. 3, a primary user may access the virtual machine service provider via a website or web portal provided by the virtual machine service provider using browser application 300. Through the website or web portal provided by the virtual machine service provider, the primary user may generate a user profile for an authorized user that may be granted access to a virtual browser application environment implemented by the virtual machine service provider on behalf of the primary user.

As illustrated in FIG. 3, via a user setup tab of the website or web portal, the primary user may provide a proposed user name for an authorized user via a user name input field 302. Through the user name input field 302, the primary user may provide a string of alphanumeric and/or special characters that may be assigned to a particular authorized user for accessing the primary user's virtual browser application environment. In an embodiment, as the primary user enters a string of alphanumeric and/or special characters via the user name input field 302, the virtual machine service provider may, in real-time, determine whether the entered string of alphanumeric and/or special characters is available for use as a unique user name for the authorized user. If the provided string of alphanumeric and/or special characters is available, the virtual machine service provider may update the user setup interface via the website or web portal to indicate that provided alphanumeric and/or special characters can be used as a user name for the authorized user.

In addition to providing a user name for the authorized user via the user name input field 302, the primary user may provide a proposed unique code (e.g., "Go Code") for an authorized user via a unique code input field 304. As noted above, a primary user may define a unique code that may be provided to an authorized user to enable the authorized user to access the virtual browser application environment. Similar to the user name described above, a unique code may comprise a series of alphanumeric and/or special characters. In an embodiment, as the primary user provides a series of alphanumeric and/or special characters that are to serve as a unique code for an authorized user via the unique code input field 304, the virtual machine service provider can dynamically and in real-time evaluate the provided series of alphanumeric and/or special characters to determine whether this series is available (e.g., not in use by other users of the virtual machine service provider). If the series is available for use, the virtual machine service provider may update the user setup interface via the website or web portal to indicate that provided alphanumeric and/or special characters can be used as a unique code for the authorized user.

It should be noted that both a user name and unique code are not required for each authorized user that is to be granted access to the virtual browser application environment. For instance, the virtual machine service provider may allow a primary user to generate a unique code that may be provided to a plurality of authorized users for accessing the virtual browser application environment without need to provide, for each authorized user, a unique user name. Alternatively, the virtual machine service provider may allow a primary user to generate a unique user name for each authorized user without need to generate a unique code for each authorized user. An authorized user associated with a particular user name may be invited to generate a set of credentials for authentication of the authorized user by the virtual machine service provider. In some instances, the virtual machine service provider may allow the primary user to assign user names to different unique codes, such that a first set of authorized users may be associated with a first unique code while a second set of authorized users may be associated with a second unique code. This may provide the primary user to define groupings of authorized users and define specific access control policies for each grouping of authorized users, as described herein.

The virtual machine service provider may further provide, via the website or web portal accessible using the browser application 300, an available bookmarks window 306. Through the available bookmarks window 306, the virtual machine service provider may provide the URIs corresponding to the websites designated by the primary user as bookmarks that are presented to authorized users. In some instances, the available bookmarks window 306 may further specify a descriptor for each URI represented in the available bookmarks window 306. For example, for the URI "www.samplebank.com" presented in the available bookmarks window 306, the virtual machine service provider may also present the corresponding descriptor of "Sample Bank Home Page." In some instances, if a bookmark has been assigned to a particular category, the virtual machine service provider may present, via the available bookmarks window 306, an identifier corresponding to the particular category that the bookmark is assigned to. An authorized user, as described in greater detail herein, may be presented with the bookmarks provided in the available bookmarks window 306 using the corresponding descriptors and organized according to the categories to which these bookmarks are assigned.

To add a bookmark to the available bookmarks window 306, a primary user may utilize an add bookmark input field 308 provided by the virtual machine service provider via the website or web portal to submit a new bookmark (e.g., URI corresponding to a website, a descriptor for the website, a category designation for the bookmark, etc.). Through the add bookmark input field 308, the primary user may input a URI corresponding to a website that is to be added as a new bookmark for the authorized user. In an embodiment, when a primary user submits a new URI that is to be added as a bookmark, the virtual machine service provider can evaluate the URI to determine whether the URI is associated with a restricted website (e.g., a malicious website, a suspicious website, a website listed on a blacklist, etc.). If the submitted URI is associated with a restricted website, the virtual machine service provider may reject the provided URI and may not update the available bookmarks window 306 to include the URI. However, if the URI is permissible, the virtual machine service provider may add the new bookmark to the available bookmarks window 306. In an embodiment, the virtual machine service provider implements a computer system that serves as an isolated sandbox environment or honeypot for evaluation of submitted URIs. Through this computer system, the virtual machine service provider may access the website associated with the URI and determine whether the website includes one or more suspicious elements (e.g., malware, spam, etc.) that may be detrimental to user experience. If the virtual machine service provider determines that a website includes any suspicious elements, the virtual machine service provider can automatically reject the provided URI.

The virtual machine service provider may further provide, via the website or web portal accessible using the browser application 300, an access control policy upload field 310, through which a primary user may upload or otherwise define a set of access control policies for an authorized user. As noted above, a primary user may define one or more access control policies that may be associated with a unique code and/or authorized user to determine the level of access to the virtual browser application environment by users utilizing the unique code and/or the authorized user. The primary user may define one or more access control policies using a data structure (e.g., a JavaScript Object Notation (JSON) data structure, an Extensible Markup Language (XML) data structure, etc.) that may be uploaded to the virtual machine service provider to implement the defined access control policies for the unique code and/or authorized user. For instance, if the primary user selects the "Upload" button (as illustrated in FIG. 3), the virtual machine service provider may allow the primary user to select a file or document that includes the data structure to be used to define the one or more access control policies.

In an embodiment, if the primary user provides one or more access control policies for a unique code and/or authorized user, the virtual machine service provider can evaluate the one or more access control policies to identify any potential policy conflicts. For instance, if a primary user generates a first access control policy that is configured to prevent an authorized user from performing write operations within a category of websites (e.g., websites associated with financial institutions, etc.) and a second access control policy that is configured to allow the authorized user to perform write operations within a website belonging to the category of websites (e.g., a website specific to a particular financial institution, etc.), the virtual machine service provider may detect a conflict between these access control policies. In an embodiment, the virtual machine service provider can provide, via the website or web portal presented on the browser application 300, a notification indicating the conflict. This may allow the primary user to address the access control policy conflict. Alternatively, in an embodiment, the virtual machine service provider may automatically resolve the conflict using one or more conflict resolution rules. For instance, the virtual machine service provider may automatically implement the more restrictive access control policy, thereby erring on the side of caution to prevent undesired access to websites by an authorized user via the virtual browser application environment.

It should be noted that the virtual machine service provider may provide, via the website or web portal, an interface through which the primary user may define access control policies that may be associated with a unique code and/or authorized user. For instance, in addition to (or in place of) the access control policy upload field 310, the virtual machine service provider may provide an input field (not shown) through which the primary user may define one or more access control policies. As the primary user defines these one or more access control policies, the virtual machine service provider may dynamically, and in real-time, evaluate the access control policies to identify any possible conflicts and apply one or more conflict resolution rules, as needed.

In addition to defining one or more access control policies that are to be associated with a unique code and/or authorized user, the virtual machine service provider may further provide an alerts selection drop down menu 312 through which the primary user may define one or more alerts. As noted above, a primary user can define one or more alerts or other notifications that may be generated in response actions performed by an authorized user within the virtual browser application environment. In an embodiment, the virtual machine service provider can provide, via the alerts selection drop down menu 312, various alert options for when an authorized user accesses any of the bookmarks specified in the available bookmarks window 306. For instance, as illustrated in FIG. 3, the primary user may specify that it is to be notified when an authorized user accesses a bookmarked website. The virtual machine service provider may further provide the primary user, via the alerts selection drop down menu 312, with an option to be provided with one or more options for addressing user access to a bookmarked website. These one or more options may include transmitting a notification to the authorized user with regard to the access to the particular website, directing the primary user to the virtual browser application environment to interact with the authorized user within the virtual browser application environment, and the like.

It should be noted that the virtual machine service provider may provide additional and/or alternative elements via the website or web portal through which the primary user may define one or more alerts or other notifications that are to be generated in response to actions performed by an authorized user. For instance, the virtual machine service provider may allow the primary user, via website or web portal, to generate customized alerts and corresponding actions to be performed by the virtual machine service provider for actions performed by an authorized user on different bookmarked websites or other websites as identified by the primary user. For instance, a primary user may define an alert whereby if an authorized user accesses a particular website via the virtual browser application environment, the virtual machine service provider may transmit an alert or other notification to the primary user to inform the primary user of the authorized user's access to the particular website. This may allow the primary user to generate customized alerts for any number of websites accessed via the virtual browser application environment, as well as what actions are to be performed by the virtual machine service provider in response to triggering of these customized alerts.

Once the primary user has defined, via the website or web portal provided by the virtual machine service provider, an authorized user, the primary user may select a save user profile button 314 to generate a user profile corresponding to the provided user name, unique code, or combination of user name and unique code. The virtual machine service profile may associate this new user profile with the primary user's account such that, when an authorized user utilizes the user name and/or unique code to access the virtual browser application environment via a website or web portal provided by the virtual machine service provider, the virtual machine service provider may use the provided user name and/or unique code to access the primary user's account and identify the corresponding virtual browser application environment implemented for the benefit of the primary user and any designated authorized users. Further, using the provided user name and/or unique code, the virtual machine service provider may identify the access control policies that are to be applied to the authorized user and the various bookmarks that may be presented to the authorized user.

Figure 4:
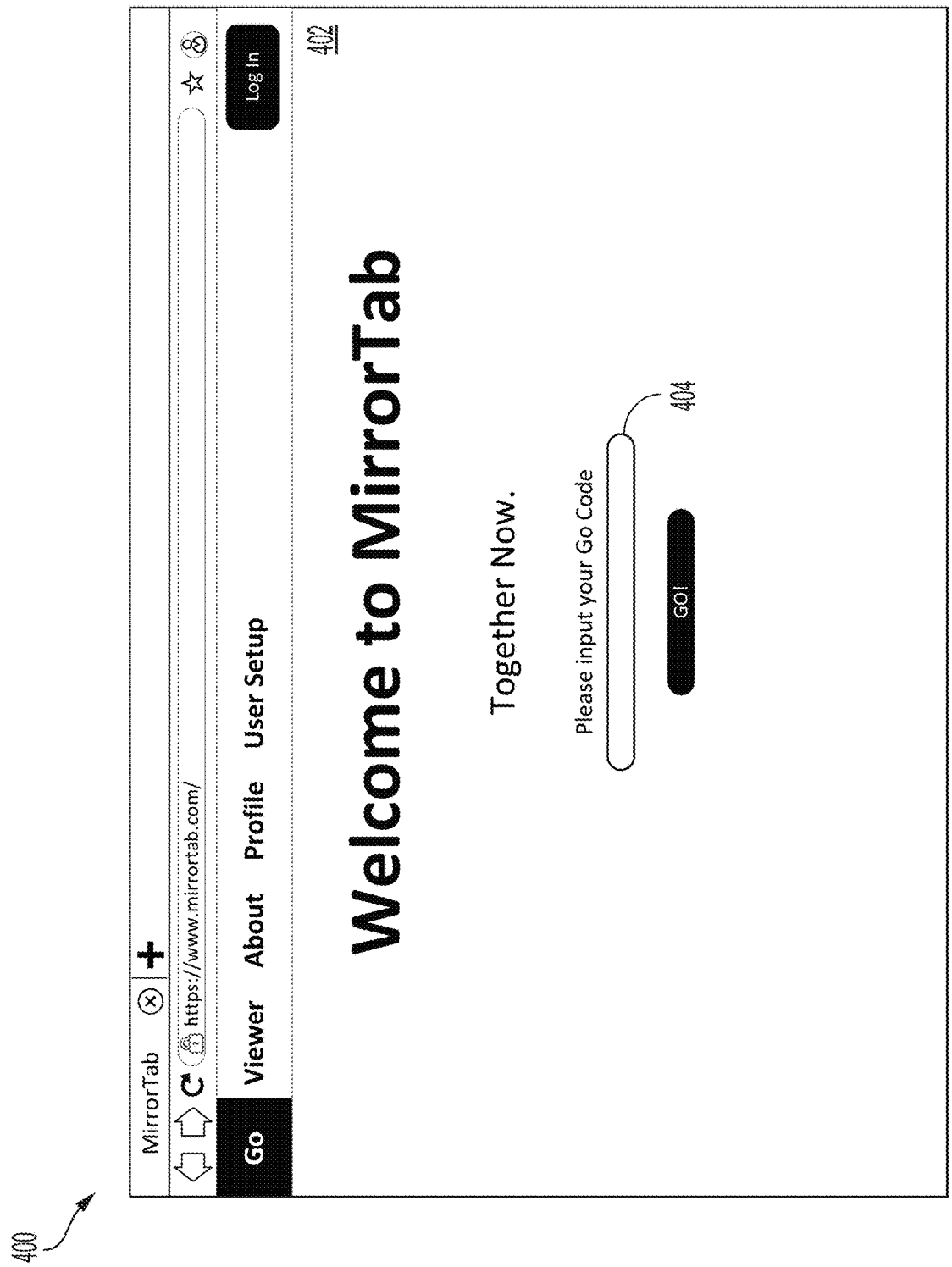
FIG. 4 shows an illustrative example of a browser application through which an authorized user can input one or more credentials to access a virtual browser application environment provided by a primary user in accordance with at least one embodiment.

FIG. 4 shows an illustrative example of a browser application 400 through which an authorized user can input one or more credentials to access a virtual browser application environment provided by a primary user in accordance with at least one embodiment. The browser application 400 may be implemented and executed from a computing device utilized by an authorized user. For instance, an authorized user may execute the browser application 400 from a laptop computer, desktop computer, mobile device (e.g., smartphone, etc.), a virtual machine instance implemented on a remote computing device, and the like. The browser application 400 may be any available commercially available browser applications such as Google Chrome™ Microsoft Edge®, Mozilla Firefox®, and the like.

Through the browser application 400, an authorized user may access a website or web portal provided by the virtual machine service provider. For instance, an authorized user, via the browser application 400, may enter the URI of the website or web portal (e.g., "https://www.mirrortab.com" as illustrated in FIG. 4) to navigate to the website or web portal provided by the virtual machine service provider. Upon navigating to the website or web portal, the authorized user may be presented with a welcome page 402 through which the authorized user may submit a unique code and/or other set of credentials to access a virtual browser application environment implemented on behalf of a primary user. As illustrated in FIG. 4, the welcome page 402 may include a unique code input field 404 through which the authorized user may enter its unique code. As noted above, an authorized user may be provided with a unique code and/or any other credentials for accessing the virtual browser application environment. For instance, the primary user for which the virtual browser application environment is implemented may provide the unique code and/or any other credentials to the authorized user once a new user profile for the authorized user or corresponding to the unique code is created. Alternatively, the virtual machine service provider may provide the unique code and/or any other credentials to the authorized user on behalf of the primary user through a notification to the authorized user, such as through an e-mail message, a text or other SMS or MMS message, and the like. The notification from the virtual machine service provider may include the unique code and/or any other credentials, as well as instructions for accessing the virtual browser application environment via the website or web portal provided by the virtual machine service provider.

If the authorized user submits, via the unique code input field 404, a unique code for accessing the virtual browser application environment implemented on behalf of a primary user, the virtual machine service provider may determine whether the provided unique code is authentic. For instance, using the submitted unique code, the virtual machine service provider may query a user profile database (e.g., user profile database 210, as illustrated in FIG. 2) to determine whether the submitted unique code is associated with an account of a primary user. As noted above, when a primary user defines a unique code that can be used by one or more authorized users to access the primary user's virtual browser application environment, the virtual machine service provider may update the primary user's account within the user profile database to associate this new unique code with the primary user's account and, hence, the virtual browser application environment associated with the primary user's account. Thus, the submitted unique code may be used to determine whether the unique code is associated with a primary user's account. If the submitted unique code is not associated with a primary user's account, the submitted unique code may be rejected and access to a virtual browser application environment is denied.

If the submitted unique code is valid (e.g., the unique code is associated with a primary user's account), the virtual machine service provider may evaluate the corresponding primary user's account to determine which virtual browser application environment has been implemented for the primary user associated with the unique code. As noted above, an identification of the virtual machine instance generated to implement the virtual browser application environment for a primary user may be added to the primary user's account once the virtual browser application environment has been implemented via instantiation of the virtual machine instance on a physical host. This identification may include a unique identifier corresponding to the virtual machine instance, whereby the unique identifier may be generated automatically when the virtual machine image selected by the primary user or by virtual machine service provider on behalf of the primary user is instantiated onto a physical host. Thus, when an authorized user provides a valid unique code via the unique code input field 404, the virtual machine service provider may access the primary user's account from the user profile database and identify the virtual machine instance and, accordingly, the virtual browser application environment implemented for the primary user.

In addition to identifying the virtual browser application environment that is to be presented to the authorized user, the virtual machine service provider may identify any applicable access control policies that are to be used to control the authorized user's access to the virtual browser application environment, as well as to particular websites via the virtual browser application environment. As noted above, a primary user may define a set of access control policies that may be associated with one or more unique codes. Thus, using the submitted unique code, the virtual machine service provider may process the primary user's account to identify any access control policies that are associated with the unique code provided by the authorized user. Further, the virtual machine service provider may use the submitted unique code to identify any alerts or other notifications that may be generated in response to actions performed by authorized users associated with the unique code within the virtual browser application environment. These alerts may be used to notify the primary user of particular actions performed by authorized users within the virtual browser application environment, as well as to provide the primary user with opportunities to address these actions as needed.

Figure 5:
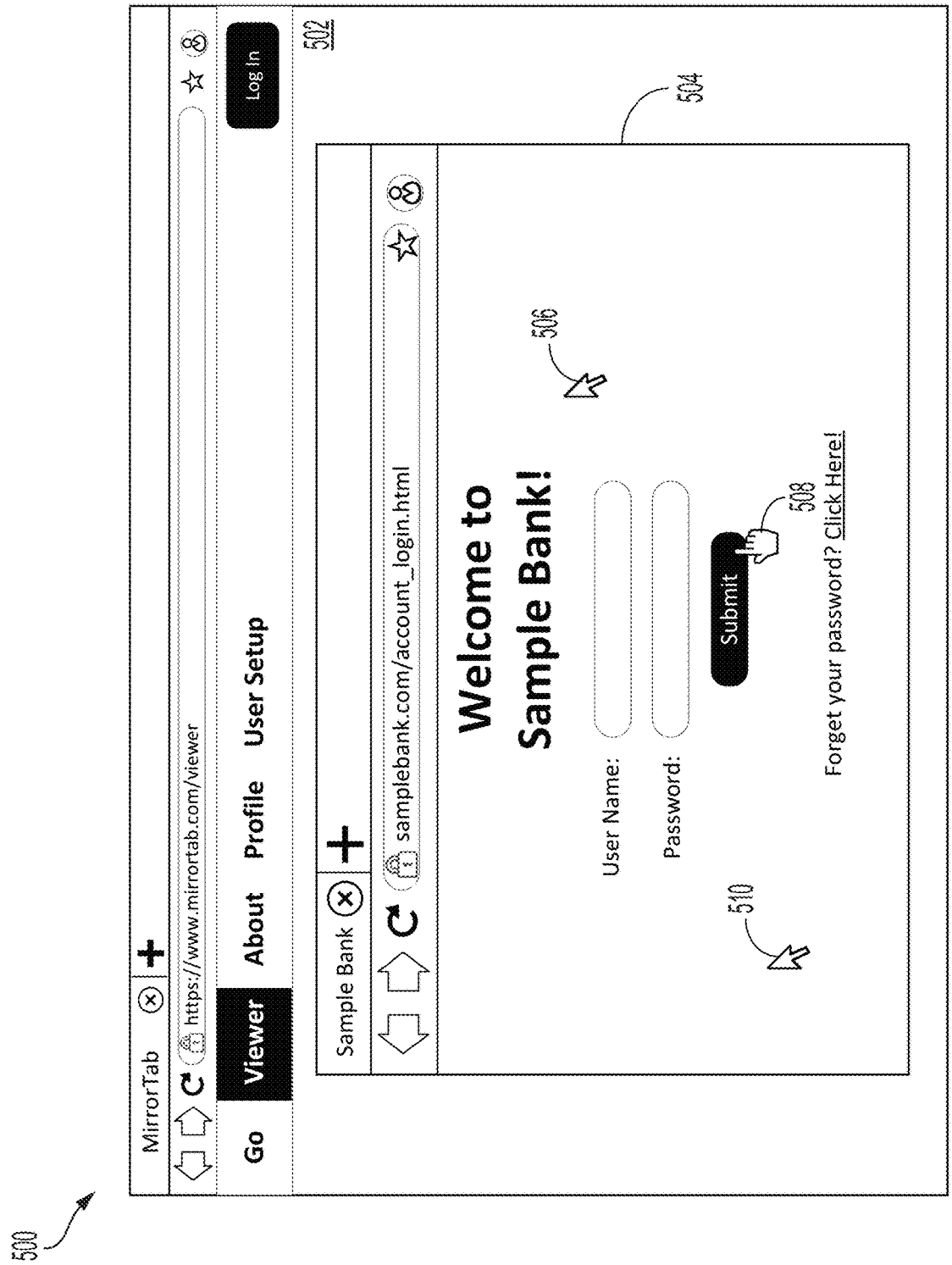
FIG. 5 shows an illustrative example of a browser application through which an authorized user may securely access the virtual browser application environment and collaborate with other authorized users in accordance with at least one embodiment.

FIG. 5 shows an illustrative example of a browser application 500 through which an authorized user may securely access the virtual browser application environment and collaborate with other authorized users in accordance with at least one embodiment. The browser application 500 may be similar to the browser application 400 described above in connection with FIG. 4. For instance, an authorized user may utilize the browser application 500 to access a website or web portal provided by the virtual machine service provider to access a virtual browser application environment implemented on behalf of a primary user. In an embodiment, when an authorized user submits a valid unique code or other credentials associated with a primary user's account, the virtual machine service provider can redirect the authorized user, via the browser application 500, to a viewer page 502 of the website or web portal provided by the virtual machine service provider. The viewer page 502 may include a virtual browser application environment viewer 504, through which the authorized user may access and view the virtual browser application environment using its browser application 500. The virtual browser application environment viewer 504 may be implemented as an application or other executable code that is executed on viewer page 502 to access virtual browser application environments implemented using virtual machine instances. When an authorized user is redirected to the viewer page 502, the virtual machine service provider may execute the virtual browser application environment viewer 504 using the identifier corresponding to the primary user's virtual machine instance used to implement the virtual browser application environment.

The virtual browser application environment viewer 504 may be implemented to restrict access to the virtual machine instance instantiated for the virtual browser application environment such that the primary user and any other authorized user (as designated by the primary user) may only be able to access the virtual browser application environment (e.g., the virtual browser application) via the virtual browser application environment viewer 504. This may prevent the primary user or any other authorized user from accessing the operating system or any other application or functionality of the virtual machine instance not related to the virtual browser application environment. Further, the virtual browser application environment viewer 504 may be implemented to prohibit the primary user or any other authorized user from taking advantage of certain functionality of the virtual browser application. As noted above, this may include prohibiting the primary user or any other authorized user from installing browser extensions onto the virtual browser application, accessing any developer tools or other tools implemented by the virtual browser application, or inspecting any web elements or other elements presented or otherwise available through the virtual browser application.

Through the virtual browser application environment viewer 504, an authorized user may access and interact with the virtual browser application subject to any applicable access control policies and/or alerts. The virtual browser application may be functionally similar to browser application 500. For instance, via the virtual browser application, an authorized user may enter the URI of a website or web portal to navigate to the corresponding website or web portal. Further, using a cursor 508, an authorized user may interact with various elements presented within the virtual browser application subject to any applicable access control policies and/or alerts. As noted above, as the authorized user interacts with the virtual browser application within the virtual browser application environment, the virtual machine service provider may continuously, and in real-time, monitor these interactions and the access control policies to ensure that the authorized user is performing operations within the virtual browser application environment consistent with these access control policies. For instance, if the authorized user, by virtue of an access control policy, is solely authorized to perform read operations within the virtual browser application environment, the virtual machine service provider may actively restrict the authorized user's ability to interact with any interaction elements of the virtual browser application executed within the virtual browser application environment, as well as restrict the authorized user's ability to access other websites via the virtual browser application, input text into input fields on a website presented via the virtual browser application environment, and the like.

In addition to enforcing the aforementioned access control policies for the authorized user during its interaction with the virtual browser application via the virtual browser application environment viewer 504, the virtual machine service provider can actively, and in real-time, apply specific access control policies as the authorized user interacts with the virtual browser application. For instance, if the authorized user attempts to access a particular website, the virtual machine service provider may evaluate, in real-time, the access control policies applicable to the authorized user to determine what access controls (if any) are to be applied within the particular website. Once the authorized user exits the particular website, any policies specific to the particular website and imposed on the authorized user may be lifted or modified according to any other applicable access control policies.

The virtual machine service provider may further dynamically, and in real-time, monitor interactions of the authorized user with the virtual browser application via the virtual browser application environment viewer 504 to detect any actions that may trigger an alert generated by the primary user. For instance, as the authorized user interacts with the virtual browser application via the virtual browser application environment viewer 504, the virtual machine service provider may determine whether an action performed by the authorized user corresponds to one or more alerts defined by the primary user. If the action is detected, the virtual machine service provider may evaluate the one or more alerts to determine what action(s) are to be taken in response to the authorized user's action within the virtual browser application. As noted above, these actions may include notifying the primary user of the authorized user's action, terminating authorized user access to particular website(s), prompting the primary user to provide instructions or to select an option corresponding to actions that may be performed by the virtual machine service provider in response to the authorized user's action, and the like.

As noted above, the authorized user may interact with other authorized users, including the primary user, simultaneously and in real-time via the virtual browser application. For instance, the virtual browser application environment may be implemented to accommodate 1:0 interactions (a single user privately using the virtual browser application), 1:1 interactions (e.g., an authorized user interacting with a primary user or another authorized user using the virtual browser application), and 1:N interactions (e.g., an authorized user interacting with any number of other authorized and primary users using the virtual browser application). As an illustrative example, while an authorized user is interacting with a particular website via the virtual browser application, the primary user (or any other authorized users) may also access the virtual browser application via their own local browser application (such as through accessing the website or web portal provided by the virtual machine service provider) and interact with the particular website along with the authorized user. Each user simultaneously interacting with the virtual browser application may be represented using a cursor 506-510. For example, as illustrated in FIG. 5, the primary user may be represented within the virtual browser application environment viewer 504 using cursor 506, whereas the authorized user may be represented within the virtual browser application environment viewer 504 using cursor 508. Further, as illustrated in FIG. 5, an additional authorized user may be represented within the virtual browser application view 504 using cursor 510. Each cursor 506-510 may be unique to allow users to immediately discern which cursor 506-510 they control. For instance, a cursor may have a unique coloration, shape, or other characteristic that is unique to the corresponding user. In some instances, a cursor may be accompanied by an identifier corresponding to the user associated with the cursor.

Since the virtual machine service provider allows for simultaneous interaction amongst authorized users (including the primary user) within the virtual browser application, an authorized user may be provided with assistance from other authorized users and/or the primary user as needed. For example, a primary user may interact with an authorized user within a website accessed using the virtual browser application to help the authorized user navigate through the website. Further, the primary user may supply information that may not be known to the authorized user (e.g., passwords, account information, etc.) to provide the authorized user with access to particular websites or features of websites (e.g., retirement account information, utilities accounts, etc.) via the virtual browser application. Using an illustrative example described above, if the primary user is a caregiver for the authorized user, whereby the primary user may maintain credentials for various accounts of the authorized user, the primary user and the authorized user may simultaneously access the virtual browser application through their respective browser applications (e.g., browser application 500 as used by the authorized user, etc.) to access a particular website associated with the authorized user's retirement account via the virtual browser application. The primary user, through the virtual browser application, may input the authorized user's credentials for accessing the authorized user's retirement account. Once access is gained to the authorized user's retirement account, both the primary user and the authorized user may review the authorized user's retirement account via the virtual browser application. As another illustrative example, if the authorized user requires troubleshooting assistance for a particular issue, the primary user and the authorized user may simultaneously access the virtual browser application through their respective browser applications (e.g., browser application 500 as used by the authorized user, etc.), through which the primary user may navigate the authorized user to one or more websites or provide a demonstration through navigation of the virtual browser application for resolution of the issue. The authorized user may, in real-time, view the operations performed by the primary user through the virtual browser application environment viewer 504 and gain an understanding of how to address their issue.

As another illustrative example, a primary user may interact with one or more authorized users within a website accessed using the virtual browser application to collaboratively plan a vacation or other travel. For instance, a primary user and one or more authorized users may access the virtual browser application to review different flight options, lodging options, and/or activities that the users may be interested in for an upcoming vacation. When the users have agreed upon a vacation plan, the primary user may proceed with any purchases and reservations for the upcoming vacation, while the other authorized users monitor the primary user completing these purchases and reservations in real-time.

As yet another illustrative example, if the authorized user is attempting to resolve an issue related to a particular website, the authorized user may be directed, by a support technician associated with the particular website, to the virtual browser application implemented on behalf of the entity that has provided the particular website (e.g., a financial institution associated with a financial institution website, etc.). Through the virtual browser application, the support technician may interact with the authorized user via the particular website to attempt to resolve the authorized user's issue. If the support technician requires the help of a supervisor or of a different support technician, the support technician can invite the supervisor and/or different support technician to the virtual browser application to interact with both the support technician and the authorized user in addressing the authorized user's issue. Thus, using the virtual browser application, an entity may provide multi-tier support for customers and interact with these customers in real-time to address their issues.

In an embodiment, the virtual machine service provider can provide a primary user, via a virtual browser management interface accessible through the website or web portal provided by the virtual machine service provider, with a virtual browser management interface for its virtual browser application environments. Through the virtual browser management interface, the primary user may be presented with graphical representations of each of the different virtual browser applications that may be made available to different authorized users associated with the primary user. For instance, the primary user may implement a virtual browser application for a particular set of authorized users, whereas a different virtual browser application may be implemented for other authorized users. In some instances, the primary user may implement different virtual browser applications for different purposes. For example, a primary user may implement a virtual browser application specifically for use by authorized users to interact with financial institutions and a separate virtual browser application specifically for use by authorized users to interact with one or more health services. Through the virtual browser management interface, the primary user may monitor authorized user interactions within each virtual browser application in real-time. Further, the primary user may select a graphical representation of a particular virtual browser application to access the virtual browser application and interact with any authorized users therein.

As an illustrative example, a supervisor can be provided with a virtual browser management interface, through which the supervisor can be presented with graphical representations of each of the different virtual browser applications utilized by support technicians under the supervision of the supervisor. This may allow the supervisor to monitor support technician interactions with customers via their respective virtual browser applications. Further, through the virtual browser management interface, the supervisor may select a graphical representation of a particular virtual browser application to access the particular virtual browser application to interact with both the support technician and the customer (e.g., authorized user) engaged with the support technician to address the customer's issue. In some instances, the supervisor can record any session within a virtual browser application for training purposes, to record actions taken to resolve a customer's issue, and the like.

As another illustrative example, an instructor (e.g., teacher, professor, etc.) can be provided with a virtual browser management interface, through which the instructor can be presented with graphical representations of the different virtual browser applications utilized by each individual student to interact with different training tools (e.g., teaching exercises, sample problems, models, etc.). The instructor, via the virtual browser management interface, may review each individual virtual browser application to determine each student's progress and identify any student that may require assistance. If a student requires assistance, the instructor may select, from the virtual browser management interface, the student's virtual browser application to access this virtual browser application and interact with the student. Similar to the illustrative example above for the supervisor, the instructor can also record any session within a virtual browser application and provide the recording to the corresponding student for its review. This may help students understand their performance and revisit any interactions made by the student and the instructor within their virtual browser application.

As another illustrative example, a manager associated with an enterprise organization (e.g., a corporation, etc.) can be provided with a virtual browser management interface, through which the manager can be presented with graphical representations of different virtual browser applications utilized by individual employees within the manager's organization or team. The manager, via the virtual browser management interface, may monitor each employee's usage of their respective virtual browser applications to ensure that each employee is using the virtual browser application for official purposes. Further, the manager may assist any employee requiring a managerial decision for a particular task if required.

As noted above, the virtual machine service provider may allow a primary user to configure which authorized users may simultaneously interact with one another via the virtual browser application within the virtual browser application environment. The virtual machine service provider may allow the primary user to designate one or more tabs of the virtual browser application as being limited to the primary user, particular authorized users, and/or to particular unique codes. When the authorized user accesses the virtual browser application via the virtual browser application environment viewer 504, the virtual machine service provider may automatically, and in real-time, apply these restrictions such that the authorized user is prohibited from accessing particular tabs of the virtual browser application that the authorized user is not authorized to access, as well as any websites or data presented therein.

Figure 6:
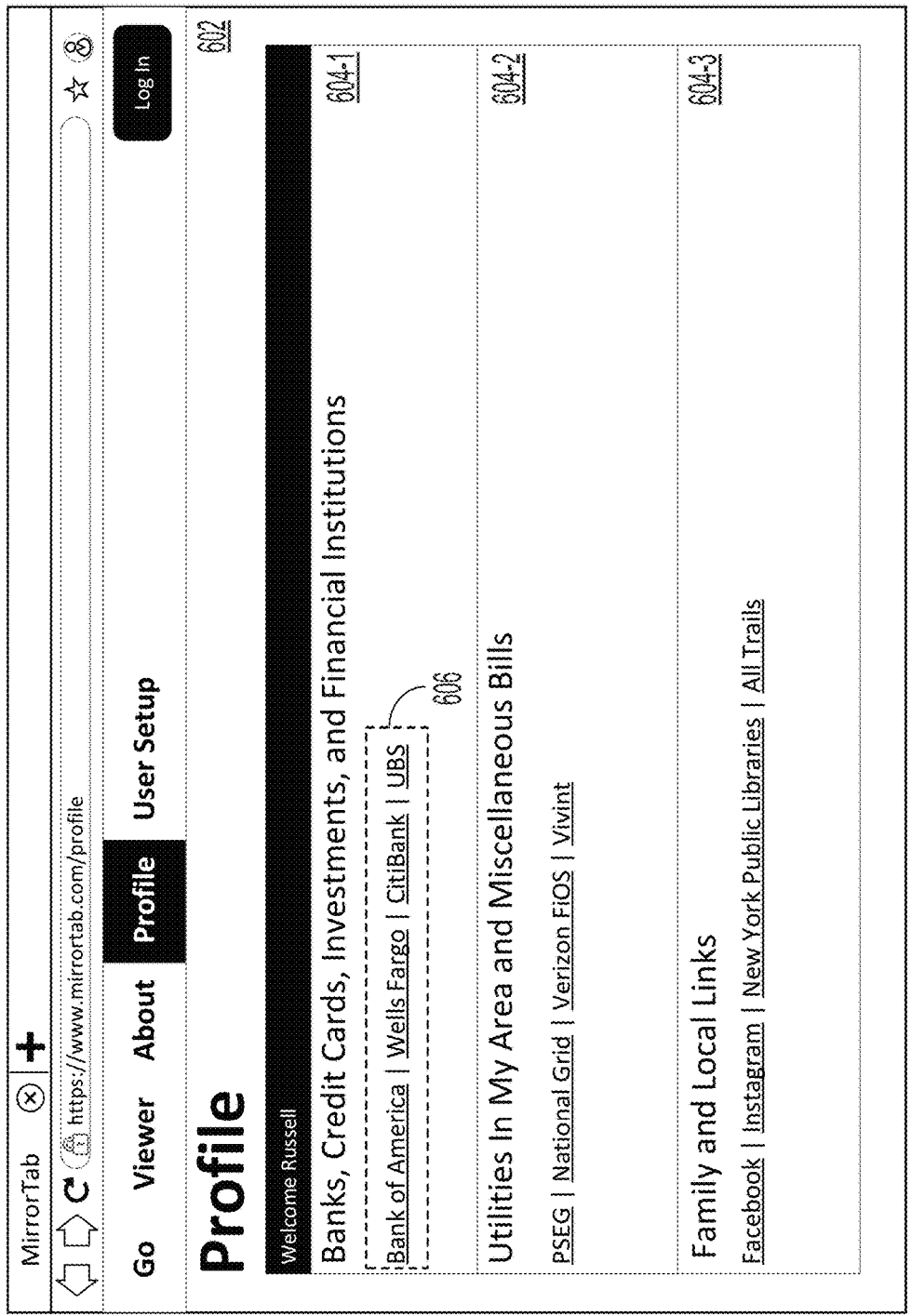
FIG. 6 shows an illustrative example of a browser application through which an authorized user is presented with bookmarks to websites accessible via the virtual browser application environment subject to one or more access control policies in accordance with at least one embodiment.

FIG. 6 shows an illustrative example of a browser application 600 through which an authorized user is presented with bookmarks 606 to websites accessible via the virtual browser application environment subject to one or more access control policies in accordance with at least one embodiment. The browser application 600 may be similar to the browser applications 400, 500 described above in connection with FIGS. 4-5, respectively. For instance, an authorized user may utilize the browser application 600 to access a website or web portal provided by the virtual machine service provider to access a virtual browser application environment implemented on behalf of a primary user. In an embodiment, when an authorized user submits a valid unique code or other credentials associated with a primary user's account, the virtual machine service provider can allow the authorized user, via the browser application 600, to access a profile page 602 of the website or web portal provided by the virtual machine service provider. The profile page 602 may specify, for the authorized user, one or more bookmarks 606, as well as various categories 604-1-604-3 within which bookmarks 606 may be organized.

As noted above, the primary user, via the website or web portal provided by the virtual machine service provider, may provide one or more bookmarks 606 that may be readily available to the authorized user when accessing the virtual browser application environment via the website or web portal. For instance, via the website or web portal provided by the virtual machine service provider, the primary user may define one or more bookmarks 606 corresponding to websites that may be of interest to the primary user and to authorized users. To define a bookmark 606, the primary user may provide a URI of the target website and a descriptor for the bookmark. In some instances, the virtual machine service provider may allow the primary user to categorize its bookmarks 606 such that an authorized user may readily identify the category 604-1-604-3 for a particular bookmark 606. For example, the primary user may add a bookmark for a financial institution to a "Finance" category, whereby an authorized user accessing the profile page 602 may readily view the bookmark for the financial institution under a "Finance" header corresponding to the category (e.g., category 604-1, as illustrated in FIG. 6).

In an embodiment, a primary user may designate which bookmarks 606 and/or categories 604-1-604-3 may be presented to different authorized users. For instance, the virtual machine service provider may allow the primary user to associate particular unique codes and/or authorized users with particular bookmarks 606 and/or bookmark categories 604-1-604-3. As an illustrative example, the primary user may designate a set of bookmarks associated with websites for different financial institutions and a bookmark category corresponding to this set of bookmarks as being available to authorized users that use a particular unique code. If an authorized user accesses the website or web portal provided by the virtual machine service provider using the particular unique code, the authorized user may be presented with this set of bookmarks via the profile page 602. Further, this set of bookmarks may be presented within the bookmark category specified by the primary user. However, an authorized user accessing the website or web portal provided by the virtual machine service provider using a different unique code or other set of credentials may not be presented with this set of bookmarks or the corresponding category via the profile page 602. Thus, a primary user may customize which bookmarks 606 and categories 604-1-604-3 may be presented to different authorized users.

The authorized user, via the profile page 602 provided by the virtual machine service provider, may view these one or more bookmarks 606 and their corresponding categories 604-1-604-3, as defined by the primary user. If the authorized user selects a particular bookmark 606, the virtual machine service provider may redirect the authorized user to the viewer page 502 described above in connection with FIG. 5 to allow the authorized user to access the virtual browser application. Further, the virtual machine service provider may update the virtual browser application to present the website corresponding to the bookmark 606 selected by the authorized user, subject to any applicable access control policies and/or alerts.

Figure 7A:
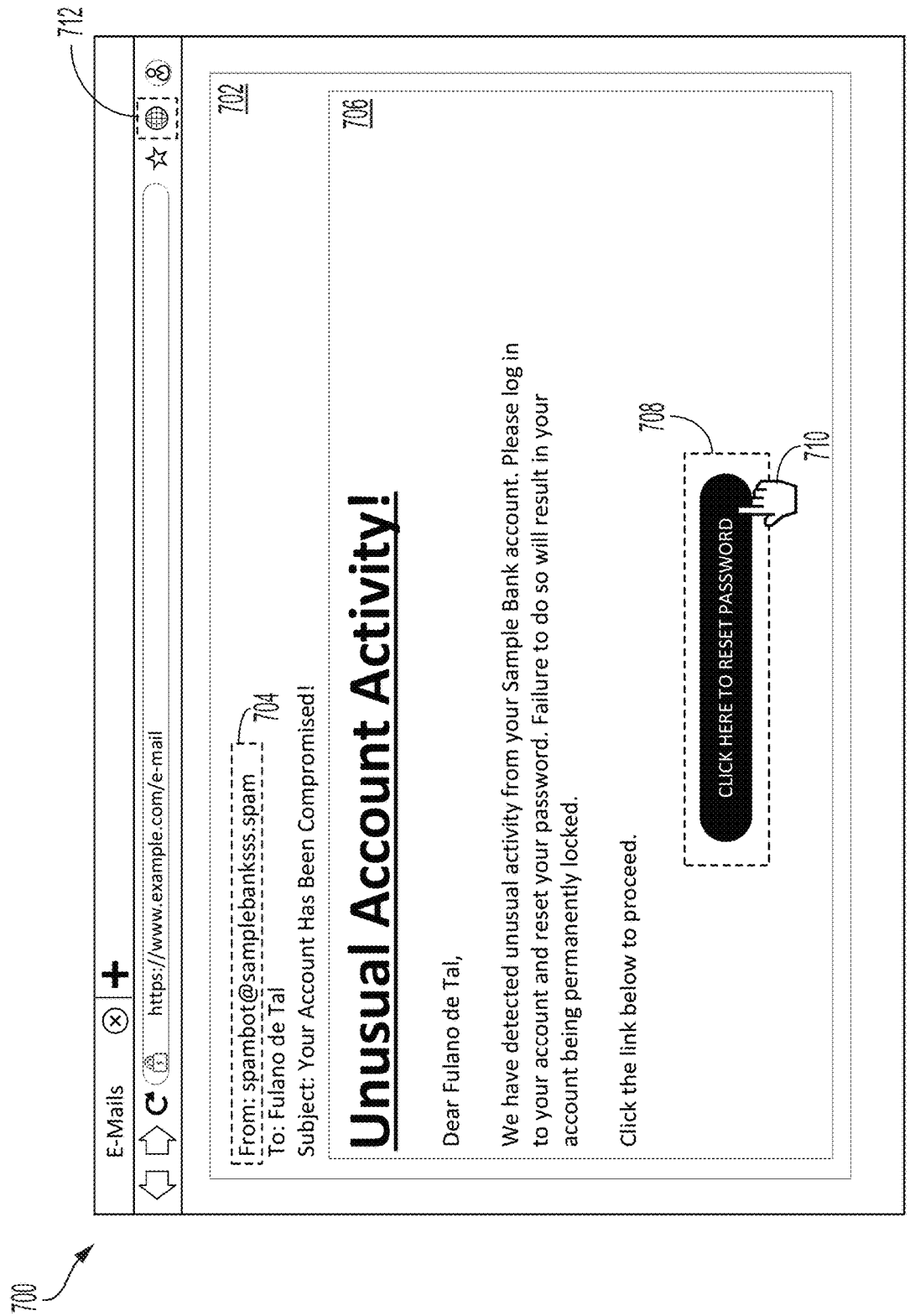
FIGS. 7A-7B show an illustrative example of a browser application through which a browser extension re-directs an authorized user to the virtual browser application environment in response to selection of a malicious link within the browser application in accordance with at least one embodiment.
Figure 7B:
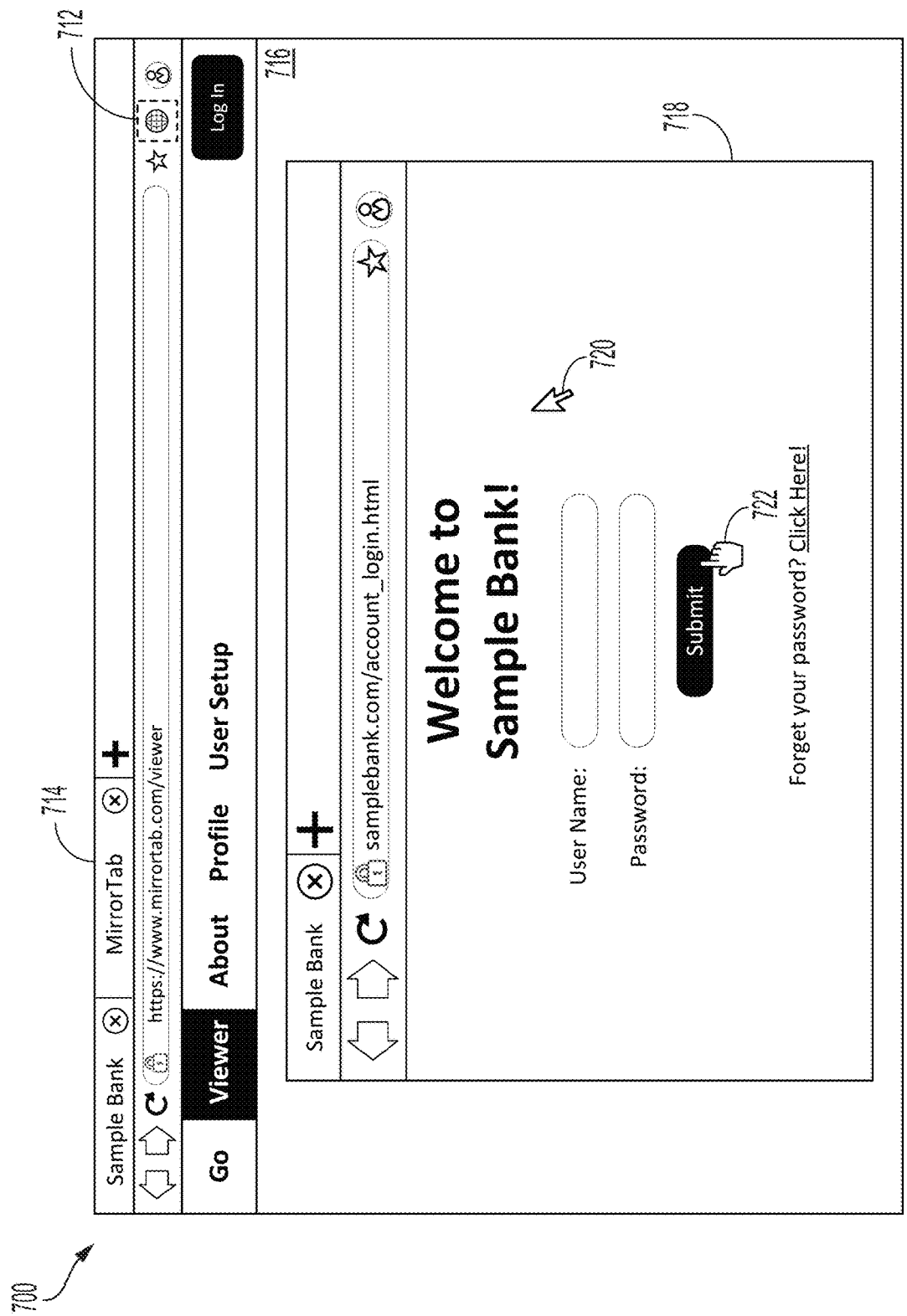

FIGS. 7A-7B show an illustrative example of a browser application 700 through which a browser extension application 712 re-directs an authorized user to the virtual browser application environment in response to selection of a malicious link 708 within the browser application 700 in accordance with at least one embodiment. As noted above, the virtual machine service provider can provide, to authorized users, a browser extension application 712 that may be installed on an authorized user's computing device and executed when the browser application 700 is executed. In an embodiment, the browser extension application may be associated with an authorized user's unique code and/or other credentials used to access the virtual machine service provider. For instance, when an authorized user executes the browser extension application 712 for the first time, the authorized user may be prompted to provide its unique code and/or other credentials that may be used to access the virtual browser application environment via the website or web portal provided by the virtual machine service provider. The virtual machine service provider may validate the provided unique code and/or other credentials and transmit instructions to the browser extension application 712 to associate the authorized user with the primary user's virtual browser application environment. Further, the virtual machine service provider may provide the browser extension application 712 with any applicable access control policies and/or alerts, as defined by the primary user and associated with the unique code and/or other credentials provided by the authorized user. This may allow the browser extension application 712 to monitor the authorized user's actions within the browser application 700 and to dynamically, and in real-time, apply the applicable access control policies and/or alerts.

The browser extension application 712 may monitor user interaction with the local browser application 700 installed on the authorized user's computing device to determine whether to re-direct the authorized user to the website or web portal implemented by the virtual machine service provider to access the virtual browser application environment. For instance, if an authorized user, using the browser application 700, attempts to access a website subject to an alert defined by the primary user, the browser extension application 712 may automatically re-direct the authorized user to the website or web portal maintained by the virtual machine service provider (as illustrated in FIG. 7B) and present, to the authorized user, the virtual browser application environment viewer 716 through which the authorized user may access the virtual browser application. As another illustrative example, the browser extension application 712 may determine whether the authorized user is attempting to access an important website, as classified by either the primary user or by the virtual machine service provider itself. Through the virtual browser application, the authorized user may access the original website the authorized user was attempting to access using its browser application 700, subject to any access control policies defined by the primary user.

As illustrated in FIGS. 7A-7B, the browser extension application 712 can further detect if the authorized user is attempting to access a malicious or otherwise suspicious website through the browser application 700. For example, as illustrated in FIG. 7A, the authorized user may receive an e-mail message from a suspicious source 704. The suspicious source 704, for instance, may be a scam or phishing bot that automatically sends unsolicited messages to users to solicit sensitive or personal information from these users. For instance, an unsolicited message 706 from the suspicious source 704 presented via an e-mail web client 702 may be generated to appear to be from a legitimate source. For example, as illustrated in FIG. 7A, the unsolicited message 706 may falsely indicate that unusual account activity has been detected from the authorized user's bank account. Further, the unsolicited message 706 may invite the authorized user to reset its password in order to address this issue. For instance, the suspicious source 704 may embed, in the unsolicited message 706, a link 708 to a website through which the authorized user is to (supposedly) reset its password. However, the link 708, if accessed using a cursor 710, may redirect the authorized user to a malicious or otherwise suspicious website (e.g., a phishing website) through which the authorized user may be misled to provide sensitive or personal information to a malicious entity.

In an embodiment, if the authorized user selects the link 708 or other interaction element from the unsolicited message 706 that would otherwise direct the authorized user to a malicious or otherwise suspicious website, the browser extension application may intercept the request to access this malicious or otherwise suspicious website. The browser extension application 712 may evaluate the URI associated with the malicious or otherwise suspicious website and determine whether there is a legitimate website that the suspicious source 704 is trying to spoof or otherwise imitate to trick the authorized user. For example, the browser extension application 712 may process the URI associated with the malicious or otherwise suspicious website against a repository of known URIs for legitimate websites to determine whether a legitimate website can be identified. In some embodiments, the browser extension application 712 can process the unsolicited message 706 to identify any elements associated with a legitimate entity (e.g., bank, retailer, etc.) that are being spoofed or misappropriated for the purpose of the phishing attack. Based on this identification of elements associated with a legitimate entity, the browser extension application 712 may identify a legitimate website that the authorized user may be re-directed to via the virtual browser application environment. In some embodiments, the browser extension application 712 can further process the e-mail address or other identifying information of the suspicious entity 704 to determine what legitimate entity the suspicious entity 704 is trying to spoof. For example, the browser extension application 712 can process the domain specified in the suspicious entity's e-mail address against a repository of known valid domains to identify a legitimate domain that the suspicious entity 704 is trying to spoof.

As noted above, to identify the elements associated with a legitimate entity from the unsolicited message 706 and/or to identify a legitimate website based on evaluation of the link 708 included in the unsolicited message 706, the browser extension application 712 may employ a machine learning algorithm or artificial intelligence. The machine learning algorithm or artificial intelligence may be trained using a dataset of messages, hyperlinks specified or otherwise associated with the messages, known elements associated with legitimate entities, and known URIs corresponding to these legitimate entities. The machine learning algorithm or artificial intelligence may be evaluated to determine, based on the sample inputs supplied to the machine learning algorithm or artificial intelligence, whether the machine learning algorithm or artificial intelligence is producing accurate URIs corresponding to the legitimate entity that the suspicious source 704 may be trying to spoof or otherwise imitate. Based on this evaluation, the machine learning algorithm or artificial intelligence may be modified to increase the likelihood of the machine learning algorithm or artificial intelligence generating the desired results.

The machine learning algorithm or artificial intelligence employed by the browser extension application 712 may further be dynamically trained by soliciting feedback from primary and authorized users. For instance, if the browser extension application 712 re-directs a user, via the virtual browser application environment, to a legitimate website that is wholly unrelated to the elements associated with a legitimate entity presented in the unsolicited message 706, the user may provide feedback to the virtual machine service provider indicating that the website the user was re-directed to was not relevant or otherwise not useful to the user. The virtual machine service provider may use this feedback to modify one or more coefficients of the machine learning algorithm or artificial intelligence to better identify a legitimate website associated with the elements associated with the legitimate entity being spoofed or imitated via the unsolicited message 706. Similarly, a user may provide feedback regarding the ability of the machine learning algorithm or artificial intelligence to identify suspicious URIs from unsolicited messages. This feedback may be used to update the machine learning algorithm or artificial intelligence to better identify suspicious URIs and, in response, identify legitimate URIs corresponding to legitimate entities.

If the browser extension application 712 detects that the authorized user is attempting to access a malicious or otherwise suspicious website through the browser application 700, the browser extension application 712 may re-direct the authorized user to the virtual browser application environment via the website or web portal provided by the virtual machine service provider. For instance, the browser extension application 712 may generate a new browser tab 714 through which the website or web portal provided by the virtual machine service provider may be accessed. The browser extension application 712 may automatically provide, to the virtual machine service provider, the unique code and/or other credentials of the authorized user. This may allow the virtual machine service provider to dynamically, and in real-time, identify the virtual browser application environment associated with the provided unique code and/or other credentials. For instance, the virtual machine service provider may query a user profile database (e.g., user profile database 210, as illustrated in FIG. 2) to determine whether the submitted unique code and/or other credentials are associated with an account of a primary user. As noted above, when a primary user defines a unique code that can be used by one or more authorized users to access the primary user's virtual browser application environment, the virtual machine service provider may update the primary user's account within the user profile database to associate this new unique code with the primary user's account and, hence, the virtual browser application environment associated with the primary user's account. Thus, the submitted unique code and/or other credentials may be used to determine whether the unique code and/or other credentials are associated with a primary user's account.

If the valid unique code and/or other credentials associated with a primary user's account provided by the browser extension application 712 are valid, the virtual machine service provider can redirect the authorized user, via the browser application 700, to a viewer page 716 of the website or web portal provided by the virtual machine service provider. Similar to the viewer page 502 described above in connection with FIG. 5, the viewer page 502 may include a virtual browser application environment viewer 718, through which the authorized user may access and view the virtual browser application environment using its browser application 700. When an authorized user is redirected to the viewer page 716 by the browser extension application 712, the virtual machine service provider may execute the virtual browser application environment viewer 718 using the identifier corresponding to the primary user's virtual machine instance used to implement the virtual browser application environment. Further, the virtual machine service provider may automatically access, via the virtual browser application, the legitimate website identified by the browser extension application 712.

In some instances, access to the legitimate website may be subject to any access control policies applicable to the authorized user, as defined by the primary user. Further, the virtual machine service provider may transmit any applicable alerts to the primary user, if applicable. In an embodiment, if the authorized user is re-directed to the virtual browser application environment as a result of the authorized user having attempted to interact with a phishing or suspicious link 708 within the unsolicited message 706, the virtual machine service provider can automatically transmit an alert to the primary user to indicate that the authorized user may have been the target of a phishing or other malicious attack. The primary user may access the virtual browser application to interact with the authorized user within the virtual browser application and the legitimate website accessed using the virtual browser application. As noted above, each user simultaneously interacting with the virtual browser application may be represented using a cursor 720, 722. For example, as illustrated in FIG. 7B, the primary user may be represented within the virtual browser application environment viewer 718 using cursor 720, whereas the authorized user may be represented within the virtual browser application environment viewer 718 using cursor 722. Each cursor 720, 722 may be unique to allow users to immediately discern which cursor 720, 722 they control. For instance, a cursor may have a unique coloration, shape, or other characteristic that is unique to the corresponding user. In some instances, a cursor may be accompanied by an identifier corresponding to the user associated with the cursor.

In an embodiment, the browser extension application 712 can serve as a credential manager (e.g., password manager, token manager, etc.) for the authorized user. For instance, the browser extension application may store and manage, on behalf of the authorized user, credential information for websites utilized by the authorized user using its native browser application. The browser extension application 712 may encrypt this credential information such that the credential information is stored, by the browser extension application 712, in encrypted form. In an embodiment, the encrypted credential information may be stored in a repository maintained by the virtual machine service provider, where the encrypted credential information may be associated with the virtual browser application environment and a profile associated with the authorized user for the virtual browser application environment. This may allow the authorized user to access its credential information for websites accessed within the virtual browser application environment, subject to any applicable access control policies and/or alerts. For example, if the authorized user accesses a website within the virtual browser application environment, for which the authorized user's credential information for the website has been previously stored by the browser extension application 712 during an authorized user's access to the website using its native browser application, the virtual browser application may automatically retrieve the authorized user's credentials and enable access to the authorized user's account via the website, subject to any applicable access control policies and/or alerts.

In some embodiments, the browser extension application 712 can access one or more third-party credential managers (e.g., credential managers not associated with the virtual machine service provider) to automatically, and in real-time, obtain an authorized user's credentials for accessing one or more websites via the authorized user's native browser application and the virtual browser application environment. For instance, an authorized user may grant, to the browser extension application, access to the authorized user's accounts maintained by one or more third-party credential managers. This may allow the browser extension application to retrieve any required authorized user credentials for accessing one or more websites via the native browser application and/or the virtual browser application.

Figure 8:
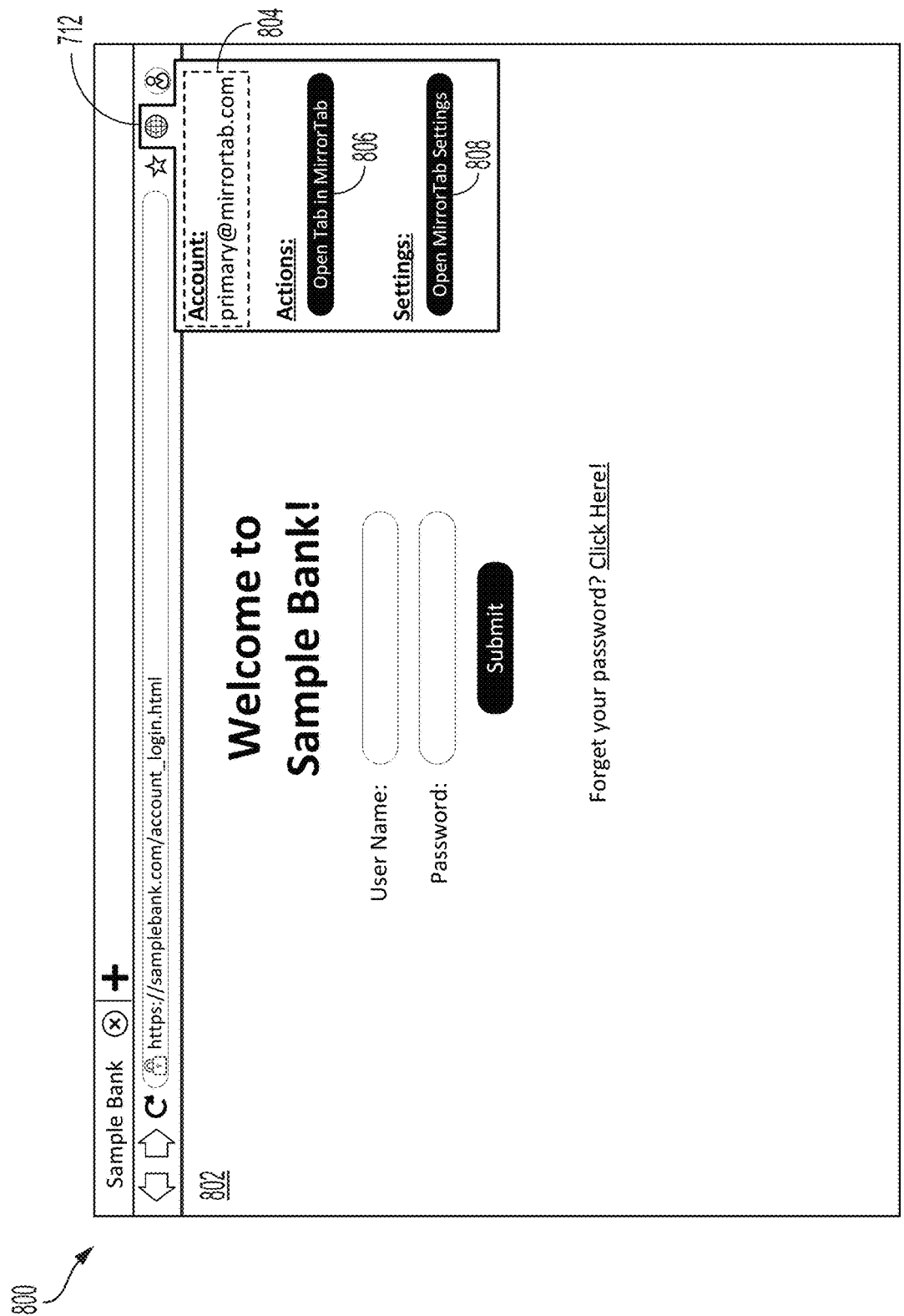
FIG. 8 shows an illustrative example of a browser application through which a browser extension presents an authorized user with various options for accessing the virtual browser application environment and to define any settings associated with the virtual browser application environment in accordance with at least one embodiment.

FIG. 8 shows an illustrative example of a browser application 800 through which a browser extension 712 presents an authorized user with various options for accessing the virtual browser application environment and to define any settings associated with the virtual browser application environment in accordance with at least one embodiment. As noted above, the virtual machine service provider may provide a browser extension application 712 that may be installed on an authorized user's computing device. This browser extension application 712 may be executed when the browser application 800 is executed from the authorized user's computing device. Similar to the browser application 700 described above in connection with FIGS. 7A-7B, when the authorized user executes the browser extension application 712 for the first time, the authorized user may be prompted to provide its unique code and/or other credentials that may be used to access the virtual browser application environment via the website or web portal provided by the virtual machine service provider. The provided unique code and/or other credentials may be validated by the virtual machine service provider, which may transmit instructions to the browser extension application 712 to associate the authorized user with the primary user's virtual browser application environment. The browser extension application 712 may further monitor the authorized user's actions within the browser application 800 and apply any applicable access control policies and/or alerts associated with the authorized user.

In an embodiment, the browser extension application 712 can provide the authorized user with various options associated with the virtual browser application environment. For example, if the authorized user, through the browser application 800, selects an icon corresponding to the browser extension application 712, the browser extension application 712 may present to the authorized user information regarding the authorized user's account and different options associated with the virtual browser application environment. As illustrated in FIG. 8, the browser extension application 712 may provide the authorized user with user account information 804. This user account information 804 may include a username associated with the authorized user (e.g., "primary@mirrortab.com," etc.). This may allow the authorized user to ensure that the browser extension application 712 is associated with the authorized user and that any access to the virtual browser application environment is provided according to the access control policies and/or alerts associated with the authorized user. If the authorized user has not previously executed the browser extension application 712, rather than providing the user account information 804, the browser extension application 712 may prompt the authorized user to provide their unique code and/or other credentials, as described above.

The browser extension application 712 may further provide the authorized user with a set of actions that may be available to the authorized user for accessing the virtual browser application environment. For example, as illustrated in FIG. 8, the authorized user may be presented with an option 806 to open a new browser application tab within the virtual browser application environment, through which the authorized user may access the website 802 securely through this new browser application tab. The option 806 may be presented subject to any applicable access control policies and/or alerts. For example, if the particular website 802 cannot be accessed within the virtual browser application environment as a result of a particular access control policy, the option 806 to access the particular website 802 within the browser application environment may not be presented.

If the authorized user selects the option 806, the browser extension application 712 may automatically re-direct the authorized user to the website or web portal maintained by the virtual machine service provider (as illustrated in FIGS. 5 and 7B) and present, to the authorized user, the virtual browser application environment viewer through which the authorized user may access the virtual browser application. Through the virtual browser application, the authorized user may access the website 802 originally accessed by the authorized user through the native browser application 800. Further, access to the website 802 through the virtual browser application may be subject to the resources allocated for the virtual browser application and to the access control policies and/or alerts associated with the authorized user. Additionally, through the virtual browser application, the authorized user may be prevented from accessing developer tools or inspecting any web element through the virtual browser application, as described in greater detail herein.

In addition to providing the authorized user with options 806 corresponding to actions that may be available to the authorized user for accessing the virtual browser application environment, the browser extension application 712 may provide the authorized user with an option 808 to access one or more settings for the authorized user's account and/or the virtual browser application environment. The one or more settings made available through selection of the option 808 may be subject to the authorized user's role or applicable access control policies. For example, if the authorized user is a primary user, the browser extension application 712 may re-direct the primary user to a website or web portal associated with the virtual machine service provider, through which the primary user may perform various operations, such as generating profiles for other authorized users, defining access control policies and/or alerts for these other authorized users, define bookmarks corresponding to other websites that may be available to these other authorized users through the virtual browser application environment, and the like. The presentation of these various operations is illustrated and described above in connection with FIG. 3. If the authorized user is not a primary user, selection of the option 808 may cause the browser extension application 712 to provide the authorized user with one or more settings according to the access control policies applicable for the authorized user. For example, rather than providing the authorized user with settings for generating and managing profiles associated with other authorized users, the virtual machine service provider may only allow the authorized user to manage their own account subject to any applicable access control policies.

Figure 9:
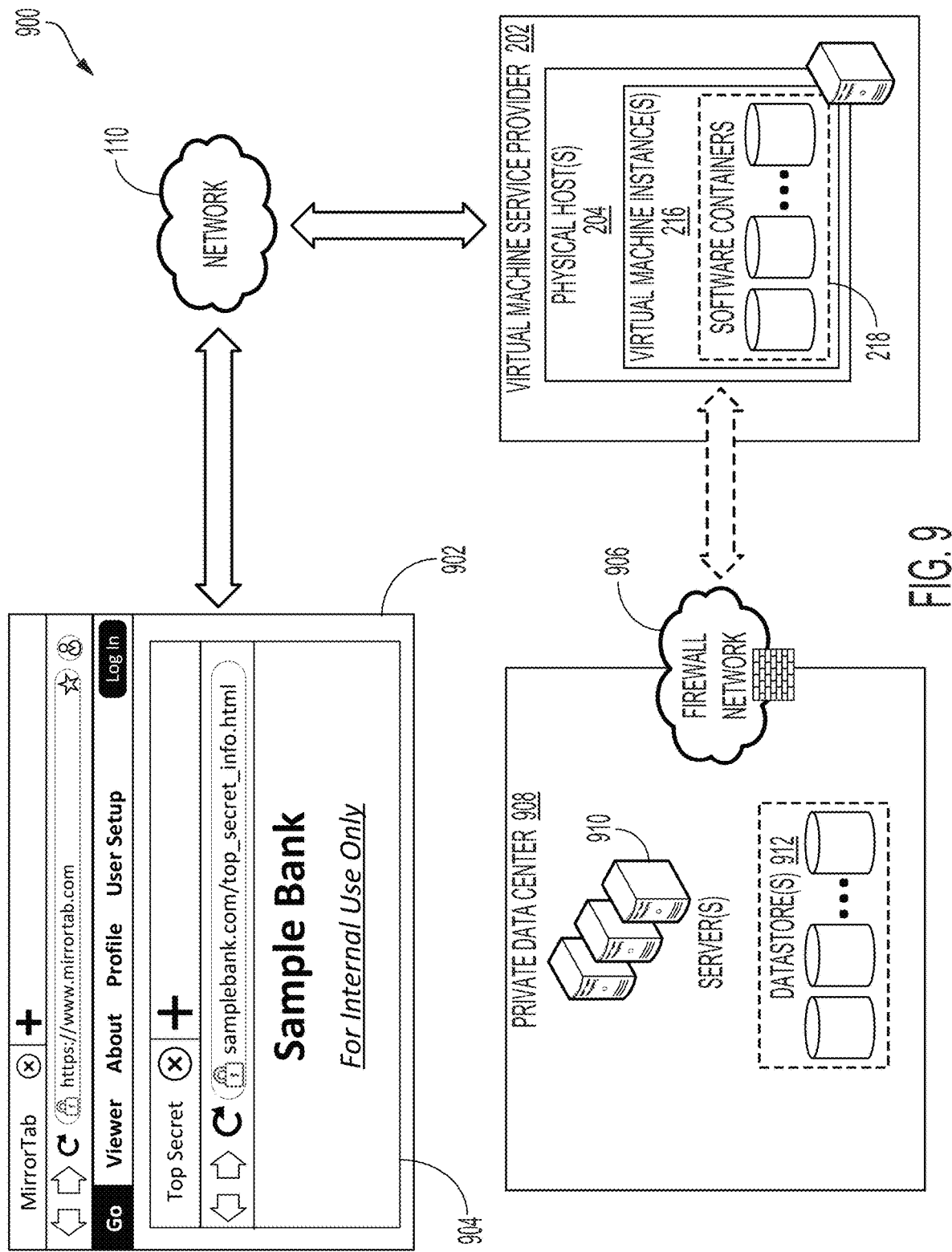
FIG. 9 shows an illustrative example of an environment in which sensitive information maintained through a private data center is accessible through one or more whitelisted virtual browser application environments implemented by the virtual machine service provider in accordance with at least one embodiment.

FIG. 9 shows an illustrative example of an environment 900 in which sensitive information maintained through a private data center 908 is accessible through one or more whitelisted virtual browser application environments implemented by the virtual machine service provider 202 in accordance with at least one embodiment. As illustrated in FIG. 9, an authorized user, through a browser application 902 implemented on the authorized user's computing device, may access a website or web portal provided by the virtual machine service provider 202 to access a website or web portal provided by the virtual machine service provider to access a virtual browser application environment implemented on behalf of a primary user. As noted above, when an authorized user submits a valid unique code or other credentials associated with a primary user's account, the virtual machine service provider can redirect the authorized user, via the browser application 902, to a viewer page of the website or web portal provided by the virtual machine service provider. The viewer page may include a virtual browser application environment viewer 904, through which the authorized user may access and view the virtual browser application environment.

As noted above, the virtual machine service provider 202 may implement a set of physical hosts 204 that may be used to instantiate different virtual machine instances 216 through which virtual browser application environments may be executed. A virtual machine instance 216 may be implemented using a virtual machine image according to the primary user's configuration requirements. The virtual machine instance 216 may be instantiated as a container instance that is configured to operate myriad software containers 218 according to the parameters of the virtual machine image, as described above.

In an embodiment, a primary user can define a set of configuration requirements whereby certain data (e.g., particular websites, data sources, etc.) may be accessed from a private data center 908 associated with the primary user only through whitelisted virtual machine instances 216 or other resources (e.g., particular types of physical hosts 204, etc.). Further, for these whitelisted virtual machine instances 216 or other resources, the primary user may define a set of access control policies that may define which authorized users may access this certain data through whitelisted virtual machine instances 216 or other resources. For example, the primary user may indicate which authorized users are granted access to the indicated data through the whitelisted virtual machine instances 216 or other resources (e.g., particular types of physical hosts 204, etc.). If a user attempts to access this indicated data through the virtual browser application environment viewer 904, and the user is not designated as being permitted to access this indicated data, the user may be immediately denied access to this data through the virtual browser application environment viewer 904.

In an embodiment, if an authorized user accesses the virtual browser application environment viewer 904 through the network 110 (e.g., a public network, the Internet, etc.) and submits a request to access data from one or more servers 910 or datastores 912 associated with the private data center 908 (e.g., enters a URI corresponding to a network location wherein the data is available, etc.), the virtual machine service provider 202 may determine whether the URI is subject to an access control policy defined by the primary user. For example, if the primary user has indicated that the authorized user is not to have access to the requested data, the virtual machine service provider 202 may automatically reject the request. However, if the primary user has indicated that the authorized user is to be granted access to the data, the virtual machine service provider 202 may determine whether the particular data is subject to the configuration requirements defined by the primary user.

As noted above, the configuration requirements may indicate that, in order to access the servers 910 and/or datastores 912 associated with the private data center 908, the virtual browser application environment needs to be implemented using whitelisted virtual machine instances 216 or other resources (e.g., particular types of physical hosts 204, etc.). Network information associated with these whitelisted virtual machine instances 216 or other resources may be used to configure a firewall network 906 or other secure network associated with the private data center 908 such that when a request to access the servers 910 or datastores 912 associated with private data center 908 is received at the firewall network 906, the firewall network 906 may determine whether to allow network traffic between the private data center 908 and the virtual machine instance used to implement the virtual browser application environment. If the virtual machine instance has been whitelisted by the primary user through the generated configuration information for the virtual machine instance, the firewall network 906 may facilitate transmission of network traffic from the private data center 908 (e.g., the servers 910, the datastores 912, etc.) to the virtual machine instance, and vice versa.

In some instances, if the virtual browser application environment that the authorized user has accessed is not implemented using a whitelisted virtual machine instance 216, but the authorized user otherwise should be granted access to the data from the private data center 908, the virtual machine service provider 202 may evaluate the configuration information associated with the primary user to determine whether a whitelisted virtual machine instance 216 has been implemented. If so, the virtual machine service provider 202 may re-direct the authorized user to the virtual browser application environment associated with the whitelisted virtual machine instance 216 and allow the authorized user to access the requested data. In some instances, if the whitelisted virtual machine instance 216 has not been implemented, the virtual machine service provider 202 may implement the whitelisted virtual machine instance 216 and execute the virtual browser application environment within this whitelisted virtual machine instance 216 in order to allow the authorized user to access the requested data from the private data center 908. Thus, by verifying that a user accessing the virtual browser application environment through their browser application 902 has been granted to sensitive data maintained by the private data center 908, and by ensuring that the virtual browser application environment is implemented using whitelisted virtual machine instances 216 or other resources maintained by the virtual machine service provider 202, the user may be able to access the sensitive data even when operating within an unsecure network 110 (e.g., a public network, the Internet, etc.).

In an embodiment, a primary user can define a set of configuration requirements whereby certain websites may only be rendered and streamed to certain authorized users through one or more whitelisted virtual machine instances 216 or other resources (e.g., particular types of physical hosts 204, etc.). As described in greater detail herein, a virtual machine instance 216 can be implemented to automatically, and in real-time, encode the web DOM associated with a particular website into a data structure that obfuscates the web DOM associated with the particular website but that may be decoded by computing devices to allow for presentation of a graphical facsimile of the website. For instance, the virtual machine instance 216 may generate, from a web DOM and corresponding scripts and assets associated with a particular website, a graphical facsimile of the website that may be streamed (e.g., a video stream, a binary stream, etc.) to particular users attempting to access the website. The graphical facsimile of the website may appear, to a user through their browser application 902, similar to the actual website with some notable exceptions. For instance, if an authorized user accesses, through the browser application 902, a browser menu corresponding to the presented graphical facsimile of the website, any browser options (e.g., an option to inspect the website, an option to save the website as a document, an option to add or otherwise install browser extensions, etc.) may be disabled such that the authorized user is prohibited from implementing any of these options being presented to the authorized user. In some instances, in addition to pushing or transmitting the data stream that includes the encoded graphical facsimile of the website, the virtual machine instance 216 may transmit executable instructions to the browser application 902 to disable these browser options. The graphical facsimile of the website may further be presented through the browser application 902 without the virtual browser application environment viewer 904 in order to prevent the authorized user from immediately detecting that the website is being rendered remotely through the virtual machine instance 216.

As noted above, a primary user may define a set of access control policies that may define which authorized users may access certain data through whitelisted virtual machine instances 216 or other resources. This certain data may include particular websites that only these authorized users may be granted access to. For instance, if an unauthorized user, through their browser application, enters the URI corresponding to a website indicated through this set of access control policies, the virtual machine instance 216 may determine that the unauthorized user has not been granted access to the website. Accordingly, the virtual machine instance 216 may return an error or other indication that the unauthorized user has not been granted access to the website (e.g., an HTTP 404—File Not Found error, etc.).

In some instances, the primary user may define a set of access control policies that may define what portions of particular websites are only available to authorized users. For instance, through the set of access control policies, the primary user may define portions of the web DOM associated with a particular website that are to be presented only to authorized users. For instance, while the particular website may be available to any user entering the URI associated with the website into their browser application 902, only authorized users that submit a valid unique code or other credentials associated with a primary user's account (or that are otherwise identified as being granted access to these portions of the website) may be presented with these portions of the particular website. Thus, based on these access control policies and the identity of the user attempting to access the website, the virtual machine instance 216 may determine what portions of the website are to be rendered and streamed to the user through their browser application 902.

Figure 10:
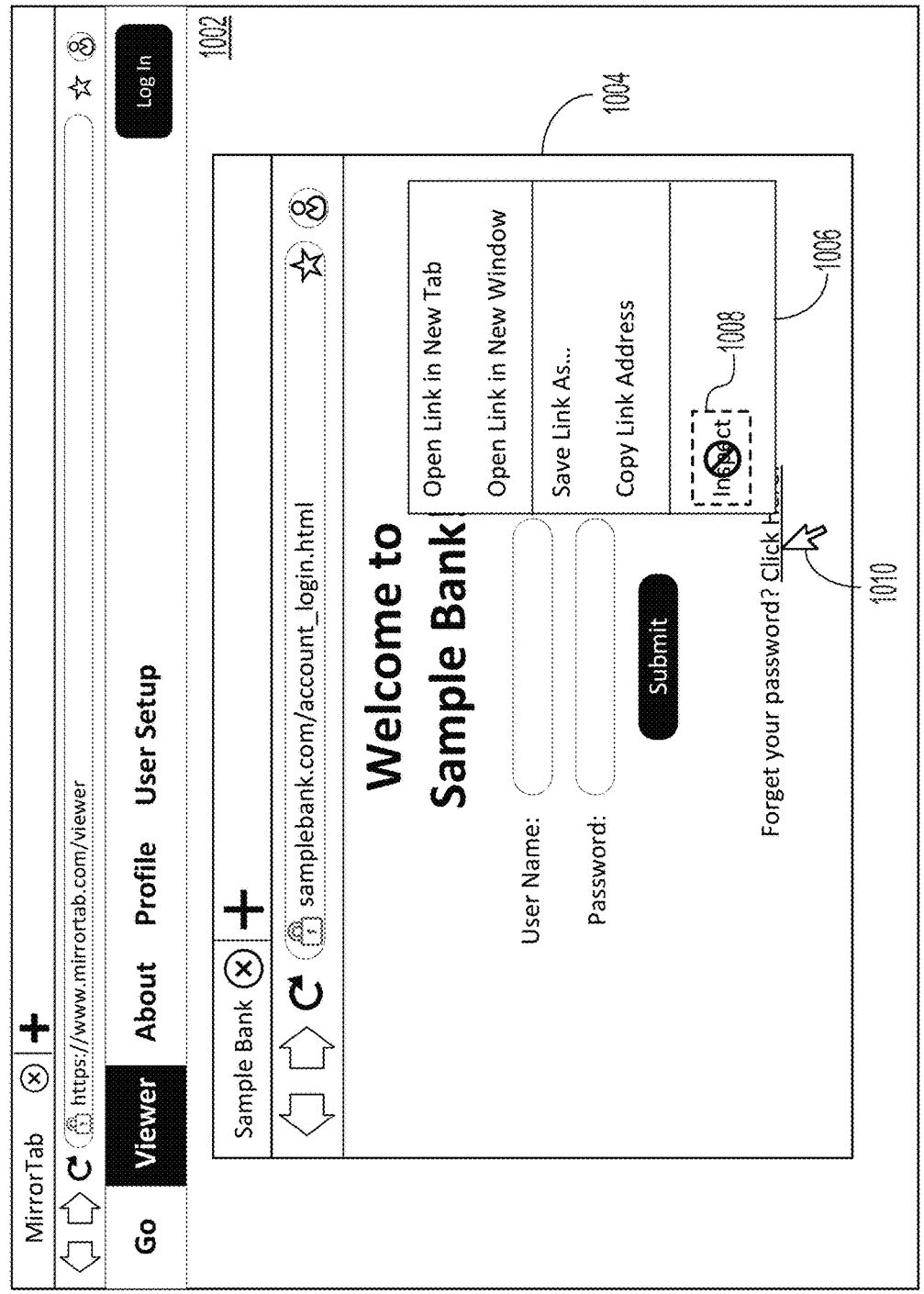
FIG. 10 shows an illustrative example of a browser application through which a user accessing a website through a virtual browser application environment is prevented from accessing developer tools or inspecting any web element through the virtual browser application environment in accordance with at least one embodiment.

FIG. 10 shows an illustrative example of a browser application 1000 through which a user accessing a website through a virtual browser application environment is prevented from accessing developer tools or inspecting any web element through the virtual browser application environment in accordance with at least one embodiment. The browser application 1000 may be similar to the browser applications 400 and 500 described above in connection with FIGS. 4 and 5, respectively. For instance, an authorized user may utilize the browser application 500 to access a website or web portal provided by the virtual machine service provider to access a virtual browser application environment implemented on behalf of a primary user. Further, through the browser application 1000, the user may access a viewer page 1002 that includes a virtual browser application environment viewer 1004. Through the virtual browser application environment viewer 1004, the user may access and view the virtual browser application environment using its browser application 1000.

As noted above, the virtual machine instance used to implement the virtual browser application environment may be instantiated such that users are prohibited from installing any browser extensions onto the virtual browser application implemented within the virtual browser application environment. Further, users may be prohibited from accessing any developer tools or other tools usually implemented by the virtual browser application that allow users to inspect and/or modify any presented assets. The virtual machine instance may also be implemented such that these users are prohibited from being able to inspect any web element or other element presented or otherwise available through the virtual browser application implemented within the virtual browser application environment. In some instances, the virtual machine instance may be implemented in a "kiosk" or restricted mode, whereby navigation to websites other than the website presented through the virtual browser application implemented within the virtual browser application environment is prohibited or otherwise limited according to a set of rules and/or restrictions. For instance, the virtual machine instance may be implemented such that users are prohibited from creating new tabs within the virtual browser application, changing the dimensions of the virtual browser application and/or of the website being presented through the virtual browser application, using the virtual browser application to navigate local files and configurations associated with the virtual machine instance, and/or any other administrator controls corresponding to the maintenance and operation of the virtual machine instance.

As illustrated in FIG. 10, through the virtual browser application environment viewer 1004, the user has used their cursor 1010 to access a browser menu 1006 through which the user may be presented with various options. For example, if the user uses their cursor 1010 on a hyperlink associated with a webpage presented through the virtual browser application viewer 1004 (such as through using their mouse to perform a right-click operation on the hyperlink), the virtual browser application may present, through the virtual browser application viewer 1004, a browser menu 1006 corresponding to the selected hyperlink. Through the browser menu 1006, a user may typically be presented with an option to inspect the web elements and other elements associated with the selected hyperlink and the website accessed through the virtual browser application viewer 1004. However, as illustrated in FIG. 10, this option 1008 to inspect the hyperlink and the website may be disabled such that the user is prohibited from inspecting the hyperlink and the website accessed through the virtual browser application viewer 1004.

It should be noted that while the option 1008 may be stricken through, as illustrated in FIG. 10, to visually denote that the option 1008 has been disabled for the user, other methods may be used to denote that the user is prohibited from inspecting the web elements and other elements associated with the selected hyperlink and the website accessed through the virtual browser application viewer 1004. For example, rather than striking through the option 1008, the virtual machine service provider may make the option 1008 visually opaque (e.g., using a lighter color font, etc.) compared to the other options presented through the browser menu 1006. As another illustrative example, the virtual machine service provider may remove the option 1008 entirely from the browser menu 1006 such that the user may never know that the option 1008 would otherwise be available. It should also be noted that while an option to inspect the website is used extensively throughout the present disclosure, additional and/or alternative options (e.g., e.g., an option to save the website as a document, an option to add or otherwise install browser extensions, etc.) may be disabled or otherwise removed from the browser menu 1006.

Figure 11:
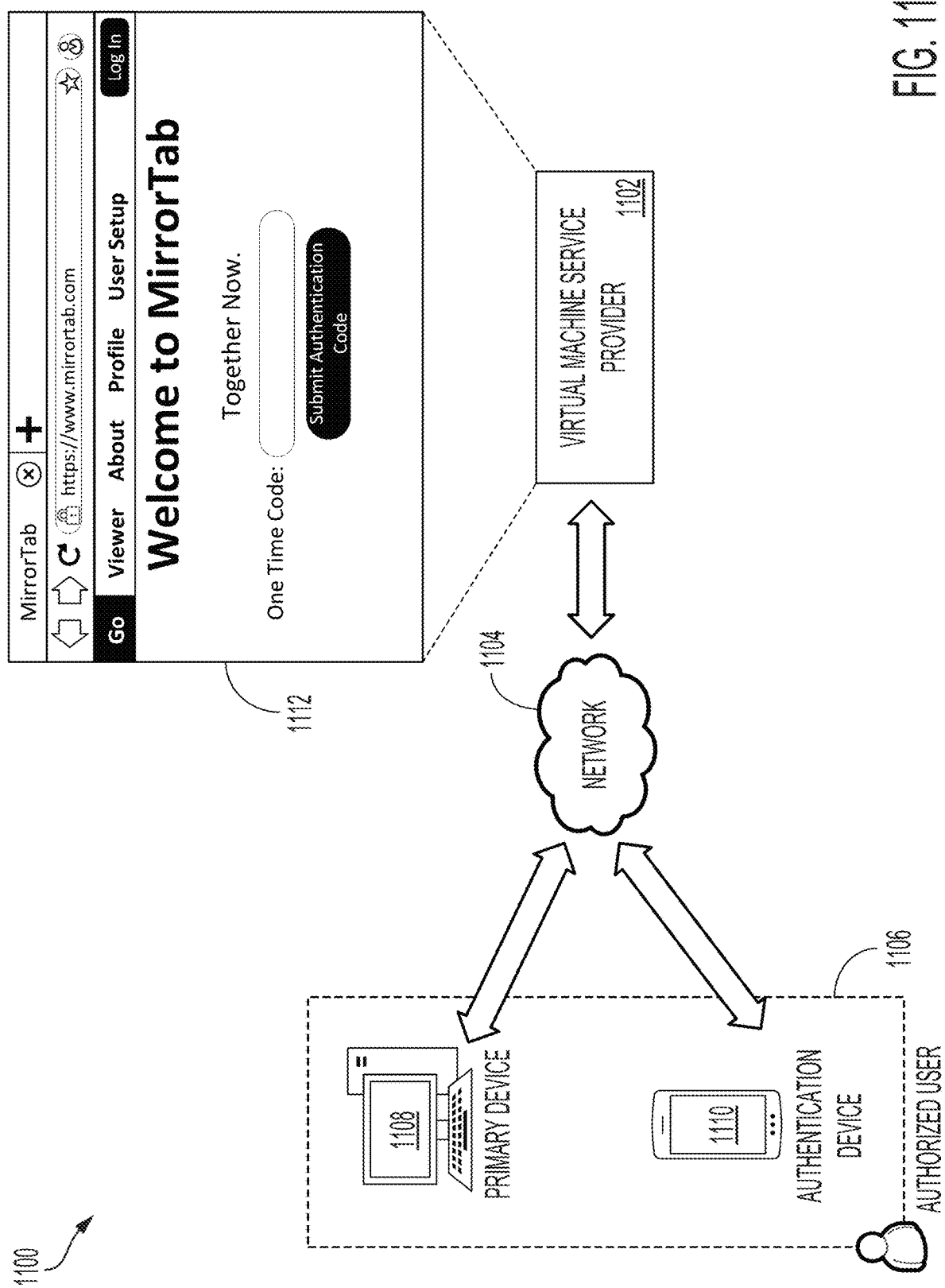
FIG. 11 shows an illustrative example of an environment in which an authorized user utilizes an authentication device to access the virtual browser application environment via a local browser application in accordance with at least one embodiment.

FIG. 11 shows an illustrative example of an environment 1100 in which an authorized user 1106 utilizes an authentication device 1110 to access the virtual browser application environment via a local browser application in accordance with at least one embodiment. In the environment 1100, an authorized user 1106 may maintain a primary computing device 1108, which may be used to access, over a communications network 1104, the virtual browser application environment via a website or web portal 1112 provided by the virtual machine service provider 1102. The primary computing device 1108 may be a laptop computer, desktop computer, mobile device (e.g., smartphone, etc.), a virtual machine instance implemented on a remote computing device, and the like.

In an embodiment, when the authorized user 1106 accesses the website or web portal 1112 provided by the virtual machine service provider 1102, the virtual machine service provider 1102 may prompt the authorized user 1106 to provide a one-time password or code that may be used to authenticate the authorized user 1106. In some instances, the virtual machine service provider 1102 may prompt the authorized user 1106 to provide this one-time password or code once the authorized user 1106 has provided a unique code and/or other credentials provided by a primary user and associated with the primary user's account. If this unique code and/or other credentials are valid, the virtual machine service provider may prompt the authorized user 1106 to provide a one-time password or code as part of a multi-factor authentication (MFA) scheme implemented by the virtual machine service provider.

In an embodiment, the authorized user 1106 can utilize an authentication device 1110 to obtain the one-time password or code that may be provided to the virtual machine service provider 1102 for authentication of the authorized user 1106. The authentication device 1110, similar to the primary computing device 1108, may be a laptop computer, desktop computer, mobile device (e.g., smartphone, etc.), a virtual machine instance implemented on a remote computing device, and the like. In some instances, the authentication device 1110 may be a hardware token assigned to the authorized user 1106 and configured to automatically generate one-time passwords or codes at fixed intervals. In an embodiment, instead of an authentication device 1110, the authorized user 1106 can utilize a software-based authentication application through which a software token provided by the virtual machine service provider 1102 may be used to automatically generate one-time passwords or codes at fixed intervals. The software-based authentication application may be installed and executed from the authorized user's primary computing device 1108, obviating the need for a secondary authentication device 1110.

If the authorized user 1106 provides a one-time password or code to the virtual machine service provider 1102 via the website or web portal 1112 (or is automatically provided by the authentication device 1110), the virtual machine service provider 1102 may evaluate the authentication information to determine whether the authentication information is valid and, if so, identify a corresponding user profile associated with the provided authentication information and the account of the primary user. The virtual machine service provider may use the account of the primary user to identify the corresponding virtual machine instance and, hence, the virtual browser application environment that is to be presented to the authorized user 1106 via a viewer presented on the website or web portal 1112. If the authorized user 1106 is successfully authenticated, the virtual machine service provider 1102 may allow the authorized user 1106 to access the virtual browser application environment subject to any access control policies defined by the primary user via the website or web portal 1112.

Figure 12:
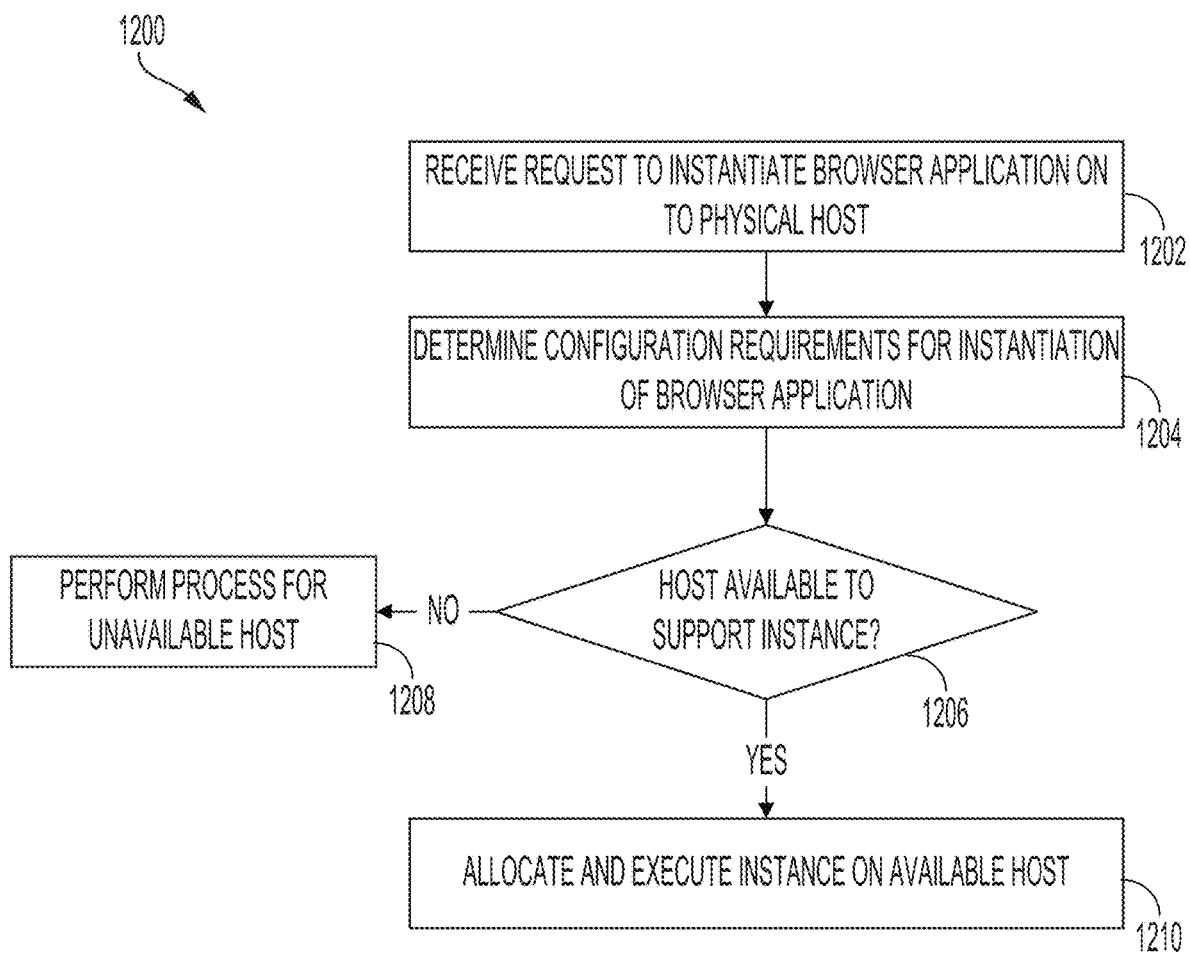
FIG. 12 shows an illustrative example of a process for initiating a virtual machine instance used to implement a virtual browser application environment in accordance with at least one embodiment.

FIG. 12 shows an illustrative example of a process 1200 for initiating a virtual machine instance used to implement a virtual browser application environment in accordance with at least one embodiment. The process 1200 may be performed by the aforementioned virtual machine service provider, which may maintain one or more physical hosts that may be used to instantiate a virtual machine instance that can implement the virtual browser application environment on behalf of a primary user and any authorized users, as designated by the primary user. At step 1202, the virtual machine service provider may receive a request to instantiate a virtual browser application on to a physical host to implement a virtual browser application environment. As noted above, the virtual machine service provider may provide the primary user with various configuration options for the virtual browser application environment. For instance, the virtual machine service provider may determine the available capacity for each of the physical hosts maintained by the virtual machine service provider. Further, the virtual machine service provider may query a virtual machine image repository to identify the available virtual machine images that may be used to instantiate the virtual browser application environment on to a physical host. Based on this information, the virtual machine service provider may determine which virtual machine images may be used to instantiate a virtual browser application environment on to a physical host having the available capacity to support the virtual browser application environment. The virtual machine service provider may present, to the primary user, the available virtual machine images that may be instantiated onto available capacity of the physical hosts for a virtual browser application environment. In some instances, in lieu of selecting an available virtual machine image, the primary user may provide, in its request to instantiate a virtual browser application environment onto a physical host, a set of configuration requirements for the virtual browser application environment.

At step 1204, the virtual machine service provider may determine any configuration requirements for instantiation of the virtual browser application environment. For instance, if the primary user, in its request, selects a particular virtual machine image that may be instantiated onto available capacity of the physical hosts for the virtual browser application environment, the virtual machine service provider may evaluate the data or other information available specifying the configuration requirements for the virtual machine image. As noted above, a virtual machine image may have a corresponding set of configuration requirements for instantiation, whereby these configuration requirements may represent an average level of performance for a virtual machine instance instantiated using the virtual machine image. Thus, through evaluation of this data or other information, the virtual machine service provider may identify the configuration requirements for the selected virtual machine image. If the primary user, alternatively, provides configuration requirements for its virtual browser application environment, the virtual machine service provider may evaluate the submitted request to retrieve these configuration requirements. For instance, the primary user may specify that the virtual browser application environment is to be supported by a virtual machine instance having a minimum amount of RAM, a minimum number of vCPUs, minimum storage capacity, and the like. Further, the primary user may specify which browser application is to be implemented within the virtual browser application environment.

At step 1206, based on the defined configuration requirements for the virtual browser application environment, the virtual machine service provider may determine whether a physical host is available to support a virtual machine instance that may be used to implement the virtual browser application environment. The virtual machine service provider may evaluate the physical hosts maintained by the virtual machine service provider to determine the available capacity of each host. Based on this evaluation, the virtual machine service provider may determine whether any physical host or hosts (collectively) have sufficient available capacity to support the virtual machine instance.

If the virtual machine service provider determines that the available capacity of the physical hosts maintained by the virtual machine service provider does not satisfy the primary user's configuration requirements, the virtual machine service provider, at step 1208, may perform a process corresponding to a lack of available capacity for the virtual machine instance. For instance, as part of this process, the virtual machine service provider may reject the request. Alternatively, as part of this process, the virtual machine service provider may queue the primary user's request until a physical host becomes available that has sufficient available capacity to satisfy the primary user's configuration requirements. In some instances, the primary user's request may be queued for a limited period of time, after which the request may be automatically rejected.

If a physical host is available for instantiation of a virtual machine image that can be used to implement a virtual browser application environment according to the primary user's configuration requirements (if any), the virtual machine service provider, at step 1210, may allocate the available capacity for the virtual machine instance and execute (or instantiate) the virtual machine instance on the identified physical host. For instance, the virtual machine service provider may obtain the virtual machine image from the virtual machine images repository and instantiate the virtual machine image onto the available physical host. Further, the virtual machine service provider may associate the virtual machine instance generated using the virtual machine image with the primary user's account. For instance, the virtual machine service provider may update the primary user's account to provide an identification of the virtual machine instance generated to implement the virtual browser application environment for the primary user. In some instances, this identification may include a unique identifier corresponding to the virtual machine instance, whereby the unique identifier may be generated automatically when the virtual machine image selected by the primary user or by the virtual machine service provider on behalf of the primary user is instantiated onto a physical host, as described above.

Figure 13:
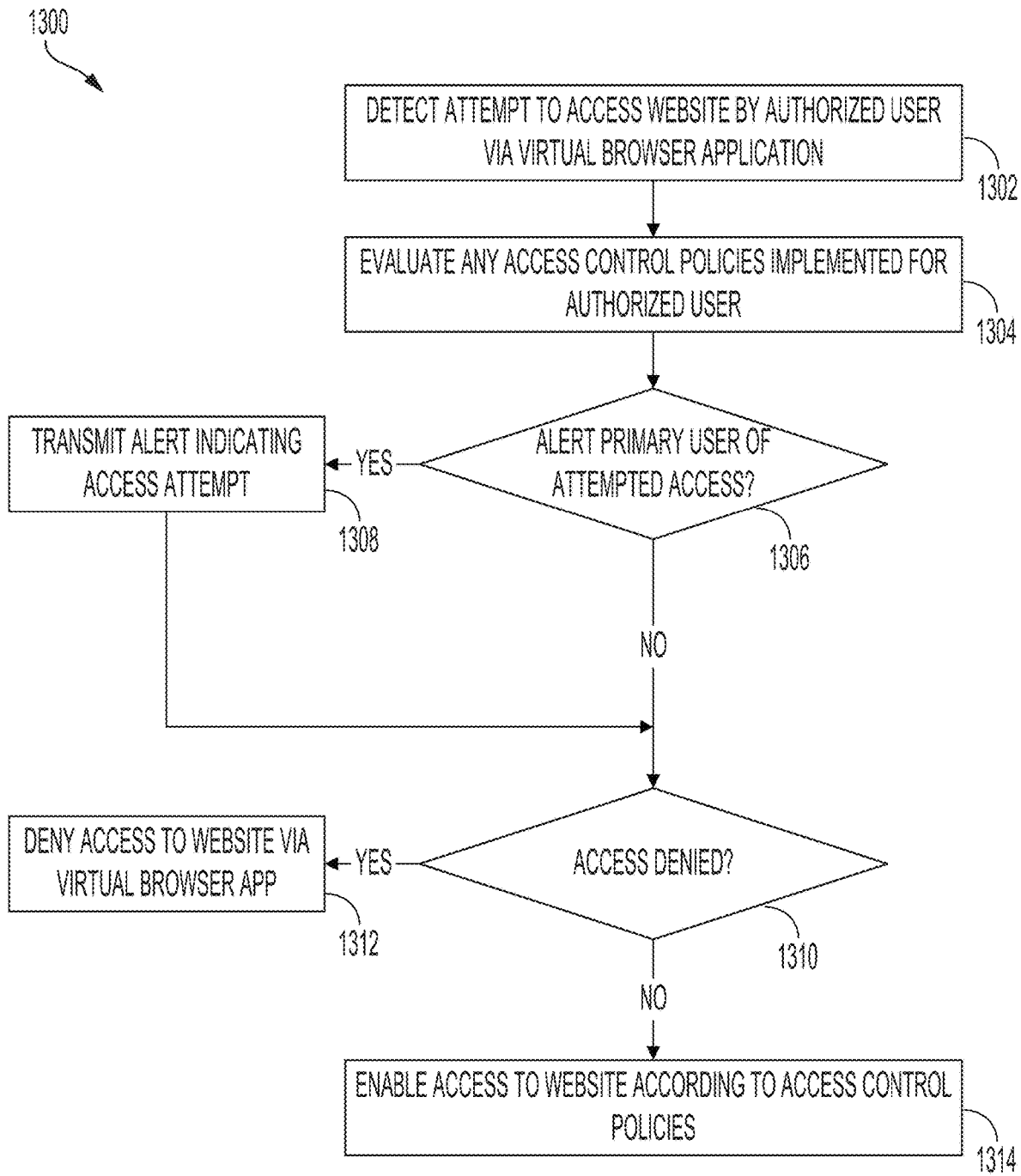
FIG. 13 shows an illustrative example of a process for monitoring and controlling access of authorized users to websites via the virtual browser application environment in accordance with at least one embodiment.

FIG. 13 shows an illustrative example of a process 1300 for monitoring and controlling access of authorized users to websites via the virtual browser application environment in accordance with at least one embodiment. The process 1300 may be performed by the virtual machine service provider, which may, in real-time, monitor user actions within the virtual browser application environment subject to any applicable access control policies and/or alerts defined by a primary user or established by default by the virtual machine service provider. The process 1300 may further be performed once an authorized user accesses the virtual browser application environment via a website or web portal provided by the virtual machine service provider.

At step 1302, the virtual machine service provider may detect an attempt, by an authorized user, to access a website using the virtual browser application executed within the virtual browser application environment. As noted above, the virtual machine service provider may, in real-time, monitor authorized user interactions with the virtual browser application. This may include monitoring cursor movements within the virtual browser application, interactions with input fields or other interaction elements associated with the virtual browser application (e.g., user interface elements of the virtual browser application, user interface elements within a website presented via the virtual browser application, etc.). As an illustrative example, if an authorized user utilizes its cursor to select a hyperlink presented on a website via the virtual browser application, the virtual machine service provider may detect the cursor movement to the hyperlink and the selection of the hyperlink by the authorized user.

As noted above, when an authorized user accesses the website or web portal provided by the virtual machine service provider to access the virtual browser application environment, the virtual machine service provider may present, via the website or web portal, a profile page through which the authorized user may be presented with one or more bookmarks. If the authorized user selects a particular bookmark, the virtual machine service provider may redirect the authorized user to the viewer page (such as viewer page 502 described above in connection with FIG. 5) to allow the authorized user to access the virtual browser application and the corresponding website according to any applicable access control policies and/or alerts, as described herein. Thus, the virtual machine service provider may also, in real-time, monitor user interaction with bookmarks in the profile page of the website or web portal provided by the virtual machine service provider to detect an attempt to access a particular website via the virtual browser application.

At step 1304, the virtual machine service provider may evaluate any applicable access control policies implemented for the authorized user. As noted above, a primary user may define one or more access control policies that may be associated with a unique code associated with the primary user's account. These access control policies may be used to determine the level of access to the virtual browser application environment by any authorized user using the unique code. For instance, the primary user may generate an access control policy that allows an authorized user using the unique code to solely have read access to the virtual browser application environment. As another example, the primary user may generate an access control policy that enables an authorized user using the unique code to perform both read and write operations within the virtual browser application environment. A primary user may additionally, or alternatively, define a granular access control policy, through which the primary user can define the level of access to the virtual browser application environment generally, as well as the level of access to particular websites or elements on websites.

In addition to defining one or more access control policies that may be applicable to the authorized user, the primary user may define one or more alerts or other notifications that may be automatically generated by the virtual machine service provider in response to particular actions performed by authorized users within the virtual browser application environment. For instance, a primary user may define an alert whereby if an authorized user accesses a particular website via the virtual browser application environment, the virtual machine service provider is to automatically transmit an alert or other notification to the primary user regarding the access. As another illustrative example, a primary user may define an alert whereby if an authorized user accesses a particular website via the virtual browser application environment, the virtual machine service provider may provide the primary user with one or more options for addressing the authorized user's access to the particular website.

At step 1306, the virtual machine service provider determine whether to alert the primary user of the authorized user's attempted access to a website via the virtual browser application environment. As noted above, when an authorized user uses a unique code associated with the primary user's account to access the virtual browser application environment, the virtual machine service provider may obtain the corresponding alerts and actively monitor the authorized user's actions within the virtual browser application environment in real-time to determine whether an action performed by the authorized user triggers an alert. If an alert is triggered, the virtual machine service provider may perform any action associated with the alert, as defined by the primary user. For instance, at step 1308, if an alert is triggered as a result of the authorized user's attempt to access a website or as a result of any other action performed by the authorized user within the virtual browser application environment, the virtual machine service provider may transmit an alert to the primary user indicating the attempt. In the alert, the virtual machine service provider may indicate the attempted access by the authorized user. Further, in the alert, the virtual machine service provider may present the primary user with one or more options for addressing the authorized user's access to the particular website (e.g., terminating access to the website, notifying the authorized user with regard to this access, etc.).

At step 1310, the virtual machine service provider may determine whether access to the website by the authorized user should be denied. For instance, the virtual machine service provider may, in real-time, evaluate the one or more applicable access control policies to determine whether the primary user has explicitly restricted access to the website that the authorized user is attempting to access. Additionally, or alternatively, in response to the alert, a primary user may transmit an instruction to the virtual machine service provider to deny the authorized user's attempt to access the particular website or perform the action that triggered the alert. If the virtual machine service provider determines that access to the particular website or other performance of an action by the authorized user is denied, the virtual machine service provider may, at step 1312, deny the authorized user's attempt to access the website or otherwise perform the action via the virtual browser application environment. In some instances, the virtual machine service provider may transmit a notification to the authorized user to indicate that the access and/or action is being denied as a result of an applicable access control policy defined by the primary user and/or as a result of an indication by the primary user that such access and/or action is not allowed.

If the virtual machine service provider determines that the authorized user may access the website or otherwise perform the attempted action, the virtual machine service provider, at step 1314, may enable the authorized user to access the website or perform the action according to any applicable access control policies and/or instructions provided by primary user in response to the alert. For instance, if the authorized user, by virtue of an access control policy, is solely authorized to perform read operations within website presented via the virtual browser application environment, the virtual machine service provider may actively restrict the authorized user's ability to interact with any interaction elements of the website, such as preventing the authorized user from inputting text into input fields on a website presented via the virtual browser application environment, and the like. As the authorized user interacts with this website, the virtual machine service provider may continuously, and in real-time, perform the process 1300 until the authorized user terminates its access to the virtual browser application environment.

Figure 14:
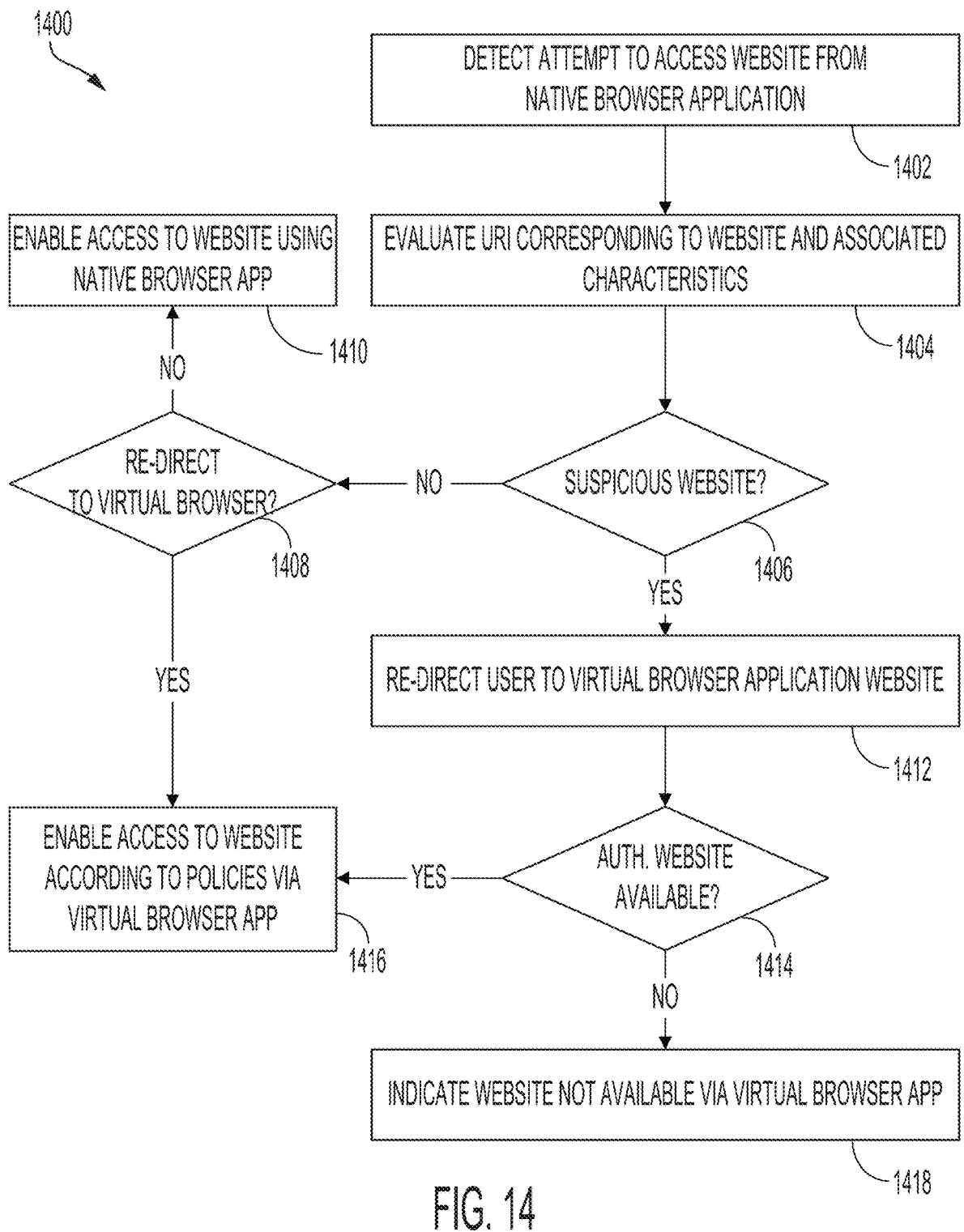
FIG. 14 shows an illustrative example of a process for re-directing an authorized user to the virtual browser application environment in response to detection of selection of a malicious link within a local browser application in accordance with at least one embodiment.

FIG. 14 shows an illustrative example of a process 1400 for re-directing an authorized user to the virtual browser application environment in response to detection of selection of a malicious link within a local browser application in accordance with at least one embodiment. The process 1400 may be performed by a browser extension application installed on an authorized user's computing device and executed when a local browser application on the authorized user's computing device is launched. The browser extension application may be provided by the virtual machine service provider to authorized users for installation onto their computing devices. The browser extension application, when executed, may be in continuous and real-time communication with the virtual machine service provider. Further, the browser extension application may be associated with an authorized user's unique code and/or other credentials used to access the virtual machine service provider. For instance, based on the unique code and/or other credentials supplied to the virtual machine service provider by the browser extension application, the virtual machine service provider may provide the browser extension application with any applicable access control policies and/or alerts, as defined by the primary user and associated with the unique code and/or other credentials provided by the authorized user. This may allow the browser extension application to monitor the authorized user's actions within the browser application and to dynamically, and in real-time, apply the applicable access control policies and/or alerts, as described herein. Thus, certain steps of the process 1400 may be performed in conjunction with the virtual machine service provider.

At step 1402, the browser extension application may detect an attempt to access a website via the native browser application installed on an authorized user's device. For instance, as the authorized user interacts with the native browser application, the browser extension application may continuously, and in real-time, monitor these interactions to detect whether the authorized user is attempting to access a website, provide sensitive information via a website, and the like. For instance, the browser extension application may detect when an authorized user selects a hyperlink or other interaction element within a website presented via the native browser application that may be used to access another website. The browser extension application may further detect when an authorized user enters a web address or URI for a particular website into the native browser application and submits a request to the native browser application to navigate the authorized user to this particular website.

At step 1404, the browser extension application may evaluate the URI corresponding to the website that the authorized user is attempting to access and any associated characteristics. As noted above, the browser extension application can detect if the authorized user is attempting to access a malicious or otherwise suspicious website through the browser application. For example, using the example illustrated in FIG. 7A, the authorized user may receive an e-mail message from a suspicious source, such as a scam or phishing bot that automatically sends unsolicited messages to users to solicit sensitive or personal information from these users. For instance, an unsolicited message from the suspicious source may be generated to appear to be from a legitimate source. For example, the unsolicited message may falsely indicate that unusual account activity has been detected from the authorized user's bank account. Further, the suspicious source may embed, in the unsolicited message, a link to a website through which the authorized user is to (supposedly) reset its password. However, the link, if selected, may redirect the authorized user to a malicious or otherwise suspicious website (e.g., a phishing website) through which the authorized user may be misled to provide sensitive or personal information to a malicious entity.

To evaluate the URI, the browser extension application may process the URI associated with the website against a repository of known URIs for authentic websites (e.g., websites associated with legitimate or trusted entities) to determine whether an authentic website can be identified. In some embodiments, the browser extension application can process content within the current website that the authorized user is interacting with via the native browser application to identify any elements associated with a legitimate entity (e.g., logos, text, icons, etc. associated with a bank, retailer, etc.). Based on this identification of elements, the browser extension application may identify an authentic website associated with these elements. In some embodiments, the browser extension application can further process other identifying information, such as the domain specified in a sending entity's e-mail address, against a repository of known valid domains to identify a legitimate domain corresponding to an authentic website.

At step 1406, the browser extension application may determine whether the URI corresponding to the website that the authorized user is trying to navigate to is a suspicious website. A suspicious website may include a website that may be known to attempt installation of malware, spyware, etc. onto a user's computing device. Further, a suspicious website may include a website that is created for the purpose of trying to steal a user's credentials or other confidential information in order to allow malicious entities access to a user's accounts (e.g., a phishing website). In some instances, a suspicious website may include any website that is not listed in the repository of known URIs for authentic websites. As noted above, the browser extension application may process the URI against a repository of known URIs for authentic websites to determine whether an authentic website can be identified. If the URI corresponding to the website that the authorized user is trying to navigate to does not correspond to a suspicious website (e.g., the URI is listed within the repository of known URIs for authentic websites), the browser extension application may, at step 1408, determine whether to re-direct the authorized user to the virtual browser application in order to allow the authorized user to access the website via the virtual browser application instead of through the native browser application.

In some embodiments, the browser extension application can determine whether the website the authorized user is attempting to access is subject to an access control policy and/or alert defined by the primary user. For instance, if the website is subject to an access control policy and/or alert, the browser extension application may, at step 1416, automatically re-direct the authorized user to the website or web portal maintained by the virtual machine service provider and present, to the authorized user, the virtual browser application environment viewer through which the authorized user may access the requested website via the virtual browser application subject to any applicable access control policies and/or alerts. As another illustrative example, if the website the authorized user is attempting to access is an important website, as classified by either the primary user or by the virtual machine service provider itself, the browser extension application may, at step 1416, automatically re-direct the authorized user to the website or web portal maintained by the virtual machine service provider to enable the authorized user to access the requested website via the virtual browser application subject to any access control policies defined by the primary user. However, if the browser extension application determines that the authorized user may access the requested website using its native browser application (e.g., a primary user has indicated that the authorized user may access the website via its native browser application, no access control policies or alerts are applicable for the website, etc.), the browser extension application, at step 1410, may enable the authorized user to access the website via the native browser application.

If the URI corresponds to a suspicious website, the browser extension application, at step 1412, may re-direct the authorized user to the virtual browser application website, through which the authorized user may access the virtual browser application environment. For instance, the browser extension application may generate a new browser tab through which the website or web portal provided by the virtual machine service provider may be accessed. The browser extension application may automatically provide, to the virtual machine service provider, the unique code and/or other credentials of the authorized user. This may allow the virtual machine service provider to dynamically, and in real-time, identify the virtual browser application environment associated with the provided unique code and/or other credentials. The virtual machine service provider may redirect the authorized user, via the native browser application, to a viewer page of the website or web portal provided by the virtual machine service provider. The viewer page may include a virtual browser application environment viewer, through which the authorized user may access and view the virtual browser application environment using its native browser application.

It should be noted that, in some instances, rather than re-directing the authorized user to the virtual browser application website, the browser extension application may automatically prevent access to the suspicious website via the native browser application and the virtual browser application. For instance, rather than re-directing the authorized user to the virtual browser application website, the browser extension application may indicate, via the native browser application, that access to the requested website is denied. In some instances, if a primary user has defined an access control policy or alert that indicates that one or more primary users are to be notified if the authorized user attempts to access a suspicious website (either through the native browser application or the virtual browser application), the browser extension application may transmit an alert to the one or more primary users to indicate that the authorized user has attempted to access a suspicious website using its native browser application. This may allow these one or more primary users to perform any required remedial actions (e.g., communicate with the authorized user regarding their attempted access to the suspicious website, guiding the authorized user to the virtual browser application to assist in navigating an authentic website, etc.).

At step 1414, the virtual machine service provider or the browser extension application may determine whether an authentic website is available that can be accessed via the virtual browser application. If the virtual machine service provider or the browser extension application is unable to identify an authentic website corresponding to the URI of the website requested by the authorized user (e.g., the virtual machine service provider or the browser extension application is unable to identify an authentic URI from the repository of known URIs for authentic websites, etc.), the virtual machine service provider may, at step 1418, indicate that the requested website is not available via the virtual browser application.

If the virtual machine service provider or the browser extension application determines that an authentic website is available for the authorized user based on their attempt to access a website from their native browser application, the virtual machine service provider, at step 1416, may enable the authorized user to access the authentic website according to any applicable access control policies and/or alerts defined by the primary user. In some instances, the virtual machine service provider may transmit any alerts to the primary user, if applicable. In an embodiment, if the authorized user is re-directed to the virtual browser application environment as a result of the authorized user having attempted to interact with a suspicious website, the virtual machine service provider can automatically transmit an alert to the primary user to indicate that the authorized user may have been the target of a phishing or other malicious attack. The primary user may access the virtual browser application to interact with the authorized user within the virtual browser application and the authentic website accessed using the virtual browser application.

Figure 15:
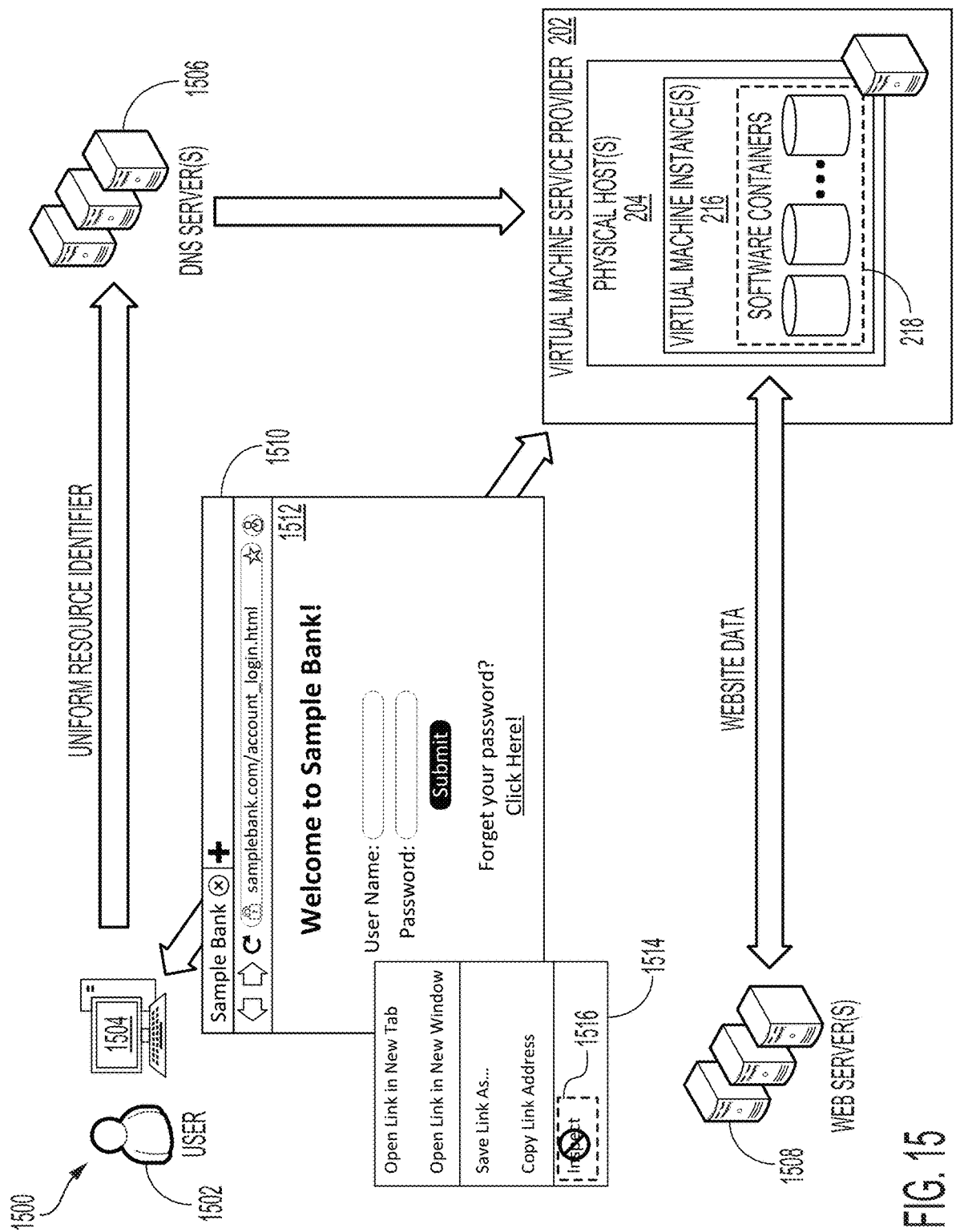
FIG. 15 shows an illustrative example of an environment in which a virtual machine service provider automatically encodes the web Document Object Model (DOM) associated with a website to prevent exposure of the web DOM while providing a representation of the website to users in accordance with at least one embodiment.

FIG. 15 shows an illustrative example of an environment 1500 in which a virtual machine service provider 202 automatically encodes the web DOM associated with a website to prevent exposure of the web DOM while providing a representation of the website to users in accordance with at least one embodiment. In the environment 1500, an administrator of a particular website may access a virtual machine service provider 202 to configure automatic encoding of the particular website for presentation to users (e.g., user 1502) when these users submit requests to access the particular website. As noted above, the virtual machine service provider 202 may implement a set of physical hosts 204 that may be used to instantiate different virtual machine instances 216 through which virtual browser application environments may be executed. A virtual machine instance 216 may be implemented using a virtual machine image according to the administrator's configuration requirements. The virtual machine instance 216 may be instantiated as a container instance that is configured to operate myriad software containers 218 according to the parameters of the virtual machine image, as described above.

In an embodiment, in addition to execution of virtual browser application environments, a virtual machine instance 216 can be implemented to automatically, and in real-time, encode the web DOM associated with a particular website into a data structure that obfuscates the web DOM associated with the particular website but that may be decoded by computing devices to allow for presentation of a graphical facsimile of the website. This graphical facsimile of the website may be presented to users without exposure of the web DOM associated with the particular website, as the graphical facsimile of the website is generated using an alternative data structure that does not include the web DOM associated with the particular website. In an embodiment, the virtual machine instance 216 includes one or more software containers 218 that include one or more applications or programs that can automatically encode the web DOM associated with a particular website and generate a graphical facsimile of the particular website in real-time that may be provided to users attempting to access the particular website.

In an embodiment, the virtual machine instance 216, through the one or more software containers 218, encodes the web DOM associated with the particular website using one or more Web Real-Time Communication (WebRTC) protocols or through a Virtual Network Computing (VNC) protocol into a series of pixels. The virtual machine instance 216 may transmit a binary data stream that includes these pixels to a client (e.g., the computing device 1504 associated with a requesting user 1502, etc.), which may decode the binary data stream to compile the set of pixels into the graphical facsimile of the particular website on the client, such as through a browser application. Since the particular website is graphically represented using a set of pixels rather than through the web DOM associated with the particular website, inspection of the web DOM associated with the particular website is prevented. For instance, because the graphical facsimile of the particular website is generated through decoding of binary data streams from the virtual machine instance 216, a DOM inspector may be unable to process these binary data streams to inspect the web DOM associated with the particular website.

In an embodiment, the virtual machine service provider 202 can define a custom data structure that may be used to encode one or more portions of the web DOM associated with the particular website. For example, the virtual machine service provider 202 may define a custom encoder that may be used by the virtual machine instance 216 (such as through one or more software containers 218) to encode one or more portions of the web DOM. In some instances, the custom encoder may be implemented to encode text and a binary image associated with the particular website into a data format that may be compressed and encrypted for delivery to a client. The client (which is provided with the cryptographic key(s) for decrypting the data stream from the virtual machine instance 216) may decrypt and decompress the data stream comprising the encoded text and binary image. Further, the client may decode the text and binary image to render the graphical facsimile of the particular website according to the preferences defined by the virtual machine service provider 202 through definition of the custom encoder. In some instances, the decoder provided to the client for decoding the encoded text and binary image may be defined through custom JavaScript libraries and/or other libraries defined using appropriate programming languages.

In an embodiment, the virtual machine service provider 202 can provide an administrator of the website or other entity responsible for management of the particular website with one or more options corresponding to different protocols that may be used to encode one or more portions of the web DOM associated with the particular website. For example, the administrator or other entity responsible for management of the particular website may be provided, through an interface (e.g., a graphical user interface (GUI), etc.), with a set of protocols made available by the virtual machine service provider 202 for encoding the particular website according to any of the aforementioned methods. For instance, through this interface, the virtual machine service provider 202 may present the administrator or other entity with options to utilize a WebRTC protocol, a VNC protocol, any custom protocols or encoders defined by the virtual machine service provider 202, and the like for encoding of the particular website. Further, through the interface, the virtual machine service provider 202 may provide the administrator or other entity with various options with regard to the portions of the website that are to be encoded according to a selected protocol. For example, the virtual machine service provider 202, through the virtual machine instance 216, may render the website according to the web DOM and corresponding scripts and assets associated with the website through a virtual browser application environment. Through the virtual browser application environment, the different portions of the website may be indicated such that the administrator or other entity may readily discern which portions of the website correspond to the different portions of the web DOM. Further, through the virtual browser application environment, the administrator or other entity may select which portions of the website are to be encoded. Based on this selection, the virtual machine instance 216 may automatically identify the corresponding portions of the web DOM, as well as the corresponding assets and scripts, that are to be encoded according to the selected encoding protocol.

In an embodiment, when an administrator of a particular website configures a virtual machine instance 216 to serve as a proxy of the particular website in order to encode the web DOM associated with the particular website into a graphical facsimile of the particular website for users, the virtual machine service provider 202 updates one or more Domain Name System (DNS) servers 1506 to map the Uniform Resource Identifier (URI) associated with the particular website with an Internet Protocol (IP) address corresponding to the virtual machine instance 216. For example, while the data (e.g., web DOM, assets, etc.) associated with a particular website may reside within one or more web servers 1508 maintained by the administrator of the particular website, the URI corresponding to the particular website may be mapped to an IP address associated with the virtual machine instance 216 implemented by the virtual machine service provider 202 as opposed to an IP address associated with the one or more web servers 1508. Further, the virtual machine instance 216 may be configured to automatically access the one or more web servers 1508 in response to a request to access the website to obtain the web DOM and other assets associated with the website for encoding into the graphical facsimile of the website. Thus, if a user 1502 enters, through a browser application implemented on their computing device 1504, the URI corresponding to the particular website, the user 1502 may be automatically directed to the virtual machine instance 216 implemented by the virtual machine service provider 202 as opposed to the one or more web servers 1508 that maintain the web DOM and other assets associated with the particular website.

When a user 1502, through a browser application 1510 implemented on their computing device 1504, submits a request to access the website (such as through entry of a URI corresponding to the website through their browser application 1510), the browser application 1510 may transmit a request to the one or more DNS servers 1506 to obtain the IP address corresponding to the website. As noted above, the virtual machine service provider 202 may update the one or more DNS servers 1506 to map the URI corresponding to the website to an IP address corresponding to the virtual machine instance 216 implemented to convert the web DOM and other assets associated with the website into a graphical facsimile of the website that may be streamed to the user's computing device 1504. Accordingly, in response to the request from the browser application 1510, the one or more DNS servers 1506 may return the IP address of the virtual machine instance 216. Using this IP address, the browser application 1510 may transmit a request to the virtual machine instance 216 to access the website.

In response to the request to access the website, the virtual machine instance 216 may automatically, and in real-time, query the one or more web servers 1508 associated with the website to obtain the web DOM and any other assets that may be used to render the website. The virtual machine instance 216, using the one or more software containers 218 described above and implemented therein, may automatically process the web DOM and the other assets to generate a graphical facsimile of the website that may be streamed to the user 1502 in response to their request. For instance, if using a default encoding mechanism (e.g., one or more WebRTC protocols, a VNC protocol, etc.), the one or more software containers 218 may encode one or more portions of the web DOM associated with the particular website into individual pixels that may be pushed or transmitted in a binary stream to the browser application 1510. Alternatively, if the virtual machine service provider 202 implements a custom encoder for encoding of the one or more portions of the web DOM associated with the particular website for delivery of the graphical facsimile of the website to the user 1502, the one or more software containers 218 may process the web DOM associated with the particular website using the custom encoder to generate an encoding in a data format that may be compressed, encrypted, and transmitted to the browser application 1510 for presentation of a graphical facsimile of the website.

In an embodiment, in response to the request to access the website, the virtual machine instance 216 automatically queries the browser application 1510 or other application that is to present the graphical facsimile of the website to determine whether a decoder is available for decoding the encoded data stream corresponding to the graphical facsimile of the particular website. For instance, the virtual machine instance 216 may transmit data that indicates the particular protocol or data format being utilized for encoding the web DOM according to the particular protocol or data format for creation of the graphical facsimile of the website. If the browser application 1510 or other application does not have the requisite decoder for decoding an encoded data stream corresponding to the graphical facsimile of the particular website, the virtual machine instance 216 may transmit the appropriate decoder to the browser application 1510 or other application for implementation of the decoder. Alternatively, the virtual machine instance 216 may transmit executable instructions to the browser application 1510 or other application that, when executed, may cause the browser application 1510 or other application to obtain the decoder from another network address or location.

As the virtual machine instance 216 encodes the web DOM and the various assets associated with the website according to either the default encoding method (e.g., one or more WebRTC protocols, a VNC protocol, etc.) or the custom encoding method defined by the virtual machine service provider 202, the virtual machine instance 216 may push or transmit, in real-time, a data stream that includes the encoded graphical facsimile of the website. The browser application 1510 may automatically, and in real-time, decode the encoded graphical facsimile of the website and present the graphical facsimile of the website 1512. The graphical facsimile of the website 1512 may appear identical to the original website with some notable exceptions. For example, as illustrated in FIG. 15, if the user 1502 accesses, through the browser application 1510, a browser menu 1514 corresponding to the presented graphical facsimile of the website 1512, the option 1516 to inspect the website may be disabled such that the user 1502 is prohibited from inspecting the website being presented to the user 1502. For instance, since the website presented through the browser application 1510 is actually a graphical facsimile of the website 1512, the browser application 1510 may automatically disable the option 1516 to inspect the website. In some instances, in addition to pushing or transmitting the data stream that includes the encoded graphical facsimile of the website 1512, the virtual machine instance 216 may transmit executable instructions to the browser application 1510 to disable this option 1516 to inspect the website. It should be noted that while an option 1516 to inspect the website is illustrated in FIG. 15 and used extensively throughout the present disclosure for the purpose of illustration, other options that may otherwise be made available to users accessing the website (e.g., an option to save the website as a document, an option to add or otherwise install browser extensions, etc.) may also be automatically disabled.

In some instances, the virtual machine instance 216 may be implemented in a "kiosk" or restricted mode to prevent users from performing one or more operations while navigating through the graphical facsimile of the website 1512. For instance, the virtual machine instance 216 may disable any user options to change the dimensions of the graphical facsimile of the website 1512 streamed to the 1502 via their browser application 1510. As another illustrative example, the virtual machine instance 216 may prevent the user 1502 from interacting with any interactive elements inherent in the original website and graphical represented through the graphical facsimile of the website 1512. For instance, if the original website includes one or more input fields, through which users can typically enter a string of characters, the virtual machine instance 216 may disable these one or more input fields through the graphical facsimile of the website 1512 such that the user 1502 is prevented from being able to enter a string of characters into any of these one or more input fields. However, the one or more input fields may still be graphically represented within the graphical facsimile of the website 1512. As another illustrative example, since the graphical facsimile of the website is generated through the virtual machine instance 216, the virtual machine service provider 202 may automatically disable any options to navigate local files and configurations associated with the virtual machine instance 206 through the graphical facsimile of the website 1512. Similarly, the virtual machine service provider 202 may disable any other administrator controls corresponding to the maintenance and operation of the virtual machine instance 216.

In an embodiment, because the website is being rendered through a data stream that encodes a graphical facsimile of the website 1512 through the browser application 1510, the web DOM corresponding to this graphical facsimile of the website 1512 does not include any of the data included in the original web DOM associated with the website. Thus, in some instances, if the option 1516 is preserved, selection of the option 1516 may result in presentation of a web DOM that includes no data corresponding to the actual website. Instead, the web DOM corresponding to the graphical facsimile of the website 1512 may indicate that presented website is actually a graphical facsimile of the website 1512 and, thus, no data corresponding to the underlying website can be presented. This may prevent automated scripts (e.g., bots, etc.) or other tools from scraping any sensitive data from the website and/or circumvent any measures implemented on the website that are used to provide the appropriate user experience on the website.

In some instances, the virtual machine instance 216 may encode one or more portions of the web DOM and the various assets associated with the website while maintaining any of the remaining original portions of the web DOM and corresponding assets intact. For example, the virtual machine instance 216, based on any preferences defined by an administrator of the website or by default, may encode any portions of the web DOM associated with the website that may include any functional scripts and/or sensitive data that could be exploited by entities inspecting the website. However, any other portions of the web DOM that do not make reference to functional scripts and/or sensitive data may be transmitted in their original format without encoding. Thus, the presentation of the website through the browser application 1510 may include a combination of graphical facsimiles of the portions of the website corresponding to the functional scripts and/or sensitive data encoded by the virtual machine instance 216 and the original portions of the website that have not been encoded by the virtual machine instance 216. A user (such as user 1502) inspecting the web DOM associated with this hybrid presentation of the website may review the web DOM elements corresponding to the unencoded portions of the website while being prevented from inspecting the web DOM elements corresponding to the functional scripts and/or sensitive data encoded by the virtual machine instance 216.

As noted above, an authorized user may utilize the browser application 1510 to access a website or web portal provided by the virtual machine service provider 202 to access a virtual browser application environment implemented on behalf of a primary user. Further, through the browser application 1510, the user may access a viewer page that includes a virtual browser application environment viewer. Through the virtual browser application environment viewer, the user may access and view the virtual browser application environment using its browser application 1510. In an embodiment, the virtual browser application environment is automatically rendered when the user 1502 accesses the virtual machine instance 216 using the URI of the website. For instance, in response to the request to access the website, the virtual machine instance 216 may present the website through the virtual browser application environment viewer, as described above in connection with FIG. 10. However, the virtual browser application environment viewer may be presented in a manner that prevents the user 1502 from discovering that the website is being presented through the virtual browser application environment viewer. For example, the virtual browser application environment viewer may be presented as the website itself as opposed to a frame within a viewer page, as illustrated in FIG. 10. This may allow the user 1502 to navigate the website through the virtual browser application environment viewer without the user 1502 being able to discern that the website is actually being accessed through a virtual browser application implemented on the virtual machine instance 216.

In an embodiment, the virtual machine service provider 202 implements a WebSocket Secure (WSS) or other secure communications protocol through which sensitive user information may be transmitted to the virtual machine instance 216 as part of the user's interaction with the graphical facsimile of the website 1512. For instance, the user 1502, through their computing device 1504, may transmit an application programming interface (API) call using the WSS protocol or other secure communications protocol to establish a secure communications channel with the virtual machine instance 216 in order to provide any sensitive information (or other data the user 1502 does not want to have publicly exposed) to the web servers 1508. This sensitive information or other data may include passwords, search terms or queries, cut and paste buffers, cookies, and the like. Through the API call, the user 1502 may define a set of parameters corresponding to the type(s) of data that are to be securely passed to the virtual machine instance 216 and processed by the one or more web servers 1508. The set of parameters may correspond to one or more portions of the graphical facsimile of the website 1512 as streamed to the user's computing device 1504. For example, if the graphical facsimile of the website 1512 includes data entry fields for entry of the user's username and password (as illustrated in FIG. 15), the user 1502, through their computing device 1504, may transmit an API call using the WSS protocol or other secure communications protocol to establish a secure communications channel with the virtual machine instance 216 to allow for entry and transmission of the user's username and password through the graphical facsimile of the website 1512.

In some instances, in order to provide the one or more interactive elements of the graphical facsimile of the website 1512 and through which the user 1502 may provide sensitive information or other information that the user 1502 would not want publicly exposed, the user 1502 may be required to transmit the API call using the WSS protocol or other secure communications protocol to establish the secure communications channel with the virtual machine instance 216. For instance, when the user 1502 enters, through their browser application 1510, the URI corresponding to the website provided by the one or more web servers 1508, the user 1502 may transmit the API call to the virtual machine instance 216 used to render and stream the graphical facsimile of the website 1512. As noted above, through the API call, the user 1502 may define one or more parameters corresponding to the type(s) of data that are to be securely passed to the virtual machine instance 216 through this secure communications protocol. In response to the API call, the virtual machine instance 216 may determine, from the web DOM associated with the website, which portions of the website may be encoded and streamed to the user 1502. For example, returning to the illustrative example shown in FIG. 15, if the API call defines parameters corresponding to entry of the user's username and password, the virtual machine instance 216 may identify, from the web DOM corresponding to the website, the data entry fields through which the user 1502 may provide their username and password. These data entry fields may be encoded and streamed according to the WSS protocol or other secure communications protocol to enable the user 1502 to interact with the graphical facsimile of these data entry fields and provide their username and password securely to the virtual machine instance 216. However, if the user 1502 does not transmit this API call to the virtual machine instance 216, the virtual machine instance 216 may omit these data entry fields from the graphical facsimile of the website 1512.

Figure 16A:
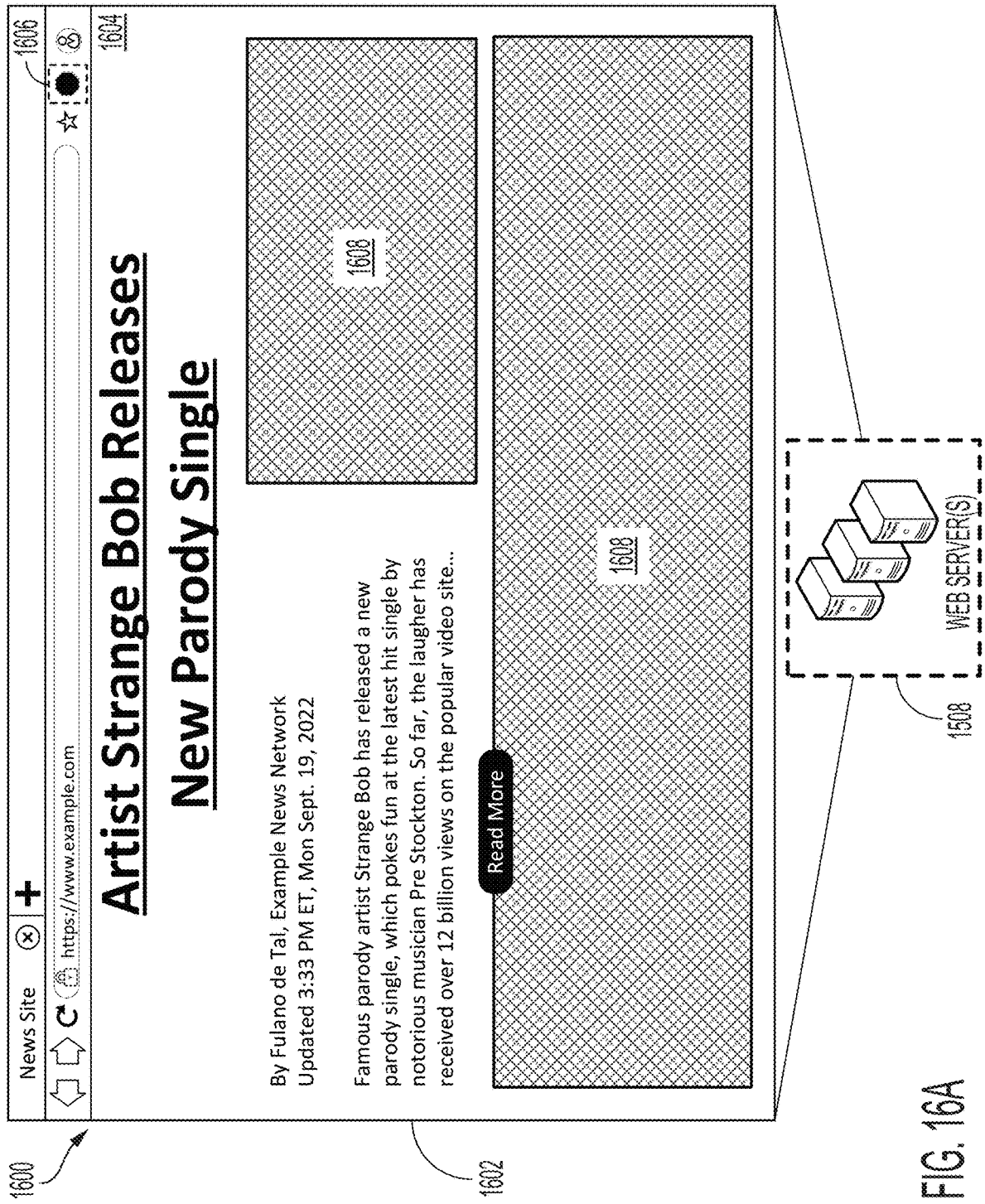
FIGS. 16A-16B show an illustrative example of an environment in which a virtual machine service provider automatically encodes the web DOM associated with a website to prevent automatic removal of one or more advertisements from the website in accordance with at least one embodiment.
Figure 16B:
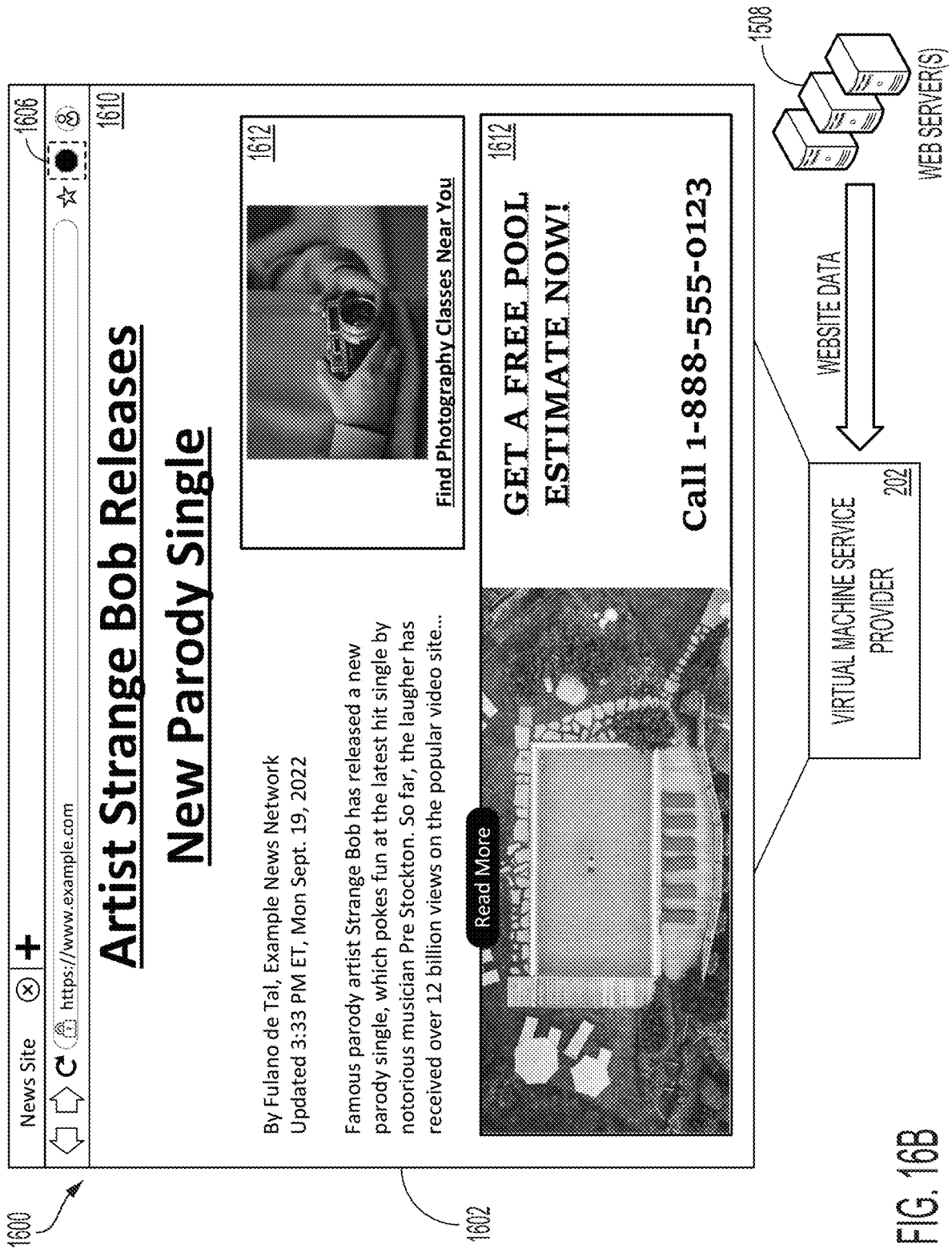

FIGS. 16A-16B show an illustrative example of an environment 1600 in which a virtual machine service provider 202 automatically encodes the web DOM associated with a website 1604 to prevent automatic removal of one or more advertisements 1612 from the website 1604 in accordance with at least one embodiment. As illustrated in FIG. 16A, a user has installed, on their browser application 1602, a browser extension application 1606 that may automatically remove advertisements and other interstitials from websites. The browser extension application 1606 may be provided by one or more third-party services and may be automatically executed to process the web DOM associated with a website to identify any assets or scripts that may correspond to advertisements that are to be displayed on the website. If the browser extension application 1606 identifies any of these assets or scripts from the web DOM associated with the website, the browser extension application 1606 may automatically remove these assets or scripts as the website is being loaded by the browser application 1602, thus preventing these assets or scripts from being rendered by the browser application 1602.

As illustrated in FIG. 16A, the user has used their browser application 1602 to directly access a particular website. The URI corresponding to the particular website 1604 (e.g., "www.example.com") corresponds to an IP address of one or more web servers 1508 that maintain the web DOM and various assets and scripts associated with the website being accessed. Thus, the browser application 1602, from the one or more web servers 1508, may obtain the web DOM and various assets and scripts associated with the website 1604. As the browser application 1602 processes the web DOM, the browser extension application 1606 may automatically review the web DOM to automatically identify any assets or scripts being called that correspond to advertisements that are to be presented on the website 1604. The browser extension application 1606 may automatically remove any portions of the web DOM corresponding to these identified assets or scripts, causing the browser application 1602 to ignore these portions of the web DOM and, thus, not implement these assets or scripts. The removal of these assets or scripts may result in one or more voids 1608 being presented on the website 1604 where the original advertisements were to be presented. This may have a negative impact on the website provider, as the website provider may derive revenue from presentation of these advertisements. Further, these advertisements may be provided by partners that often offer complementary goods and/or services that may benefit users and their utilization of the website 1604.

In response to the implementation of such browser extension applications 1606, as illustrated in FIG. 16B, an administrator of the website 1604 may access the virtual machine service provider 202 to configure automatic encoding of the particular website 1604 for presentation to users when these users submit requests to access the website 1604. As noted above, the administrator of the website 1604 may configure a virtual machine instance to automatically use a default encoding mechanism (e.g., one or more WebRTC protocols, a VNC protocol, etc.) to encode one or more portions of the web DOM associated with the website 1604 into individual pixels that may be pushed or transmitted in a binary stream (e.g., a video stream, etc.) to the browser application 1602. Alternatively, the virtual machine service provider 202 may define a custom encoder that may be used by the virtual machine instance to encode one or more portions of the web DOM associated with the website 1604. This custom encoder may be implemented to encode text and a binary image associated with the website 1604 into a data format that may be compressed and encrypted for delivery to browser application 1602.

As illustrated in FIG. 16B, when the user enters the URI associated with the website 1604 into the browser application 1602, rather than accessing the one or more web servers 1508 that implement the web DOM and various assets and scripts associated with the website 1604, the browser application 1602 may instead access the virtual machine service provider 202. In response to the request to access the website 1604, the virtual machine service provider 202 (through the virtual machine instance corresponding to the website 1604) may automatically, and in real-time, query the one or more web servers 1508 associated with the website to obtain the web DOM and the other assets and scripts that may be used to render the website 1604. As noted above, the virtual machine instance may automatically process the web DOM and the other assets and scripts to generate a graphical facsimile of the website 1610 that may be streamed to the browser application 1602. The graphical facsimile of the website 1610 may be generated using the default encoding mechanism or a custom encoder defined by the virtual machine service provider 202, as described above.

The browser application 1602, as it is obtaining the data stream from the virtual machine service provider 202, may render the graphical facsimile of the website 1610 for the user. The presentation of the graphical facsimile of the website 1610 may be similar to that of the original website 1604. However, as illustrated in FIG. 16B, the graphical facsimile of the website 1610 may include the one or more advertisements 1612 that would have otherwise been removed from the website 1604 by the browser extension application 1606. For instance, because the graphical facsimile of the website 1610 is generated by the virtual machine instance and streamed to the browser application 1602 according to a particular data format (e.g., the default one or more WebRTC protocols or VNC protocol, the custom data structure defined by the virtual machine service provider 202, etc.), the web DOM associated with the graphical facsimile of the website 1610 may be devoid of the data included in the original web DOM associated with the website 1604. Thus, inspection of the web DOM associated with the graphical facsimile of the website 1610 may not reveal or expose the assets or scripts corresponding to the advertisements 1612 that are to be presented within the website 1604. The browser extension application 1606, which may rely on the identification of assets and scripts for removal of advertisements from websites, may be prevented from removing the advertisements 1612 from the graphical facsimile of the website 1610 presented through the browser application 1602.

Figure 17:
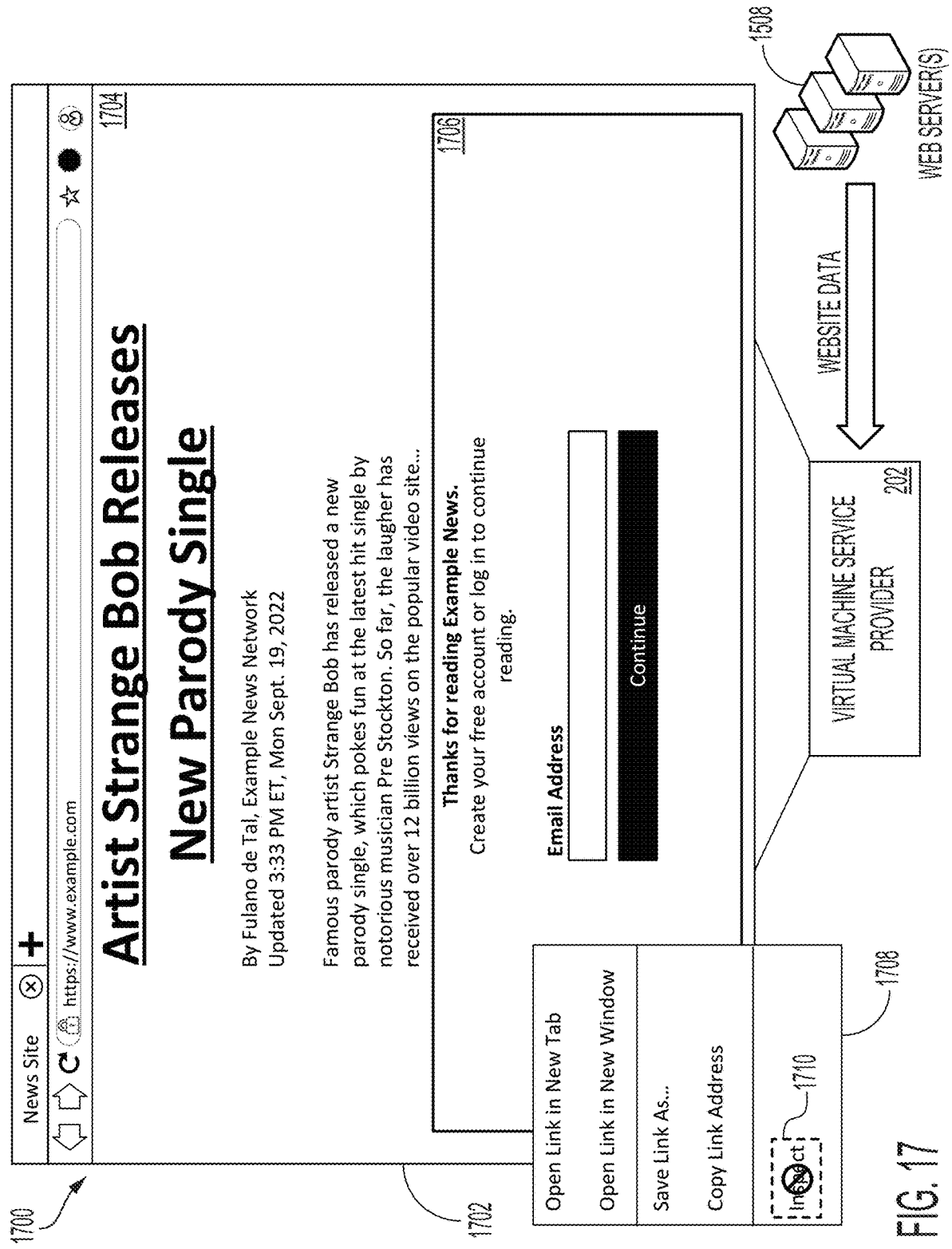
FIG. 17 shows an illustrative example of an environment in which a virtual machine service provider automatically encodes the web DOM associated with a website to prevent inspection of the web DOM in order to remove required interstitials for accessing additional content on the website in accordance with at least one embodiment.

FIG. 17 shows an illustrative example of an environment 1700 in which a virtual machine service provider 202 automatically encodes the web DOM associated with a website to prevent inspection of the web DOM in order to remove required interstitials 1706 for accessing additional content on the website 1704 in accordance with at least one embodiment. In the environment 1700, a website may include one or more interstitials 1706 that may be implemented to prevent unauthorized access to additional content that may be made available through the website. For example, a proprietor of the website may opt to provide premium and/or exclusive content only to subscribers that can be authenticated through an authentication layer. These subscribers may be required to pay a fee in order to access any premium and/or exclusive content made available through the website. However, if this authentication layer can be circumvented through manipulation of the web DOM associated with the website, users would have fewer incentives to pay the required fee in order to become a subscriber to the website in order to access the premium and/or exclusive content made available through the website.

In some instances, users may implement browser extension applications and/or other third-party services (e.g., other websites, applications, etc.) to bypass any interstitials implemented on a website to prevent unauthorized access to premium and/or exclusive content that may be made available to subscribers or otherwise to users paying a requisite fee to access such premium and/or exclusive content. These browser extension applications and/or other third-party services, similar to the browser extension application 1606 described above in connection with FIGS. 16A-16B, may automatically review the web DOM associated with the website to automatically identify any assets or scripts being called that correspond to interstitials 1706 that are to be implemented to prevent unauthorized access to premium and/or exclusive content. These browser extension applications and/or other third-party services may automatically remove any portions of the web DOM corresponding to these identified assets or scripts, causing the browser application 1702 to ignore these portions of the web DOM and, thus, not implement the interstitials 1706, resulting in unauthorized access to the underlying premium and/or exclusive content. In some instances, these browser extension applications and/or other third-party services may simulate or "spoof" a search engine crawler in order bypass any interstitials 1706 that would otherwise be presented on the website.

To avoid having the interstitials 1706 removed by these browser extension applications and/or other third-party services, an administrator of the website may access the virtual machine service provider 202 to configure automatic encoding of the particular website for presentation to users when these users submit requests to access the website. As noted above, the administrator of the website may configure a virtual machine instance to automatically use a default encoding mechanism (e.g., one or more WebRTC protocols, a VNC protocol, etc.) to encode one or more portions of the web DOM associated with the website into individual pixels that may be pushed or transmitted in a binary stream (e.g., a video stream, etc.) to the browser application 1702. Alternatively, the virtual machine service provider 202 may define a custom encoder that may be used by the virtual machine instance to encode one or more portions of the web DOM associated with the website. This custom encoder may be implemented to encode text and a binary image associated with the website into a data format that may be compressed and encrypted for delivery to browser application 1702.

As illustrated in FIG. 17, the browser application 1702 may present a graphical facsimile of the website 1704 as opposed to the website itself. The graphical facsimile of the website 1704, as noted above, may be automatically generated by encoding the web DOM and any assets and/or scripts associated with the website into a particular data format (e.g., a binary stream generated using one or more WebRTC protocols or a VNC protocol, a data stream generated using a custom encoder according to a particular data format, etc.). The graphical facsimile of the website 1704 may include the interstitial 1706 implemented to prevent unauthorized access to premium and/or exclusive content that is available to authorized users (e.g., subscribers, paid members, etc.). Since graphical facsimile of the website 1704 is generated by the virtual machine instance and streamed to the browser application 1702 according to a particular data format, the web DOM associated with the graphical facsimile of the website 1704 may be devoid of the data included in the original web DOM associated with the website. Any browser extension applications and/or other third-party services, thus, may be unable to inspect the web DOM associated with the original website. Further, any browser extension applications and/or other third-party services inspecting the web DOM corresponding to the graphical facsimile of the website 1704 would also be unable to identify any assets or scripts implemented on the website, including the interstitial 1706.

In an embodiment, the virtual machine service provider 202 further provides executable instructions that, when executed by the browser application 1702, cause the browser application 1702 to prevent inspection of the graphical facsimile of the website 1704. For instance, as illustrated in FIG. 17, if the user of the browser application 1702 accesses a browser menu 1708 corresponding to the presented graphical facsimile of the website 1704, the browser application 1702 may automatically prohibit the user from selecting an option 1710 to inspect the website (e.g., access the web DOM, etc.) being presented to the user (e.g., the graphical facsimile of the website 1704). The option 1710 may be disabled, thereby making the option 1710 unavailable to the user. However, if the option 1710 is enabled or the user is otherwise able to inspect the web DOM associated with the graphical facsimile of the website 1704, the presented web DOM would include no data corresponding to the actual website. Instead, the web DOM corresponding to the graphical facsimile of the website 1704 may indicate that presented website is actually a graphical facsimile of the website 1704 and, thus, no data corresponding to the underlying website can be accessed or presented. It should be noted that while an option 1710 to inspect the website is illustrated in FIG. 17 and used extensively throughout the present disclosure for the purpose of illustration, other options that may otherwise be made available to users accessing the website (e.g., an option to save the website as a document, an option to add or otherwise install browser extensions, any of the other options illustrated in the browser menu 1708, etc.) may also be automatically disabled.

Figure 18A:
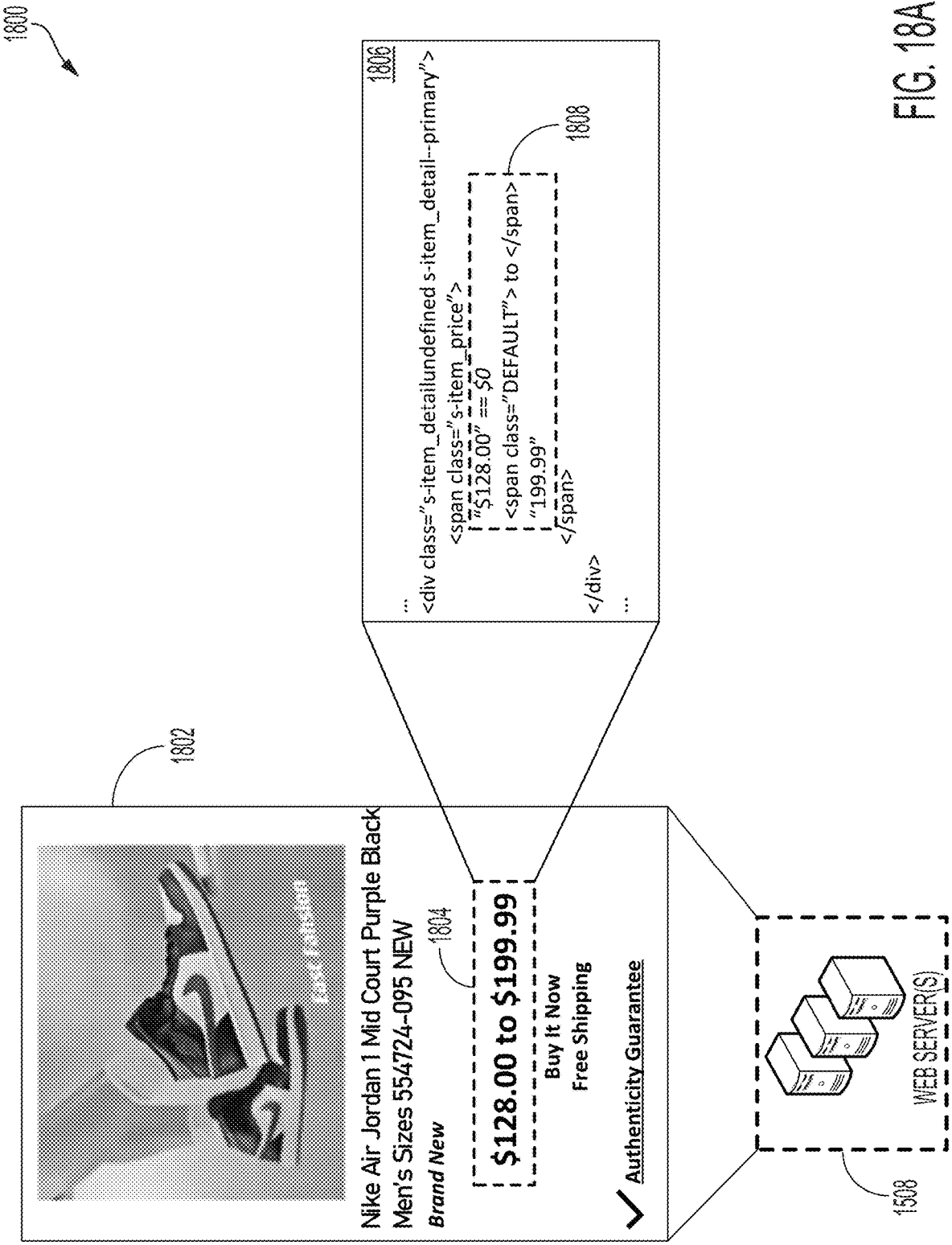
FIGS. 18A-18B show an illustrative example of an environment in which a virtual machine service provider encodes the web DOM associated with a website to prevent scraping of data from the web DOM associated with the website in accordance with at least one embodiment.
Figure 18B:
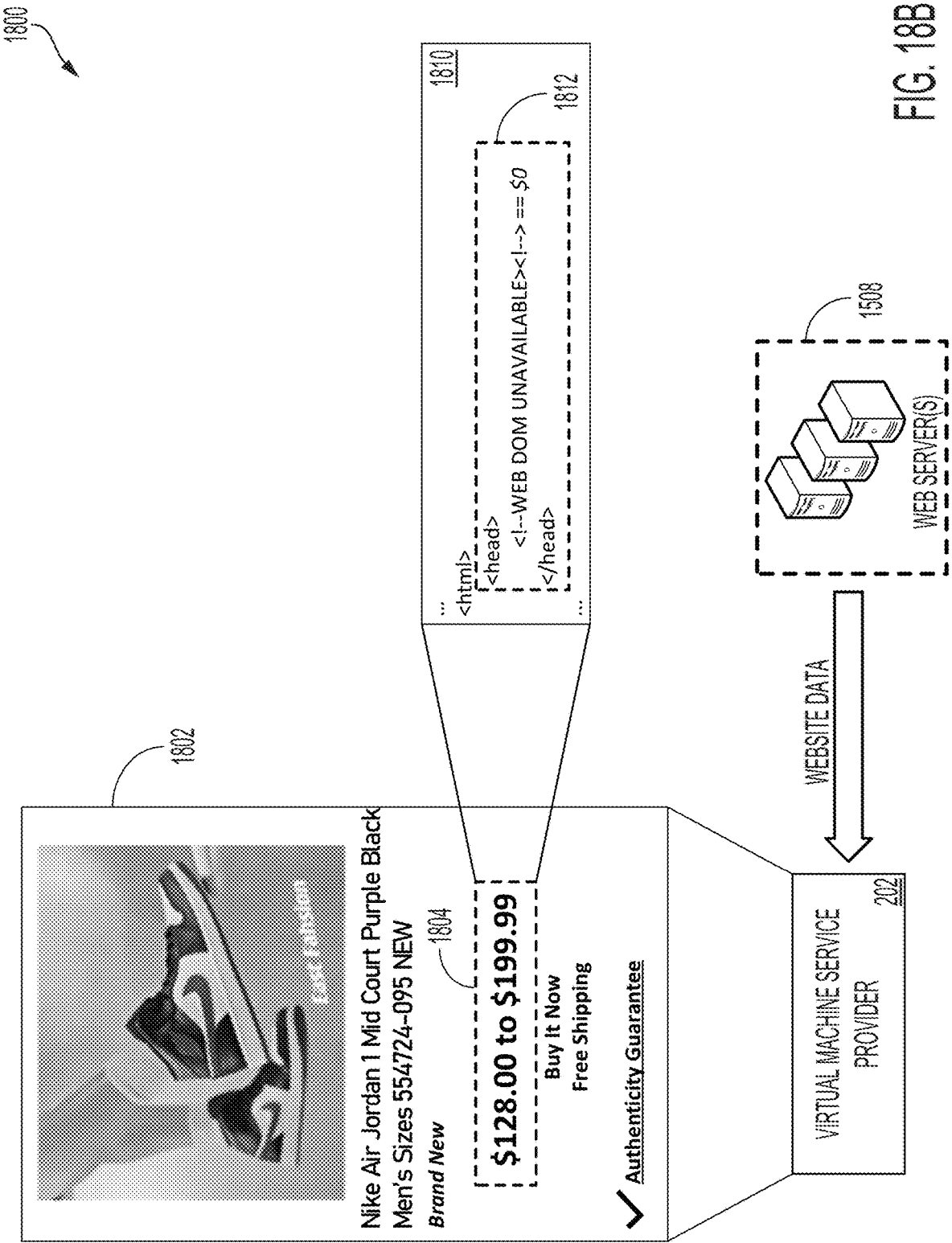

FIGS. 18A-18B show an illustrative example of an environment 1800 in which a virtual machine service provider 202 encodes the web DOM associated with a website 1802 to prevent scraping of data from the web DOM associated with the website 1802 in accordance with at least one embodiment. As illustrated in FIG. 18A, a user has used their browser application to directly access a particular website. The URI corresponding to the particular website corresponds to an IP address of one or more web servers 1508 that maintain the web DOM and various assets and scripts associated with the website being accessed. Thus, the browser application, from the one or more web servers 1508, may obtain the web DOM and various assets and scripts associated with the website 1802. As a result of the browser application gaining direct access to the web DOM and various assets and scripts associated with the website 1802, the user and any other entity accessing the website 1802 may be able to access the web DOM associated with the website 1802.

The original web DOM 1806 associated with the website 1802 may include sensitive data 1808 that may be exposed to users and other entities accessing the website 1802. For example, the pricing information 1804 presented on the website 1802 may correspond to a particular portion of the original web DOM 1806 that includes sensitive data 1808. This sensitive data 1808 may specify pricing data for the website 1802 that may be used by competitors to gain a competitive advantage over the proprietor of the website 1802. Further, this sensitive data 1808 may be automatically scraped from the original web DOM 1806 using browser extension applications or other third-party services/applications.

To prevent exposure of this sensitive data 1808 through data scraping or other methods of harvesting data from the web DOM associated with the website 1802, an administrator of the website 1802 may access the virtual machine service provider 202 (as illustrated in FIG. 18B) to configure automatic encoding of the website 1802 for presentation to users without exposing the sensitive data 1808 through the web DOM 1806 associated with the website 1802. As noted above, the administrator of the website 1802 may configure a virtual machine instance to automatically use a default encoding mechanism (e.g., one or more WebRTC protocols, a VNC protocol, etc.) to encode one or more portions of the web DOM associated with the website 1802 into individual pixels that may be pushed or transmitted in a binary stream (e.g., a video stream, etc.) to a user's browser application. Alternatively, the virtual machine service provider 202 may define a custom encoder that may be used by the virtual machine instance implemented by the virtual machine service provider 202 to encode one or more portions of the web DOM associated with the website 1802. This custom encoder may be implemented to encode text and a binary image associated with the website 1802 into a data format that may be compressed and encrypted for delivery to the user's browser application, where a graphical facsimile of the website may be presented.

As illustrated in FIG. 18B, the web DOM corresponding to the original website 1802 is obfuscated, such that the sensitive data 1808 corresponding to the pricing information 1804 presented on the website 1802 is not available through inspection of the web DOM 1810 corresponding to the graphical facsimile of the website. For example, because the website 1802 is being rendered by the virtual machine service provider 202 through a data stream that encodes a graphical facsimile of the website through the user's browser application, the web DOM 1810 corresponding to this graphical facsimile of the website does not include any of the data included in the original web DOM 1806 associated with the website 1802. Thus, if the user selects an option to inspect the website 1802, the browser application may present a web DOM 1810 that includes no data corresponding to the actual website 1802. Further, as illustrated in FIG. 18B, the web DOM 1810 may indicate (such as through data element 1812) that the presented website is a graphical facsimile of the website and, thus, no data corresponding to the underlying website can be presented. This may prevent automated scripts (e.g., bots, etc.) or other tools from scraping the sensitive data 1808 from the website 1802.

The encoding of the web DOM associated with a website into a data stream that may be decoded by a browser application to provide a graphical facsimile of the website without exposing the original web DOM may provide further advantages. For instance, websites that are implemented to provide platforms for the sale of goods available in limited quantities (e.g., apparel, tickets, etc.) are often the target of automated bots, which may exploit the web DOM associated with these websites to automatically initiate and complete purchases, resulting in an inferior user experience. The implementation of a virtual machine instance to automatically encode the web DOM to generate a graphical facsimile of the website without exposing the web DOM to website visitors may prevent these automated bots from exploiting the web DOM, as the web DOM corresponding to the presented graphical facsimile of the website may indicate that the presented website is actually a graphical facsimile of the website and, thus, no data corresponding to the underlying website is presented.

Another advantage provided by encoding of the web DOM associated with a website into a data stream that may be used to generate and present a graphical facsimile of the website without exposing the original web DOM is that the website can no longer be inspected to determine how the website is constructed, configured, and implemented. The original web DOM associated with a website may expose data, files, and information that may be used by malicious entities to identify any vulnerabilities associated with the website that may be exploited for various purposes. The implementation of a virtual machine instance to automatically encode the web DOM to generate a graphical facsimile of the website without exposing the web DOM to website visitors may prevent these entities from being able to inspect the original web DOM associated with the website and gain access to the data, files, and information usable to identify any vulnerabilities associated with the website. Thus, by rendering the website as a graphical facsimile of the website, the virtual machine service provider may reduce the risk of exposure of the website's vulnerabilities.

Figure 19:
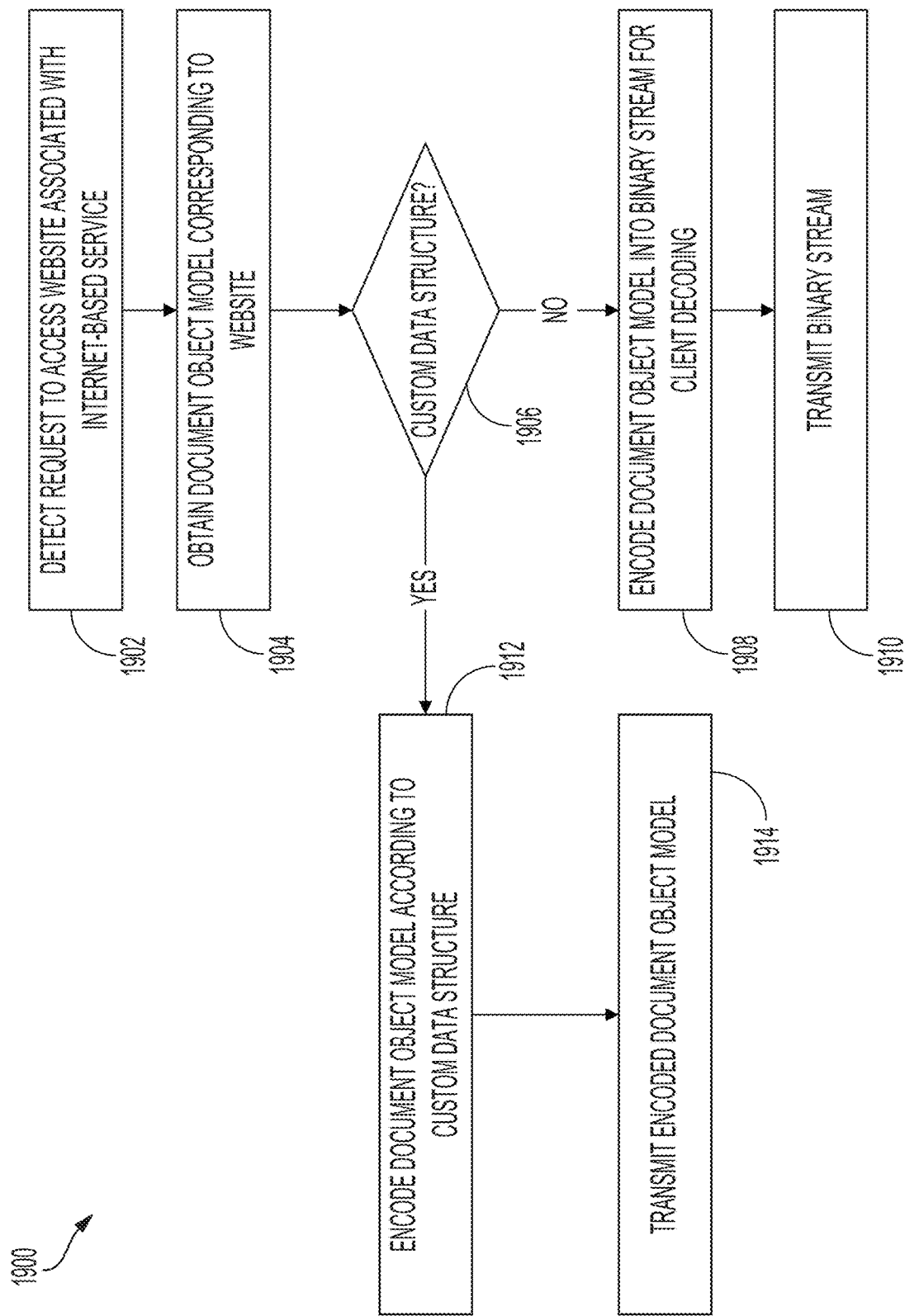
FIG. 19 shows an illustrative example of a process for encoding a web DOM associated with a website in order to prevent exposure of the web DOM while providing a representation of the website to a user accessing the website in accordance with at least one embodiment.

FIG. 19 shows an illustrative example of a process 1900 for encoding a web DOM associated with a website in order to prevent exposure of the web DOM while providing a representation of the website to a user accessing the website in accordance with at least one embodiment. The process 1900 may be performed by a virtual machine instance, implemented by a virtual machine service provider, that is configured to automatically, and in real-time, encode the web DOM associated with a particular website into a data stream that may be used by a browser application to render a graphical facsimile of the website that does not expose the original web DOM associated with the website.

At step 1902, the virtual machine instance may detect a request to access a website associated and an internet-based service (e.g., an entity that provides web content through one or more web servers, etc.). As noted above, when an administrator of the website configures the virtual machine instance to serve as a proxy for the website, the virtual machine service provider updates one or more DNS servers to map the URI associated with the website with an IP address corresponding to the virtual machine instance. If a user enters, through a browser application implemented on their computing device, the URI corresponding to the website, the one or more DNS servers may return, to the user's browser application, the IP address corresponding to the virtual machine instance. The user's browser application may use this IP address to automatically submit a request to the virtual machine instance implemented by the virtual machine service provider to access the website.

At step 1904, the virtual machine instance may obtain the web DOM corresponding to the requested website. For instance, in response to the request to access the website, the virtual machine instance may query the one or more web servers associated with the website to obtain the web DOM and any other assets and scripts that may be encoded to render a graphical facsimile of the website. The web DOM may provide a representation of the website that may be used, by the virtual machine instance, to programmatically and locally render the website on the virtual machine instance without exposing the web DOM to any other entities. It should be noted that, in some instances, the web DOM and corresponding assets and scripts associated with the website may be cached or otherwise stored by the virtual machine instance to prevent repetitious querying of the one or more web servers in response to requests to access the website. For instance, the virtual machine instance may cache or otherwise store the web DOM and corresponding assets and scripts for a period of time, after which the virtual machine instance may again query the one or more web servers to obtain any updates to the web DOM and/or the assets/scripts associated with the website. In some instances, the one or more web servers may automatically push any updates to the web DOM and to the assets/scripts automatically to the virtual machine instance for local rendering of the website.

In an embodiment, the virtual machine service provider implements a caching algorithm that can automatically, and in real-time, determine which websites are to be pre-rendered on one or more virtual machine instances and encoded for requesting users. For instance, the caching algorithm may automatically provision one or more virtual machine instances that may be implemented to pre-render a particular website for which it is anticipated that the particular website will be subject to increased demand from users. As an illustrative example, a website corresponding to a popular gaming retailer may experience increased network traffic in the months leading to the winter holidays and during gaming trade shows. Accordingly, during these times, the caching algorithm may automatically instantiate one or more virtual machine instances for pre-rendering the website corresponding to the popular gaming retailer in order to support the additional demand while preventing exposure of the web DOM and any other sensitive data associated with the website to users. As another illustrative example, if an administrator or other entity responsible for management of the particular website defines one or more periods of time during which heightened demand for the website is expected, the caching algorithm may automatically provision one or more virtual machine instances that may be implemented to pre-render the particular website during the defined one or more periods of time.

In an embodiment, the caching algorithm is a machine learning algorithm or artificial intelligence that is dynamically trained using supervised training techniques to perform the aforementioned operations. For instance, a dataset including sample websites (including web DOMs, assets, scripts, etc.), characteristics of the sample websites (e.g., retail, news, special interest, event, etc.), and corresponding network traffic patterns may be selected for training of the caching algorithm. The caching algorithm may be evaluated to determine, based on the sample inputs supplied to the caching algorithm, whether the caching algorithm is accurately predicting periods of heightened demand for the sample websites and, accordingly, is pre-rendering the sample websites using one or more virtual machine instances ahead of the predicted periods of heightened demand. Based on this evaluation, the caching algorithm may be modified to increase the likelihood of the caching algorithm making accurate predictions and implementing the one or more virtual machine instances ahead of the predicted heightened demand for particular websites.

The caching algorithm may further be dynamically trained in real-time based on network traffic data obtained for myriad websites as this data is obtained. For example, the caching algorithm may automatically monitor, in real-time, any websites that are to be encoded for streaming to users using a virtual machine instance to determine the network traffic associated with these websites. As fluctuations in network traffic are identified for these websites, the caching algorithm may be evaluated to determine whether, based on these fluctuations, the caching algorithm is accurately identifying heightened demand for these myriad websites and, accordingly, pre-rendering these websites onto one or more virtual machine instances in order to prevent repeated provisioning of virtual machine instances and encoding of these websites for different users during periods of heightened demand.

At step 1906, the virtual machine instance may determine whether a custom data structure for encoding the web DOM associated with the website has been implemented for the website. As noted above, the virtual machine service provider may generate or otherwise implement a custom encoder for encoding of one or more portions of the web DOM associated with the website for delivery of the graphical facsimile of the website in response to the request. In some instances, the custom encoder may be implemented to encode text and a binary image associated with the website into a data format that may be compressed and encrypted for delivery to a client. The client may be provided with cryptographic key(s) for decrypting the data stream from the virtual machine instance. may decrypt and decompress the data stream comprising the encoded text and binary image.

If the virtual machine service provider has defined or otherwise implemented a custom data structure for encoding the web DOM associated with the website into a graphical facsimile of the website, the virtual machine instance, at step 1912, may encode the web DOM according to this custom data structure. For instance, as noted above, the virtual machine instance may use the custom encoder corresponding to the custom data structure to encode the web DOM and corresponding assets and scripts according to a custom lightweight content aware method. For instance, this method may include encoding the text and a binary image of the website into a particular data format. This encoded data may be compressed and encrypted for delivery to the browser application or other requesting entity.

At step 1914, the virtual machine instance may transmit the encoded web DOM and corresponding assets/scripts in the corresponding data format to the browser application or other requesting entity. As noted above, this encoded data may be compressed and encrypted prior to delivery to the browser application or other requesting entity. The browser application or other requesting entity, in response to receiving this encoded data, may decode the text and binary image to render the graphical facsimile of the particular website according to the definition of the custom encoder. In some instances, the decoder provided to the browser application or other requesting entity for decoding the encoded text and binary image may be defined through custom JavaScript libraries and/or other libraries defined using appropriate programming languages, as described above.

If the virtual machine instance determines that a custom data structure has not been defined for the particular website, the virtual machine instance, at step 1908, may encode the web DOM and corresponding assets and scripts into a binary data stream for client (e.g., browser application, other requesting entity, etc.) decoding. For instance, if using a default encoding mechanism (e.g., one or more WebRTC protocols, a VNC protocol, etc.), the virtual machine instance may encode one or more portions of the web DOM associated with the particular website, as well as any corresponding assets/scripts, into individual pixels that may be pushed or transmitted in a binary stream to the browser application or other requesting entity.

At step 1910, the virtual machine instance may transmit the binary data stream to the browser application or other requesting entity to allow the browser application or other requesting entity to decode the binary stream and render a graphical facsimile of the website. For instance, as the virtual machine instance encodes the web DOM and the various assets/scripts associated with the website according to the default encoding method (e.g., one or more WebRTC protocols, a VNC protocol, etc.), the virtual machine instance may push or transmit, in real-time, the binary data stream that includes the encoded graphical facsimile of the website. The browser application may automatically, and in real-time, decode the encoded graphical facsimile of the website and present the graphical facsimile of the website. As noted above, the graphical facsimile of the website may appear identical to the original website. However, in some instances, if the user accesses, through the browser application, a browser menu corresponding to the presented graphical facsimile of the website, the option to inspect the website may be disabled to prevent the user from inspecting the website. In some instances, in addition to pushing or transmitting the data stream that includes the encoded graphical facsimile of the website, the virtual machine instance may transmit executable instructions to the browser application to disable this option to inspect the website.

The web DOM corresponding to the graphical facsimile of the website may not include any of the data included in the original web DOM associated with the website. Thus, in some instances, if a user or other entity is able to inspect the web DOM associated with the graphical facsimile of the website, this web DOM may include no data corresponding to the actual website. Instead, the web DOM corresponding to the graphical facsimile of the website may indicate that the presented website is actually a graphical facsimile of the website and, thus, no data corresponding to the underlying website can be presented.

Figure 20:
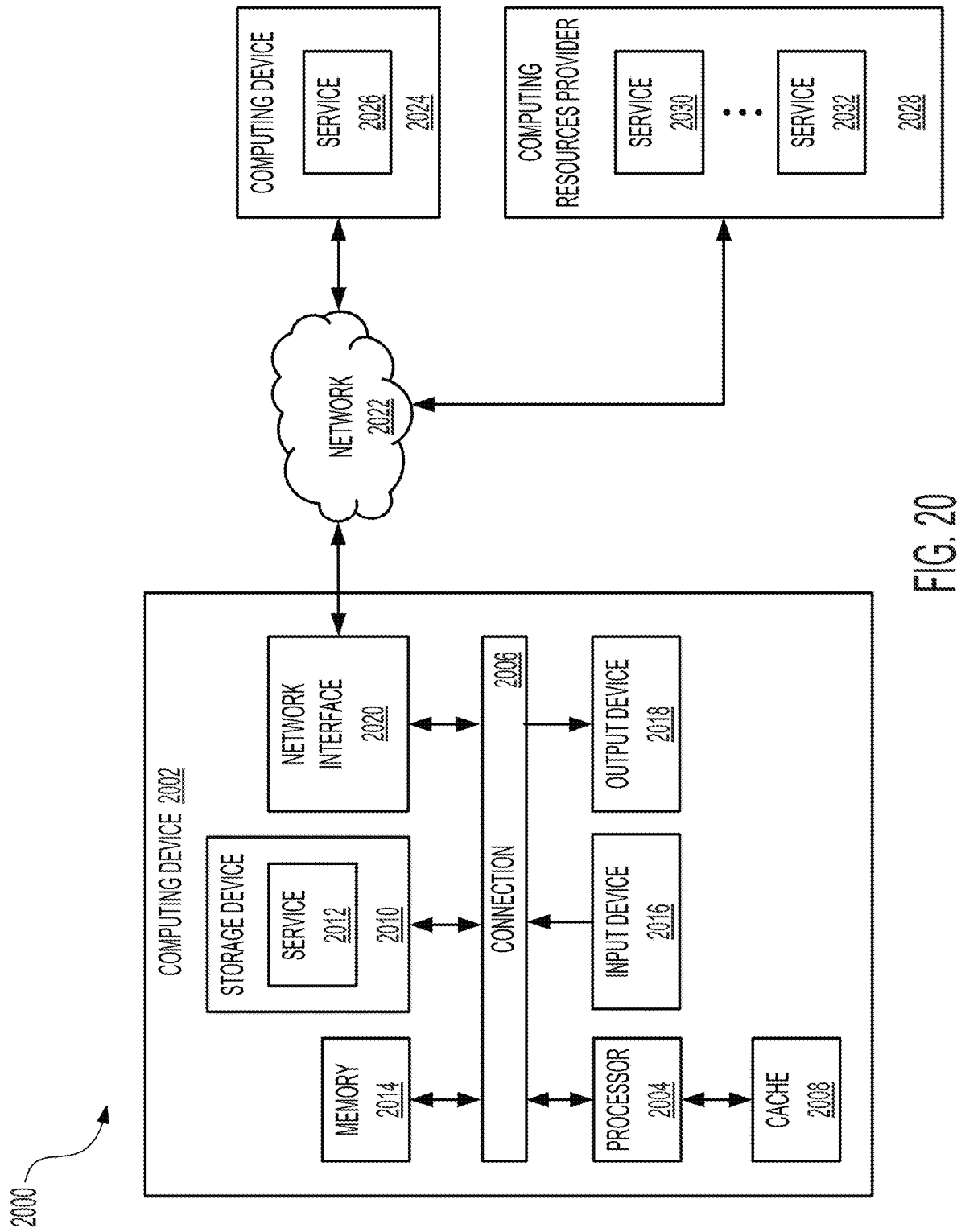
FIG. 20 shows an illustrative example of an environment in which various embodiments can be implemented.

FIG. 20 illustrates a computing system architecture 2000, including various components in electrical communication with each other, in accordance with some embodiments. The example computing system architecture 2000 illustrated in FIG. 20 includes a computing device 2002, which has various components in electrical communication with each other using a connection 2006, such as a bus, in accordance with some implementations. The example computing system architecture 2000 includes a processing unit 2004 that is in electrical communication with various system components, using the connection 2006, and including the system memory 2014. In some embodiments, the system memory 2014 includes read-only memory (ROM), random-access memory (RAM), and other such memory technologies including, but not limited to, those described herein. In some embodiments, the example computing system architecture 2000 includes a cache 2008 of high-speed memory connected directly with, in close proximity to, or integrated as part of the processor 2004. The system architecture 2000 can copy data from the memory 2014 and/or the storage device 2010 to the cache 2008 for quick access by the processor 2004. In this way, the cache 2008 can provide a performance boost that decreases or eliminates processor delays in the processor 2004 due to waiting for data. Using modules, methods and services such as those described herein, the processor 2004 can be configured to perform various actions. In some embodiments, the cache 2008 may include multiple types of cache including, for example, level one (L1) and level two (L2) cache. The memory 2014 may be referred to herein as system memory or computer system memory. The memory 2014 may include, at various times, elements of an operating system, one or more applications, data associated with the operating system or the one or more applications, or other such data associated with the computing device 2002.

Other system memory 2014 can be available for use as well. The memory 2014 can include multiple different types of memory with different performance characteristics. The processor 2004 can include any general purpose processor and one or more hardware or software services, such as service 2012 stored in storage device 2010, configured to control the processor 2004 as well as a special-purpose processor where software instructions are incorporated into the actual processor design. The processor 2004 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 2004 can be a microprocessor, a microcontroller, a digital signal processor ("DSP"), or a combination of these and/or other types of processors. In some embodiments, the processor 2004 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 2000, an input device 2016 can represent any number of input mechanisms, such as a microphone for speech, a touch-sensitive screen for gesture or graphical input, keyboard, mouse, motion input, pen, and other such input devices. An output device 2018 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 2000. In some embodiments, the input device 2016 and/or the output device 2018 can be coupled to the computing device 2002 using a remote connection device such as, for example, a communication interface such as the network interface 2020 described herein. In such embodiments, the communication interface can govern and manage the input and output received from the attached input device 2016 and/or output device 2018. As may be contemplated, there is no restriction on operating on any particular hardware arrangement and accordingly the basic features here may easily be substituted for other hardware, software, or firmware arrangements as they are developed.

In some embodiments, the storage device 2010 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 2010 can include hardware and/or software services such as service 2012 that can control or configure the processor 2004 to perform one or more functions including, but not limited to, the methods, processes, functions, systems, and services described herein in various embodiments. In some embodiments, the hardware or software services can be implemented as modules. As illustrated in example computing system architecture 2000, the storage device 2010 can be connected to other parts of the computing device 2002 using the system connection 2006. In an embodiment, a hardware service or hardware module such as service 2012, that performs a function can include a software component stored in a non-transitory computer-readable medium that, in connection with the necessary hardware components, such as the processor 2004, connection 2006, cache 2008, storage device 2010, memory 2014, input device 2016, output device 2018, and so forth, can carry out the functions such as those described herein.

The disclosed processes for implementing the virtual browser application environment can be performed using a computing system such as the example computing system illustrated in FIG. 20, using one or more components of the example computing system architecture 2000. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and functions for implementing the virtual browser application environment described herein by, for example, executing code using a processor such as processor 2004 wherein the code is stored in memory such as memory 2014 as described herein. One or more of a user device, a provider server or system, a database system, or other such devices, services, or systems may include some or all of the components of the computing system such as the example computing system illustrated in FIG. 20, using one or more components of the example computing system architecture 2000 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 2028. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 2004 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 2014 can be coupled to the processor 2004 by, for example, a connector such as connector 2006, or a bus. As used herein, a connector or bus such as connector 2006 is a communications system that transfers data between components within the computing device 2002 and may, in some embodiments, be used to transfer data between computing devices. The connector 2006 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 2014 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 2014 can also include magnetic or optical data storage media including read-only (e.g., CD ROM and DVD ROM) or otherwise (e.g., CD or DVD). The memory can be local, remote, or distributed.

As described above, the connector 2006 (or bus) can also couple the processor 2004 to the storage device 2010, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 2010. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 2006 can also couple the processor 2004 to a network interface device such as the network interface 2020. The interface can include one or more of a modem or other such network interfaces including, but not limited to those described herein. It will be appreciated that the network interface 2020 may be considered to be part of the computing device 2002 or may be separate from the computing device 2002. The network interface 2020 can include one or more of an analog modem, Integrated Services Digital Network (ISDN) modem, cable modem, token ring interface, satellite transmission interface, or other interfaces for coupling a computer system to other computer systems. In some embodiments, the network interface 2020 can include one or more input and/or output (I/O) devices. The I/O devices can include, by way of example but not limitation, input devices such as input device 2016 and/or output devices such as output device 2018. For example, the network interface 2020 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and decendents, Xenix™ SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 2002 can be connected to one or more additional computing devices such as computing device 2024 via a network 2022 using a connection such as the network interface 2020. In such embodiments, the computing device 2024 may execute one or more services 2026 to perform one or more functions under the control of, or on behalf of, programs and/or services operating on computing device 2002. In some embodiments, a computing device such as computing device 2024 may include one or more of the types of components as described in connection with computing device 2002 including, but not limited to, a processor such as processor 2004, a connection such as connection 2006, a cache such as cache 2008, a storage device such as storage device 2010, memory such as memory 2014, an input device such as input device 2016, and an output device such as output device 2018. In such embodiments, the computing device 2024 can carry out the functions such as those described herein in connection with computing device 2002. In some embodiments, the computing device 2002 can be connected to a plurality of computing devices such as computing device 2024, each of which may also be connected to a plurality of computing devices such as computing device 2024. Such an embodiment may be referred to herein as a distributed computing environment.

The network 2022 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 2022 can be wired connections, wireless connections, or combinations thereof. Communications via the network 2022 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 2022, within the computing device 2002, within the computing device 2024, or within the computing resources provider 2028 can include information, which also may be referred to herein as content. The information may include text, graphics, audio, video, haptics, and/or any other information that can be provided to a user of the computing device such as the computing device 2002. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 2002 and presented to a user of the computing device 2002 using forms that are perceptible via sight, sound, smell, taste, touch, or other such mechanisms. In some embodiments, communications over the network 2022 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 2002 and/or the computing device 2024 can be connected to a computing resources provider 2028 via the network 2022 using a network interface such as those described herein (e.g. network interface 2020). In such embodiments, one or more systems (e.g., service 2030 and service 2032) hosted within the computing resources provider 2028 (also referred to herein as within "a computing resources provider environment") may execute one or more services to perform one or more functions under the control of, or on behalf of, programs and/or services operating on computing device 2002 and/or computing device 2024. Systems such as service 2030 and service 2032 may include one or more computing devices such as those described herein to execute computer code to perform the one or more functions under the control of, or on behalf of, programs and/or services operating on computing device 2002 and/or computing device 2024.

For example, the computing resources provider 2028 may provide a service, operating on service 2030 to store data for the computing device 2002 when, for example, the amount of data that the computing device 2002 exceeds the capacity of storage device 2010. In another example, the computing resources provider 2028 may provide a service to first instantiate a virtual machine (VM) on service 2032, use that VM to access the data stored on service 2032, perform one or more operations on that data, and provide a result of those one or more operations to the computing device 2002. Such operations (e.g., data storage and VM instantiation) may be referred to herein as operating "in the cloud," "within a cloud computing environment," or "within a hosted virtual machine environment," and the computing resources provider 2028 may also be referred to herein as "the cloud." Examples of such computing resources providers include, but are not limited to, Amazon® Web Services (AWS®), Microsoft's Azure®, IBM Cloud®, Google Cloud®, Oracle Cloud® etc.

Services provided by a computing resources provider 2028 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 2030 and service 2032 may implement versions of various services (e.g., the service 2012 or the service 2026) on behalf of, or under the control of, computing device 2002 and/or computing device 2024. Such implemented versions of various services may involve one or more virtualization techniques so that, for example, it may appear to a user of computing device 2002 that the service 2012 is executing on the computing device 2002 when the service is executing on, for example, service 2030. As may also be contemplated, the various services operating within the computing resources provider 2028 environment may be distributed among various systems within the environment as well as partially distributed onto computing device 2024 and/or computing device 2002.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 2002) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the processes illustrated in FIGS. 6-8). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 2002.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set $\{A, B, C\}$, namely: $\{A\}$, $\{B\}$, $\{C\}$, $\{A, B\}$, $\{A, C\}$, $\{B, C\}$, or $\{A, B, C\}$) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
    receiving a request to access a website, wherein the website is implemented on one or more web servers, and wherein the website is implemented using a web Document Object Model (DOM);
    obtaining the web DOM and one or more assets associated with the web DOM, wherein the one or more assets are identified based on the web DOM;
    encoding the web DOM and the one or more assets according to a data format to generate a data stream, wherein the data stream corresponds to a graphical facsimile of the website, wherein the graphical facsimile of the website obfuscates the web DOM, and wherein the graphical facsimile of the website provides a graphical representation of the one or more assets according to the web DOM;
    transmitting the data stream to fulfill the request, wherein when the data stream is received, the data stream is decoded to generate and present the graphical facsimile of the website; and
    transmitting a set of executable instructions that, as a result of being executed, disables an option to inspect the graphical facsimile of the website.

2. The computer-implemented method of claim 1, wherein the web DOM and the one or more assets are encoded using one or more Web Real-Time Communication (WebRTC) protocols, and wherein the one or more WebRTC protocols are used to encode the web DOM and the one or more assets into a set of pixels used to generate the graphical facsimile of the website.

3. The computer-implemented method of claim 1, further comprising:
    obtaining a custom encoder corresponding to the website, wherein the custom encoder defines the data format; and
    executing the custom encoder to encode the web DOM and the one or more assets according to the data format.

4. The computer-implemented method of claim 1, further comprising:
    updating one or more Domain Name System (DNS) servers to map a Uniform Resource Identifier (URI) associated with the website from an Internet Protocol (IP) address associated with the one or more web servers to an IP address associated with a virtual machine instance, wherein the virtual machine instance is implemented to encode the web DOM and the one or more assets according to the data format.

5. The computer-implemented method of claim 1, further comprising:
    storing the web DOM and the one or more assets within a cache;
    receiving a new request to access the website; and
    retrieving the web DOM and the one or more assets from the cache to encode the web DOM and the one or more assets according to the data format to generate a new data stream.

6. The computer-implemented method of claim 1, wherein the data format corresponds to a Virtual Network Computing (VNC) protocol.

7. The computer-implemented method of claim 1, wherein the graphical facsimile of the website is associated with a different web DOM, and wherein the different web DOM indicates that no data corresponding to the web DOM associated with the website is presented.

8. A system, comprising:
    one or more processors; and
    memory storing thereon instructions that, as a result of being executed by the one or more processors, cause the system to:
        receive a request to access a website, wherein the website is implemented on one or more web servers, and wherein the website is implemented using a web Document Object Model (DOM);
        obtain the web DOM and one or more assets associated with the web DOM, wherein the one or more assets are identified based on the web DOM;
        encode the web DOM and the one or more assets according to a data format to generate a data stream, wherein the data stream corresponds to a graphical facsimile of the website, wherein the graphical facsimile of the website obfuscates the web DOM, and wherein the graphical facsimile of the website provides a graphical representation of the one or more assets according to the web DOM;
        transmit the data stream to fulfill the request, wherein when the data stream is received, the data stream is decoded to generate and present the graphical facsimile of the website; and
        transmit a set of executable instructions that, as a result of being executed, disables an option to inspect the graphical facsimile of the website.

9. The system of claim 8, wherein the web DOM and the one or more assets are encoded using one or more Web Real-Time Communication (WebRTC) protocols, and wherein the one or more WebRTC protocols are used to encode the web DOM and the one or more assets into a set of pixels used to generate the graphical facsimile of the website.

10. The system of claim 8, wherein the instructions further cause the system to:
    obtain a custom encoder corresponding to the website, wherein the custom encoder defines the data format; and
    execute the custom encoder to encode the web DOM and the one or more assets according to the data format.

11. The system of claim 8, wherein the instructions further cause the system to:
    update one or more Domain Name System (DNS) servers to map a Uniform Resource Identifier (URI) associated with the website from an Internet Protocol (IP) address associated with the one or more web servers to an IP address associated with a virtual machine instance, wherein the virtual machine instance is implemented to encode the web DOM and the one or more assets according to the data format.

12. The system of claim 8, wherein the instructions further cause the system to:
    store the web DOM and the one or more assets within a cache;

receive a new request to access the website; and retrieve the web DOM and the one or more assets from the cache to encode the web DOM and the one or more assets according to the data format to generate a new data stream.

13. The system of claim 8, wherein the data format corresponds to a Virtual Network Computing (VNC) protocol.

14. The system of claim 8, wherein the graphical facsimile of the website is associated with a different web DOM, and wherein the different web DOM indicates that no data corresponding to the web DOM associated with the website is presented.

15. A non-transitory, computer-readable storage medium storing thereon executable instructions that, as a result of being executed by one or more processors of a computer system, cause the computer system to:

receive a request to access a website, wherein the website is implemented on one or more web servers, and wherein the website is implemented using a web Document Object Model (DOM);

obtain the web DOM and one or more assets associated with the web DOM, wherein the one or more assets are identified based on the web DOM;

encode the web DOM and the one or more assets according to a data format to generate a data stream, wherein the data stream corresponds to a graphical facsimile of the website, wherein the graphical facsimile of the website obfuscates the web DOM, and wherein the graphical facsimile of the website provides a graphical representation of the one or more assets according to the web DOM;

transmit the data stream to fulfill the request, wherein when the data stream is received, the data stream is decoded to generate and present the graphical facsimile of the website; and transmit a new set of executable instructions that, as a result of being executed, disables an option to inspect the graphical facsimile of the website.

16. The non-transitory, computer-readable storage medium of claim 15, wherein the web DOM and the one or more assets are encoded using one or more Web Real-Time Communication (WebRTC) protocols, and wherein the one or more WebRTC protocols are used to encode the web DOM and the one or more assets into a set of pixels used to generate the graphical facsimile of the website.

17. The non-transitory, computer-readable storage medium of claim 15, wherein the executable instructions further cause the computer system to:

obtain a custom encoder corresponding to the website, wherein the custom encoder defines the data format; and execute the custom encoder to encode the web DOM and the one or more assets according to the data format.

18. The non-transitory, computer-readable storage medium of claim 15, wherein the executable instructions further cause the computer system to:

update one or more Domain Name System (DNS) servers to map a Uniform Resource Identifier (URI) associated with the website from an Internet Protocol (IP) address associated with the one or more web servers to an IP address associated with a virtual machine instance, wherein the virtual machine instance is implemented to encode the web DOM and the one or more assets according to the data format.

19. The non-transitory, computer-readable storage medium of claim 15, wherein the executable instructions further cause the computer system to:

store the web DOM and the one or more assets within a cache;

receive a new request to access the website; and retrieve the web DOM and the one or more assets from the cache to encode the web DOM and the one or more assets according to the data format to generate a new data stream.

20. The non-transitory, computer-readable storage medium of claim 15, wherein the data format corresponds to a Virtual Network Computing (VNC) protocol.

21. The non-transitory, computer-readable storage medium of claim 15, wherein the graphical facsimile of the website is associated with a different web DOM, and wherein the different web DOM indicates that no data corresponding to the web DOM associated with the website is presented.

* * * * *